United States Patent
Nishimoto

(10) Patent No.: US 9,774,414 B2
(45) Date of Patent: Sep. 26, 2017

(54) METHODS AND APPARATUS FOR PROVIDING AND UTILIZING VIRTUAL TIMING MARKERS

(71) Applicant: Kay Nishimoto, Valencia, CA (US)

(72) Inventor: Kay Nishimoto, Valencia, CA (US)

( * ) Notice: Subject to any disclaimer, the term of this patent is extended or adjusted under 35 U.S.C. 154(b) by 0 days.

(21) Appl. No.: 15/237,602

(22) Filed: Aug. 15, 2016

(65) Prior Publication Data

US 2017/0054547 A1    Feb. 23, 2017

Related U.S. Application Data

(60) Provisional application No. 62/206,079, filed on Aug. 17, 2015, provisional application No. 62/289,928, filed on Feb. 2, 2016.

(51) Int. Cl.
| | |
|---|---|
| *H04J 3/12* | (2006.01) |
| *H04J 3/06* | (2006.01) |
| *H04L 7/00* | (2006.01) |
| *H04L 12/40* | (2006.01) |

(52) U.S. Cl.
CPC .............. *H04J 3/12* (2013.01); *H04J 3/0635* (2013.01); *H04L 7/0091* (2013.01); *H04L 12/40* (2013.01); *H04J 3/0638* (2013.01)

(58) Field of Classification Search
CPC ..... H04L 7/0087; H04L 7/008; H04L 5/0005; H04L 5/0016; H04L 5/22; H04L 2012/5674; H04L 27/2655; H04L 27/2692; H04L 2007/045; H04W 56/00; H04W 56/0005; H04W 56/0015; H04W 56/003
See application file for complete search history.

(56) References Cited

U.S. PATENT DOCUMENTS

| | | | |
|---|---|---|---|
| 2011/0170465 A1* | 7/2011 | Tavildar | H04W 56/0015 370/311 |
| 2014/0003558 A1* | 1/2014 | Ichikawa | H04L 7/042 375/343 |
| 2015/0103818 A1* | 4/2015 | Kuhn | H04W 56/00 370/350 |

* cited by examiner

*Primary Examiner* — Ricky Ngo
*Assistant Examiner* — Stephen Steiner
(74) *Attorney, Agent, or Firm* — Loza & Loza, LLP; Heidi L. Eisenhut

(57) ABSTRACT

Disclosed are methods and apparatus to utilize virtual timing markers to improve transmission and reception of electronic or optic signals having timing markers such as zero-to-one transitions. Physical timing markers are augmented or substituted with relocatable messages containing displacements or time offsets to other physical timing markers in a reference signal waveform. Additionally disclosed are virtual timing marker methods to improve transmission performance, qualities, operation, or use, such as timing markers that can overlap other timing markers or other signal content waveforms, seamlessly span over intermittent signals, or reference the more precise underlying signal carrier waveforms as well as timing marker error detection and correction, dispersed redundant timing markers, statistical precision enhancement, concealing timing markers from jammers, subscriber access by encryption, increased signal content efficiency, and reduced multiplexing. These are beneficial in handling and relaying high precision positioning-navigation-and-timing signals, or for piggybacking them on other purpose signals.

36 Claims, 37 Drawing Sheets

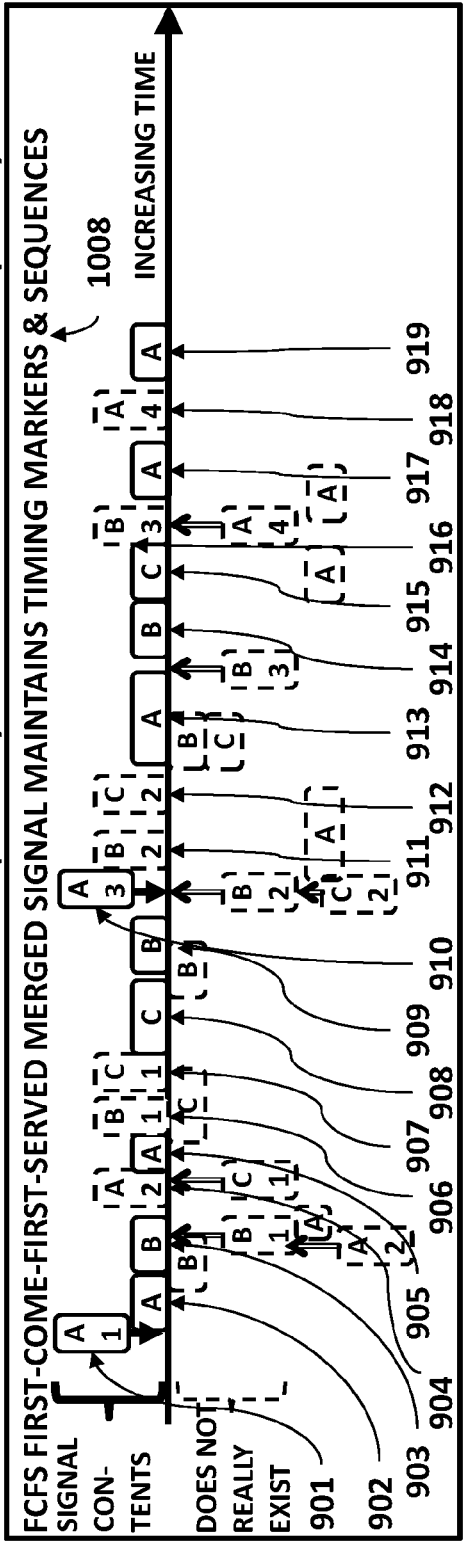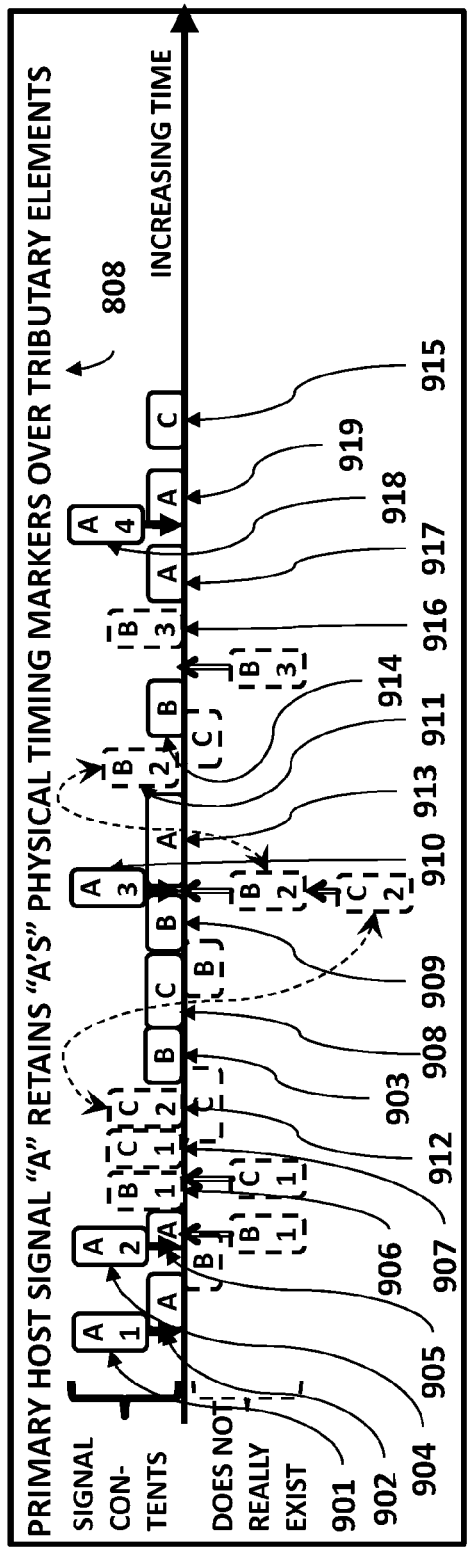
FIG. 11

FIG. 15 Time Division Multiplexing Adds Tributary Timing Signals

METHODS AND APPARATUS FOR PROVIDING AND UTILIZING VIRTUAL TIMING MARKERS

CLAIM OF PRIORITY UNDER 35 U.S.C. §119

The present application for patent claims priority to (1) U.S. Provisional Application No. 62/206,079 entitled "TIMING MARKERS", filed Aug. 17, 2015 and (2) U.S. Provisional Application No. 62/289,928 entitled "METHODS AND APPARATUS FOR PROVIDING AND UTILIZING VIRTUAL TIMING MARKERS", filed Feb. 2, 2016 which are hereby expressly incorporated by reference herein.

FIELD

Various aspects of the present disclosure relate to virtual timing markers for improving transmission and receiver unpacking of electronic or optic transmission signals having timing markers. These methods and options can enhance the performance, qualities, operation, and use of such transmission signals.

BACKGROUND

Precision time technology has become central to many electronics applications and especially to distance and position determination. A wireless transmission error of one billionth of a second can create a location error of one foot. World time standard bodies have proposed optical clocks in space because natural continental plate drifting at 1 cm per day would be too unstable for femtosecond precision time applications. This technology has far reaching impact, and may affect many other disparate disciplines such as power grid energy efficiencies, communications, and time synchronized remote sensing (e.g., earthquakes) that rely upon precision time.

Sending a precise time has typically been accomplished by transmitting a precise timing marker such as a zero to one transition of a designated bit waveform of a train of bits with an annotated time of day stamp. Less common is the practice of specifying a prescribed "n" percent rise threshold of a digital bit or analog wave in order to obtain greater precision. Systems that have receiver clocks synchronizing with a transmitter's precision clock can obtain precision to about 1 percent of the signal's digital bit width.

Multiplexing is the concept of several transmitters sending information simultaneously over a single communications channel. This allows several users to share a single band of radio or optic frequencies. Frequency Division Multiplexing, Time-Division Multiplexing, and Code Division Multiple Access, as shown in FIG. 1, are major ways of multiplexing separate signals.

Time-division multiplexing (TDM), illustrated at 102 in FIG. 1, is a type of digital (or sometimes analog) multiplexing in which two or more bit streams or signals are transferred apparently simultaneously as sub-channels in one communication channel, but are physically taking turns (in time) on the channel. Frequency division multiplexing (FDM) illustrated at 104 in FIG. 1 involves assigning non-overlapping frequency ranges to different signals or to each user of a medium, such that the signals may be transmitted simultaneously. Code division multiple access (CDMA) shown at 106 in FIG. 1 attaches different identification tags to individual tributary signal segments in order for multiple transmitters "speak" independently and simultaneously on the same shared frequency band, yet remain distinguishable and understandable by receivers. By analogously adding prefixes, "McFries, McRibs, and McMuffin" can be audibly distinguished within a family from "iPod, iPhone, iPad, and iTunes". CDMA is a multiplexing channel access method used by various radio communication technologies. It should not be confused with CDMA2000 (3G evolution) and WCDMA (3G GSM carriers), which are specific cell phone technology standards and which are often referred to as simply CDMA.

Multiplexing data compressors merge transmission waveforms by making approximations to increase and discern repetitiveness to reduce signal content. For example, such compressors expect the clock waves on clock and data pairs to be equidistant with no requirement that transition rise times must be precisely replicated; i.e., they address only zero or one states.

With such multiplexing, receiver nodes can adequately reconstruct tributary signals, but designers must often carefully plan transmissions so that timing markers do not collide with other timing markers or other signal element waveforms.

There is also concern for efficient practical use of any given transmission signal. Time division multiplexing (TDM) must widen its tolerances so that any tributary signal time interval, taking its turn, will not overlap with others. Similarly, frequency division multiplexing (FDM) systems must use a guard-band between adjacent frequency channels, due to the unpredictable Doppler shift of the signal spectrum as a user platform moves. Since CDMA appends identification to transmitted signal element instances, it is inherently inefficient.

Typically, transmission signals with timing markers are not 100% filled with timing markers and data. But any unfilled empty space in terms of random idle periods or partially filled packet headers cannot be easily used by other possible contributing tributary signals because their signal element waveforms may unavoidably overlap, overextend, overwrite, or otherwise collide. Dynamic biasing or statistical multiplexing can sometimes be used to adjust near term load balancing, but this is very difficult or near impossible when precision timing markers may unpredictably appear.

Often scenarios for precision timing markers require only sparse signals. For example, synchronizing precision clocks over great distances may need infrequent but very precise updates. Hence, the industry term 1 PPS pulse per second refers to a timing marker that occurs once a second but is nonetheless extremely precise. In order to achieve greater and greater precision, the above methods must correspondingly increase signal frequency and thus channel capacity. This implies much waste on this type of signal channel.

Although the above methods may permit the use of error detection and correction for information content, there is little provision for error detection and correction for individual precision timing marker bit positions if noise or lightning-caused gaps should occur.

It is further noted that when transmitters or receivers may be moving relative to each other or the transmission must travel through atmospheric distortions, travel time delay corrections may be necessary. There can also be Einsteinian special and general relativity effects which are induced by high spacecraft speeds or gravity gradients which can introduce errors as large as a microsecond. Still further, aircraft motion can introduce errors in the form of Doppler radio frequency shifts, misleading radio frequency variations, or a wobbling time reference.

Accordingly, known transmission systems may further have precision timing markers that sometimes use two or more radio frequencies to allow downstream receivers to discern signal travel delay differences and thus make corrections to account for sources of distortion such as the ionosphere. Notwithstanding, local, national, or international radio frequency congestion is an increasing problem and obtaining an allocation of frequency can be difficult or impossible. Also, the potential for existing GPS spacecraft positioning-navigation-and-timing systems to fail servicing location finders has long been acknowledged by the Air Force and many government agencies. The Air Force, Navy, Army, DARPA, Federal Aviation Administration, Homeland Security, and Coast Guard are actively funding alternatives which would be used whenever this system fails any local region. Primary obstacles are expensive infrastructures having new backup transmitters and new receivers as well as the unavailability of radio frequencies which are rationed by the FCC. These transmitters need to send their exact location and precise time of transmission, so that user location finders can determine the signal travel time. Precision timing markers are thus key components in those transmissions.

Accordingly, there exists a need to provide methods and apparatus for improving transmission platforms, corresponding receiver platforms, and transmission signals which use precise timing markers.

SUMMARY

The following presents a simplified summary in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one aspect, a method for forming and placing one or more virtual timing markers in a transmission signal is provided. The method includes determining the displacement or time-offset of a selected target timing marker position on the transmission signal from the position of another physical timing marker in the same or another referenceable transmission signal; forming a message containing the determined displacement or time-offset; and placing at least one virtual timing marker on available space on the transmission signal, wherein each virtual timing marker comprises the message containing the determined displacement or time-offset.

According to one feature, the method may further comprise positioning or changing the positioning of one or more virtual timing markers in the transmission signal by: using or changing the virtual timing marker reference by one or more of: using the original selected reference physical timing marker, using a different reference physical timing marker, referencing another virtual timing marker having a different reference physical timing marker, or using a different reference signal; forming or updating the virtual timing marker message or any associated messages such as the determined displacement, determined time-offset, timing marker identification, or signal identification; and placing the virtual timing marker and any associated messages in adequate available space or spaces in the transmission signal.

According to another feature, the method may further comprise one or more of the following: a) converting selected physical timing markers into virtual timing markers when correct positioning of physical timing markers with other physical timing markers or other signal elements on the transmission signal would result in either a collision or overwriting or both; b) positioning one or more virtual timing marker messages such that the messages do not physically overlap each other or any other signal elements in the transmission signal; c) substituting selected physical timing markers with virtual timing markers; d) augmenting selected physical timing markers or virtual timing markers with other virtual timing markers; and e) positioning virtual timing markers and any associated messages in available spaces such as unused signal intervals, unused packet header words, or unused content regions.

According to yet another feature, the method may further comprise forming a message and a virtual timing marker that is configured to reference a physical timing marker through: referencing another virtual timing marker; or creating or adding to a linked virtual timing marker chain that ultimately references a physical timing marker on a transmission signal.

According to yet another feature, the method may further comprise encoding selected virtual timing markers or any associated messages by using one or more message error detection or error correction algorithms.

According to yet another feature, the method may further comprise encrypting selected virtual timing markers or associated messages for single or multiple communities or classes of separate users.

According to yet another feature, the method may further comprise forming one or more sets of redundant virtual timing markers where each set corresponds to a same selected targeted timing marker position by a one or more of the following actions, for each set: a) forming two or more redundant virtual timing markers and any associated messages that reference different physical timing markers or other virtual timing markers which reference different physical timing markers; b) dispersing the redundant virtual timing markers over equally-spaced intervals for the selected targeted timing marker position along the transmission signal; c) dispersing the redundant virtual timing markers over irregularly-spaced intervals for the selected targeted timing marker position along the signal; and d) dispersing the redundant virtual timing markers and any associated messages for the selected targeted timing marker position along the transmission signal over a pre-specified duration that is longer than a pre-specified potential time-interval burst of noise, interference, or signal gap.

According to yet another feature, the method may further comprise merging of signals by performing one or more of the following actions: a) selectively using virtual timing markers instead of physical timing markers to eliminate or reduce the need for multiplexing; b) merging signals having one or more timing markers and converting selected physical timing markers into virtual timing markers; c) merging signals having one or more timing markers before multiplexing the result with one or more other signals; d) merging signals which have one or more timing markers instead of any multiplexing; and e) using virtual timing markers to enable the use of a lower-than-otherwise signal frequency or transmission channel capacity.

According to yet another feature, the method may further comprise placing virtual timing markers and any associated messages from one or more timing signals in available adequate spaces on one or more other transmission signals and piggybacking them on the one or more other transmission signals.

According to yet another feature, the method may further comprise selecting signal elements or waveform patterns, types of signal-elements or waveform-patterns, or combinations thereof in a signal that meet predetermined acceptance criteria as referenceable physical timing markers.

According to yet another feature, the method may further comprise placing enable, disable, or imminent-warning messages in the signal to dynamically indicate to any corresponding downstream receivers when to search for physical timing markers; and/or using pre-arranged conventions or procedures such as time-outs to disable searches for physical timing markers.

According to yet another feature, the method may further comprise forming one or more signals, which have one or more virtual timing markers, by using one or a combination of the following modes: a) a first-come-first-served mode wherein each next signal element to be placed in a signal is selected on a first-come-first-served basis; b) a priority preference mode wherein each next signal element to be placed in a signal is chosen on a predetermined priority basis such as the highest priority is given to physical timing markers, a next highest priority is given to signal events including signal-start and break-in-signal; a middle priority is given to virtual timing markers; and a lowest priority is given to other signal elements including messages; c) a primary host mode wherein a primary host signal is a signal used as an initial template for an outgoing signal and, as a primary host signal is read or generated, signal elements are formed on the outgoing signal, other selected input signal tributary or internally generated signal elements are simultaneously inserted into empty available spaces of either another outgoing signal or the primary host signal at lower priorities than the host signal elements using either one or a combination of first-come-first-served, priority preference, or similar modes for the other non-host inputs; d) a filling-empty-spaces-on-a-time-reference-signal mode wherein the processing is similar to primary host mode except that virtual timing markers reside only on the primary host signal which has the reference-able physical timing markers; and e) a commonly accessible time reference signals mode wherein the relevant transmission subsystems and any corresponding receivers can access reference-able physical timing markers on one or more timing reference signals or from time-aligned or synchronized clocks.

According to yet another feature, the method may further comprise placing virtual timing marker messages, any associated messages, and reference physical timing markers only on physically present portions of one-or-more (a) intermittent signals, (b) adequately high portions of signals having widely fluctuating power levels, or (c) continuous signals.

According to yet another feature, the method may further comprise multiplexing one or more signals which have one or more timing signals with one or more host signals by (1) forming or assembling one or more timing signals, (2) merging timing signals by converting selected timing markers into virtual timing marker messages which reference other physical timing markers on the same host signals or other separate signal(s), and (3) multiplexing the aforementioned formed-or-merged signals that have virtual timing marker messages with the one or more host signals, wherein multiplexing can be time division multiplexing, frequency division multiplexing, or code division multiple access multiplexing.

According to another aspect, a method for (a) receiving, examining, and processing one or more transmission signals in which one or more timing signals contain one or more virtual timing markers, any associated messages, and any referenced physical timing markers as well as other optional content and (b) outputting selected corresponding timing signals or rendering selected timing signal related contents is provided. The method includes inputting one or more transmission signals where one or more of the signals are the timing signals; scanning, decoding, or unpacking the timing signals for one or more selected (1) virtual timing markers, (2) physical timing markers, or (3) associated messages as well as fulfilling selected virtual timing marker features such as (1) reconciling sets of redundant virtual timing markers into individual timing markers or (2) decrypting encrypted virtual timing markers or associated messages; recognizing selected signal elements, measuring selected waveform parameters within the signal elements, or precisely time-tagging or position-or-displacement-tagging predefined salient points within the signal elements such as physical timing markers; using clocks, counters, or timing reference signals to precisely time-tag or position-or-displacement-tag selected incoming signal elements in terms of time, carrier-cycle-and-fractional-counts, carrier-less equivalents, or other displacements; saving or recording the time-tags or position-or-displacement-tags of one or more referenced physical timing markers according to time, carrier-cycle-and-fractional-counts, carrier-less equivalents, or other displacements; determining the targeted signal position or arrival time of each selected virtual timing marker based on each virtual timing marker's message contents and corresponding referenced physical timing marker arrival parameters; fulfilling selected virtual timing marker features such as (1) reconciling sets of redundant virtual timing markers into individual timing markers, (2) decrypting encrypted virtual timing markers or associated messages, or (3) error detection or correction of virtual timing markers or associated messages; scanning, decoding, or unpacking any other additional selected and pertinent signal elements in order to fulfill selected virtual timing marker features such as command messages, waveforms, or patterns to enable or disable recognition and processing of physical timing markers; rendering all or selected timing markers or other associated signal content as output information; and outputting zero-or-more selected original-or-reconstructed signals such that a signal may contain (1) zero or more physical timing markers which represent selected virtual timing markers which have been converted into physical timing markers, (2) zero or more physical timing markers, (3) zero or more virtual timing markers, or (4) other signal elements.

According to yet another feature, an apparatus transmitting signals including timing markers is provided. The apparatus comprises a transmitter system configured to: a) form or assemble one or more signals for transmission, wherein one or more of the transmission signals includes one or more timing marker signal elements; b) determine and record the time-or-position-or-displacement of one or more selected physical timing markers in one or more signals; c) select one or more virtual timing markers to be formed and placed on one or more signals; and d) for each selected virtual timing marker to be formed, determine a displacement or time-offset of the virtual timing marker targeted position relative to a timing marker in the same or different signal and place, on a signal, the virtual timing marker that includes the displacement or time-offset.

According to yet another aspect, a receiver system apparatus to (a) receive, examine, and process one or more transmission signals in which one or more timing signals contain one or more virtual timing markers, any associated messages, and any referenced physical timing markers and (b) output selected corresponding timing signals or render selected timing signal related contents is provided. The apparatus includes (1) transmission signal input subsystems to input one or more transmission signals where one or more of the signals are the timing signals; (2) timing marker examination subsystems to scan, decode, or unpack the timing signals for one or more selected (a) virtual timing markers, (b) physical timing markers, or (c) associated messages which includes (a) fulfilling virtual timing marker features, such as (i) reconciling sets of redundant virtual timing markers into individual timing markers or (ii) decrypting encrypted virtual timing markers or associated messages; (b) recognizing selected signal elements, measuring selected waveform parameters within the signal elements, or precisely time-tagging or position-or-displacement-tagging predefined salient points within the signal elements such as physical timing markers; (c) using clocks, counters, or timing reference signals to precisely time-tag or position-or-displacement-tag selected incoming signal elements in terms of time, carrier-cycle-and-fractional-counts, carrier-less equivalents, or other displacements; (d) saving or recording the time-tags or position-or-displacement-tags of one or more referenced physical timing markers according to time, carrier-cycle-and-fractional-counts, carrier-less equivalents, or other displacements; (e) determining the targeted signal position or arrival time of each selected virtual timing marker based on each virtual timing marker's message contents, associated messages, and corresponding referenced physical timing marker arrival parameters; and (f) fulfilling selected virtual timing marker features such as (i) reconciling sets of redundant virtual timing markers into individual timing markers, (ii) decrypting encrypted virtual timing markers or associated messages, or (iii) error detection or correction of virtual timing markers or associated messages; (3) signal element examination subsystems to scan, decode, or unpack any other pertinent timing signal elements as well as fulfill virtual timing marker features such as command messages, waveforms, or patterns to enable or disable recognition and processing of physical timing markers; (4) rendering subsystems to render all or selected timing markers or other associated signal content as output information; and (5) signal output subsystems to output zero-or-more selected original-or-reconstructed signals such that a signal may contain (a) zero or more physical timing markers which represent selected virtual timing markers which have been converted into physical timing markers, (b) zero or more physical timing markers, (c) zero or more virtual timing markers, or (d) other signal elements.

BRIEF DESCRIPTION OF THE DRAWINGS

FIG. 11 illustrates a comparison of merged and resequenced signal elements between First-Come-First-Served Mode and Primary Host Mode.

DETAILED DESCRIPTION

Figure 1:
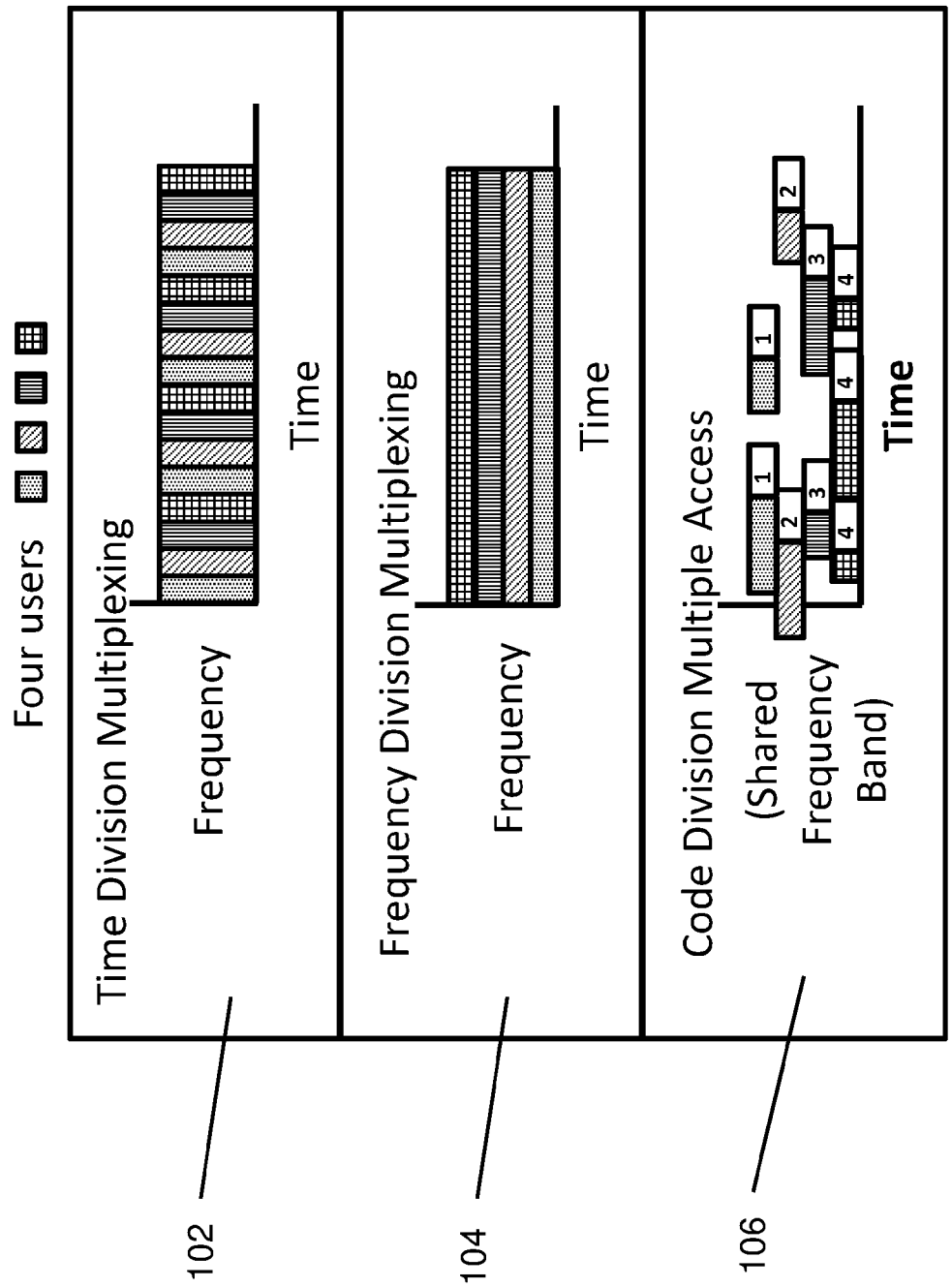
FIG. 1 illustrates examples of Frequency Division Multiplexing, Time-Division Multiplexing, and Code Division Multiple Access, according to the conventional art.

The following detailed description discloses methods and apparatus for improving timing markers, such as through the use of virtual timing markers. The description is not to be taken in a limiting sense, but is made merely for the purpose of illustrating the general principles of the invention. Furthermore, specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown in detail in order not to obscure the embodiments.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation.

The term "aspects" does not require that all aspects of the disclosure include the discussed features, advantages, or modes of operation. The term "coupled" is used herein to refer to the direct or indirect coupling between two objects. For example, if object A physically touches or couples to object B, and object B touches or couples to object C, then objects A and C may still be considered coupled to one another, even if they do not directly physically touch each other.

The presently disclosed methodology substitutes or augments physical timing markers with relocatable virtual timing marker messages containing displacements or time offsets to other physical timing markers in a reference signal waveform. Further disclosed are other optional virtual timing marker methods to improve transmission performance, qualities, operation, or use.

Numerous advantages over the conventional art of transmission signals with timing markers can result from the use of virtual timing markers—such as (1) increased noise, jamming, or spoof resistance by enabling timing marker redundancy and other features, (2) increased signal content efficiency by enabling timing markers which can overlap other timing markers or other signal element waveforms or which can be relocated on arbitrary available empty signal intervals, unused data packet header words, or unused data regions, (3) forming timing marker signals which can piggyback on other purpose signals and thus reduce infrastructure costs for transmitters-and-receivers or special radio frequency allocations, or (4) directly utilize far more precise underlying signal carrier waveform peaks or zero crossings—rather than (a) less precise traditional enveloping multicycle encoded signal waveforms or (b) using 3 separate "trilaning" signals traditionally needed to successively converge on an aforementioned and target carrier peak.

NOISE OR JAM RESISTANCE: Each traditional physical timing marker has only one point in the signal, so it has no backup if radio noise occurs and overrides the signal at that interval. The use of forming redundant physical timing markers is not common because it would be costly using traditional methods to do alternatives such as multiple transmissions of the same signal. Still further, if a noise or lightning gap occurs, all the timing markers in frequency multiplexed signals may be struck in the same time interval. And traditional "interleaved forward error correction" is effective for only a few erroneous bits.

In contrast, the presently disclosed virtual timing markers can become redundant merely by adding multiple dispersed virtual timing marker messages which reference different physical timing markers. Virtual timing markers can be redundantly distributed over several seconds in the same signal, thereby mitigating the deleterious effects of noise or lightning gaps. The virtual timing markers can also use traditional message error correction encoding to their reference timing markers. This can be generally applied or used on specific timing markers.

In still a further aspect, the present methods and apparatus may provide seamless appearing timing marker signals and timing marker resistance to radio noise interference for applications using intermittent or varying power signals. Again because virtual timing markers are relocatable messages, they can hide any periodicity from jammers by irregularly spacing the messages.

Increased Signal Content Efficiency: Because conventional methods cannot defer or overlap timing markers and most other waveforms, traditional designs must add capacity to handle anticipated worst caseloads or sometimes even add new channels. Multiple channels are constructed by sending multiplexed signals or multiple separate signals. This penalty applies even when tributaries may use few precision timing markers with sparse data content.

Whereas the presently disclosed virtual timing markers can overlap merely by moving their message positions to an available empty signal intervals or unused packet bytes so that the messages do not collide or overwrite other signal elements. Multiple unrelated virtual timing markers can target the same signal interval simultaneously while precisely representing one or more signal element contributors. Efficiency enabling features of virtual timing markers and their methods include (1) virtual timing markers are relocatable to other places on the signal where empty space is available; (2) the filling of empty spaces modality does not require adding more signal intervals or bytes because relocatable virtual timing marker messages only fill available empty space intervals or unused data bytes; (3) multiple virtual timing markers from multiple tributary signals can overlap the same small target time waveform interval on a single signal; (4) the virtual timing markers and messages can be added with little or no intrusiveness to a primary host signal in terms of using already available empty spaces and thus not altering any host physical timing markers, other signal element waveforms, or even host frequencies, modulations, or protocols.

In yet another aspect, signals having timing markers can be transmitted more efficiently by further using virtual timing marker methods to merge such signals together before transmission. Accordingly, fewer high channel capacity signals are needed. As in prior arrangements, the merged virtual timing markers and messages can be deposited where empty space already exists on a transmission used for other purposes. Easier implementations may also be engendered because virtual timing markers would only add a few bits to idle spaces. An exemplary implementation might be adding (a) a 50 bits per second GPS-like tributary (which resides on a very precise megabit per second subcarrier)—to (b) a 10,000,000 bits per second spacecraft TV broadcast transmission; achievable precision can pertain to the 10,000,000 bits per second channel and not the 50 bits per second with subcarrier. Thus, virtual timing markers and methods can reduce total hardware infrastructure and complexity as well as radio frequency, bandwidth, or channel capacity allocations.

Piggybacking on Other Purpose Signals: Virtual timing markers and messages can non-intrusively piggyback on other purpose transmissions because virtual timing markers can be compatible with the host transmission signal, frequencies, formats, and protocols. Furthermore, it less probable that there is a need (1) for additional transmitters and corresponding receivers or (2) for any FCC approval to alter a radio signal for a new frequency, higher bandwidth, or additional channel capacity.

For example, while the government has proposed positioning-navigation-and-timing alternative backups to orbiting spacecraft systems include entirely new transmissions, dedicated beacons, or inertial navigation systems, —virtual timing marker methods would enable implementers to relay or piggyback navigation signals on transmissions from aircraft, other video broadcast spacecraft, or radio towers, so that less overall dedicated transmitter-receiver-network-and-frequency allocation is required. That is, a group of signals having timing markers can piggyback on unrelated host transmissions.

Virtual timing markers can also take economic advantage of widely available gigahertz and higher integrated circuits, clocks, and options that were not available for the same traditional methods used in the past. Smaller technical challenges exist in upgrading existing systems with virtual timing markers than creating entirely new transmission infrastructures.

Terminology

Figure 2:
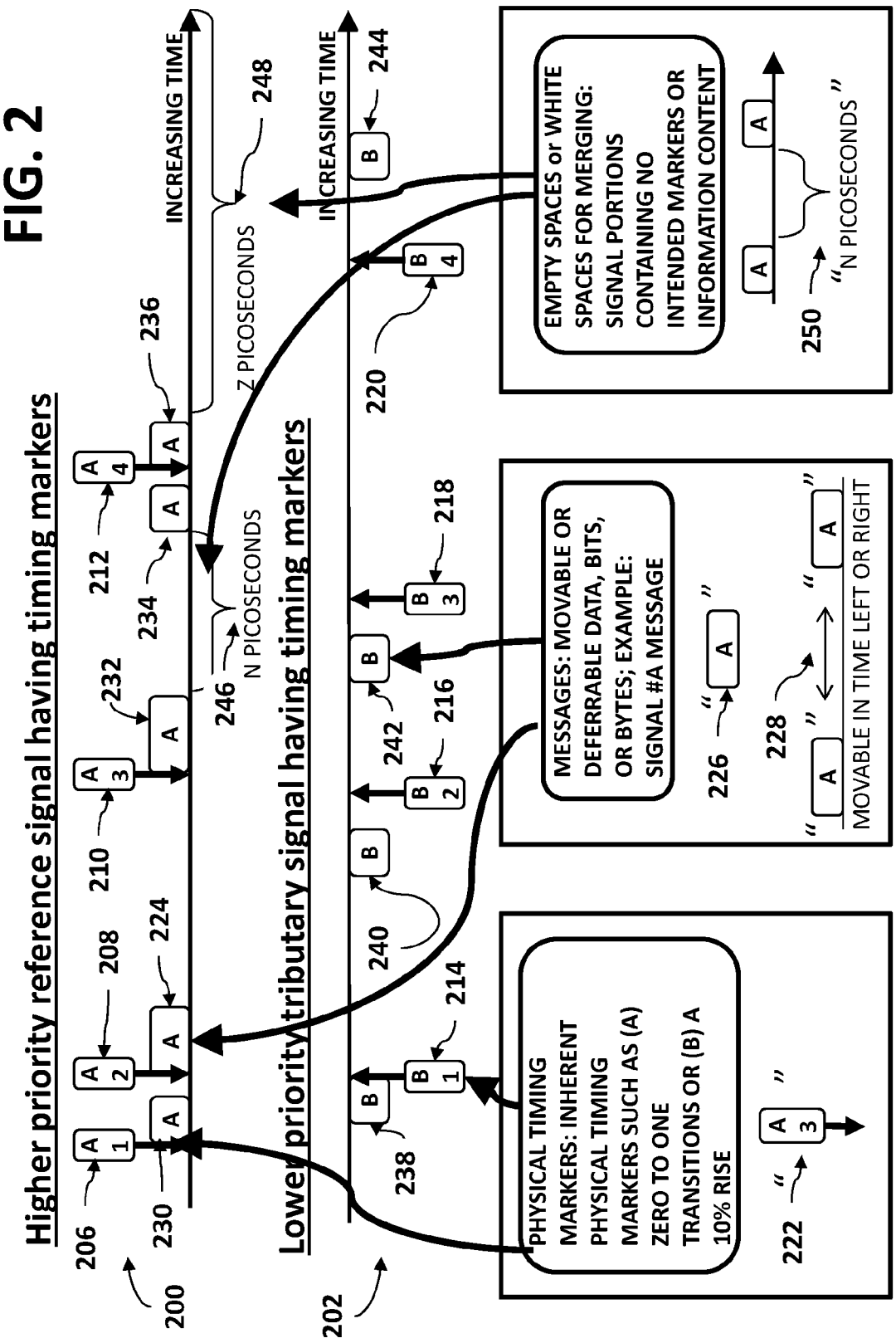
FIG. 2 illustrates terminologies that can be employed in some implementations of the present disclosure.

FIG. 2 shows a high priority reference signal (200) having timing markers and a lower priority tributary signal (202) also having timing markers. This is a configuration will be used in explaining several examples that will follow. Using these two signals and their elements, FIG. 2 illustrates some of the particular terminology used throughout the present disclosure. In particular, the terms "Physical Timing Markers", "Messages", "Empty Spaces" or "White Spaces" will be explained.

Signal Elements

For purposes of this discussion, it is first noted that the term "signal element" used herein may refer to any basic waveform that is an identifiable entity and that can appear on a signal. For example, these entities include physical timing markers, messages, or events such as start of signal or end of signal.

Physical Timing Markers

Figure 3:
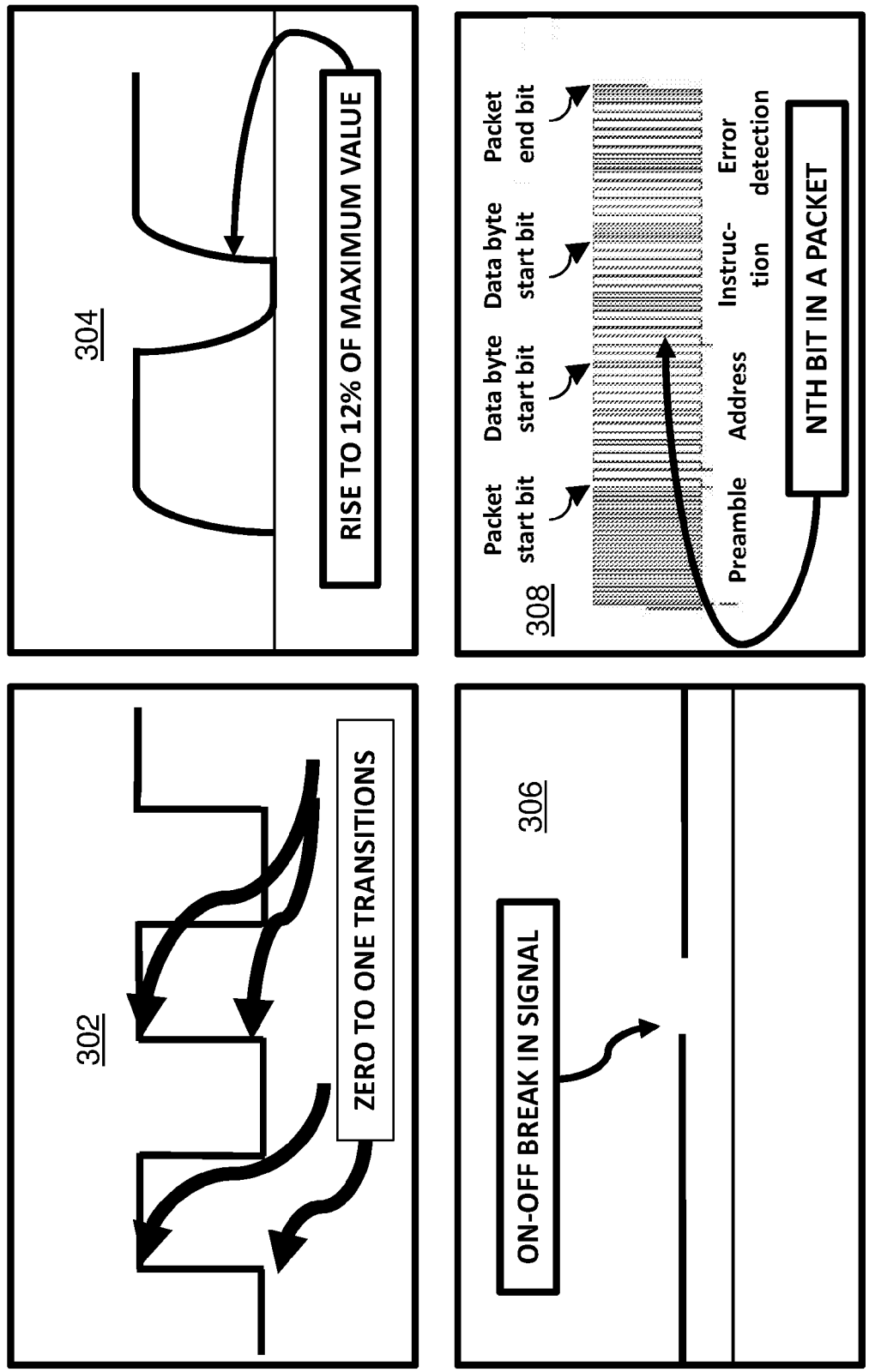
FIG. 3 illustrates examples of physical timing markers in typical transmission signals.

FIG. 3 illustrates typical examples of traditional physical timing markers. Physical timing markers are traditional types of reference points in a transmission signal which, for example, can be (a) digital transitions from zero to one as at 302; (b) an n percent rise in the signal from the minimum to maximum value as shown at 304; (c) an on-off break in the signal, as shown at 306; or (d) the nth bit of a packet as shown at 308. Other examples may include well-defined peaks, zero crossings, changes in an underlying signal carrier waveform (which will be discussed in connection with FIG. 35), or well-defined changes in an underlying carrier-less equivalent waveform, as just a few examples. Intrinsic physical timing markers, such as those in successive video frames, can also appear in signal transmissions even if they were not intended as such.

Referring back to FIG. 2, items 206, 208, 210, 212, 214, 216, 218, and 220 (as well as exemplary item 222) show the presence of physical timing markers on the timing diagrams 200 and 202. Sometimes there is an associated time of day time-stamp annotation or a pre-arranged pulse per second type of convention. Time-stamps or pulse-per-second sequences alone can be misleading if there are delay distortions due to pathway atmospheric disturbances, movements causing Doppler frequency shifts, or relativistic time effect changes. As described before, timing markers are needed to precisely discern exact transmission departures or arrival instances and, thus, distortions require additional measurements and traditional corrective calculations to be made.

Figure 4:
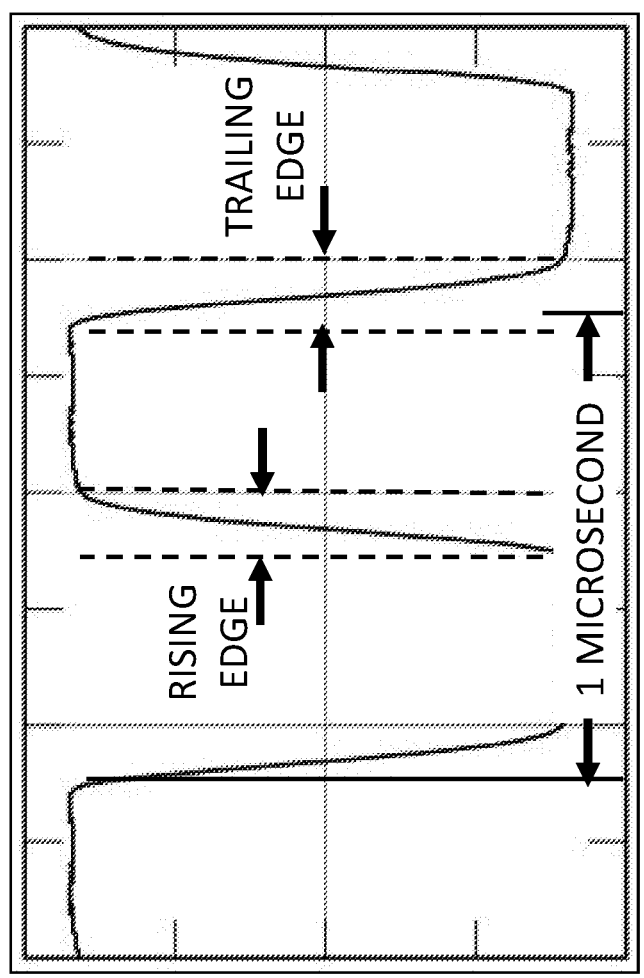
FIG. 4 illustrates an example of measuring the rise time or trailing edge of bit transitions.

FIG. 4 further illustrates a timing diagram of a signal in a conventional system where receiver clocks that synchronize with a transmitter's precision clock can commonly reduce the discerned precision to 1 percent of the signal's digital bit width. Having receiver clocks synchronize with the transmitter clocks, as an option, can enable implementers to make virtual timing markers and their references to physical timing markers more accurate and precise. By comparing the rising and trailing edges of the bit transitions, modern electronics can measure signal offset to within about one percent of a bit pulse, which is 10 nanoseconds or about 10 feet for GPS usage.

Intrinsic physical timing markers, such as those in successive video frames, can commonly appear in signal transmissions even if they were not intended as such. If there are potential situations where there may be long gaps between physical timing markers, the implementers can add physical markers periodically or when tributary timing markers must be inserted nearby. Additionally, physical timing markers can satisfy applications needing seconds, microseconds, nanoseconds, picoseconds, or even femtoseconds of accuracy and precision if the implementers use timing sources, circuitry, components, firmware, software, algorithms, methods, etc. of equal or better precision. Unlike virtual timing markers, traditional physical timing markers: (1) cannot be moved, relocated, or deferred on the signal without impacting their associated signal position and time; (2) cannot overlap waveforms without physically overwriting each other; (3) cannot be redundant for a single mark; (4) cannot resist electronic noise or lightning-like-caused gaps; and (5) cannot conceal any periodic presence from jammers.

Messages

Furthermore, it is noted that the term "messages," as used herein, may include the connotation of information content signal elements such as packets, bits, or bytes whose physical position in a signal waveform need not be precisely fixed. Added to this are signal elements, such as sections of analog waveforms that can be temporarily shifted before transmission, but also can be later time or position aligned at a receiver by associating a point of a waveform section with a precise timing marker.

Turning back to FIG. 2, items 224, 226, and 228 (as well as 230, 232, 234, 236, 238, 240, 242, and 244) are messages. The messages are relocatable and, thus, position independent in that they can be moved, deferred, or advanced to nearby positions without impact to the application (unless implementers specifically tie their new locations back to their original positions in the signal waveform, as exceptions). For purposes of the present disclosure, messages within a signal can be understood to be relocatable unless specifically stated otherwise. Messages cannot physically overlap each other or other signal elements in the same signal interval.

It is a convenient convention in this context that the messages will retain their order of sequence. Although there is the possibility of randomized sequences of messages, it is not pertinent to the immediate discussion and can be addressed by traditional methods.

Empty Spaces or White Spaces

FIG. 2 also illustrates empty spaces or white spaces (See items 246, 248, and 250), which may be defined as outgoing signal intervals having no signal elements such as timing markers, messages, or signal event content, and are thus available for being occupied by other timing markers, messages, or events. Sometimes transmission messages contain unused space in packet headers or packet data regions; for virtual timing markers and message methods, herein, this is also considered a form of "empty spaces".

Virtual Timing Markers

A virtual timing marker is a message having a concomitant displacement or time-offset as being (one of: before, after, concurrent) a target designated waveform position of the virtual timing marker relative to a different reference waveform marker position specified by either a physical timing marker or another virtual timing marker for either the same signal or an adjacent parallel signal. Virtual timing markers can replace or augment physical timing markers or other virtual timing markers. Virtual timing marker messages or separate associated message signal elements may be used to hold optional additional pertinent information.

Having receiver clocks synchronize with the transmitter clocks, as an option, may make virtual timing markers and their references to physical timing markers more accurate and precise. Unlike physical timing markers, virtual timing marker messages may be repositioned, so that they do not collide or overwrite other signal elements. Virtual timing markers may use redundant virtual timing markers, statistical methods, message error correction algorithms, or dispersion at random intervals, so they can enhance precision, better resist electronic noise or lightning-like-caused signal gaps, or better conceal themselves from jammers. Additionally, virtual timing markers may offer greater spectral efficiency. Normally multiplexing "n" sparse and precise timing signals into one cumulative signal would require a channel capacity which is the total summation of all the "n" signals' channel capacities. Since virtual timing marker methods enable designers to overlap timing markers in the same signal, the same "n" signals would require the channel capacity of only one of the signals (i.e., the one input signal needing the largest channel capacity). Sometimes channel capacity needs can also be reduced by replacing traditional physical timing markers, which use the encompassing encoded signal contour, with virtual timing markers which reference well-defined physical timing markers in an underlying signal carrier. This is because a physical timing marker in the overall encompassing coded signal requires many underlying carrier waveforms, such as a 12% rise to maximum while a physical timing marker in the underlying carrier can be made distinct merely with a detectable slight shift in its FM frequency as an example (and to be discussed later with regard to FIGS. 33, 34, and 35).

Tributary Signals

"Tributary" signals herein generally refer to two or more signals before they are merged or multiplexed into a single (usually greater capacity) signal. One exception: when discussing primary host mode where one or more signals are to be merged or multiplexed onto a signal designated as the primary host signal whose signal elements are to be preserved on a higher priority basis, the term "tributary" refers to the additional "one or more signals" but not the primary host signal.

Polling and PNT Positioning, Navigation, and Timing

Additionally, it is noted that the term "polling" may include the connotation of a technique that repeatedly and often sequentially interrogates input nodes to see if any have data to transfer. Furthermore, the term positioning, navigation, and timing signal (PNT) may include a definition of a signal contributing to a combination of three distinct, constituent capabilities. That is, the capabilities are (1) positioning, which is the ability to accurately and precisely determine one's location and orientation referenced to a coordinate system; (2) navigation, which is the ability to determine current and desired position (relative or absolute) and apply corrections to course, orientation, and speed to attain a desired position; and (3) timing, which is the ability to acquire and maintain accurate and precise time from a standard and within user-defined timeliness parameters. It is noted that timing includes time transfer.

Other Terminology

The term "virtual timing marker message" as used herein may be equivalent to a virtual timing marker. It is noted that the term a virtual timing marker, which has already been described herein as a message, and the term "virtual timing marker message" merely emphasizes that the virtual timing marker has a message format.

It is further noted that the term "primary host mode" may be defined to mean a signal element forming or placing mode where virtual timing markers can be assumed to reference physical timing markers on either (1) their own host signal or (2) another signal—whereas in the subset "filling empty spaces on a time reference signal mode" virtual timing markers limit references to physical timing markers residing only on their own host signal (Explained in greater detail below in the specification).

A Quick Look at Primary Host Mode for Merging Timing Signals by Using Virtual Timing Markers Primary Host Mode preserves and uses one selected signal as an unmodified signal template for output while other tributary input signal elements are inserted in any available empty spaces at lower priorities than all the primary host signal elements. In that way the signal element positions of the primary template are preserved, and any tributary signal element positions are the ones subject to change or deferral. When a tributary physical timing marker arrives, it is assigned a lower priority and cannot overwrite any primary host template signal elements. Thus it may be necessary to defer the physical timing marker and thus convert it into a virtual timing marker as a message onto any available empty space on the primary host signal image.

The signal forming logic uses pertinent input information to schedule, queue, or directly insert the signal elements onto an outgoing combined signal on a priority basis. The logic has discretion and control over the sequence and timing of outgoing signal elements on the transmission. This is especially useful when there are only internally generated signals, no other input signals, and the signal forming logic is creating the signal anew.

Figure 5:
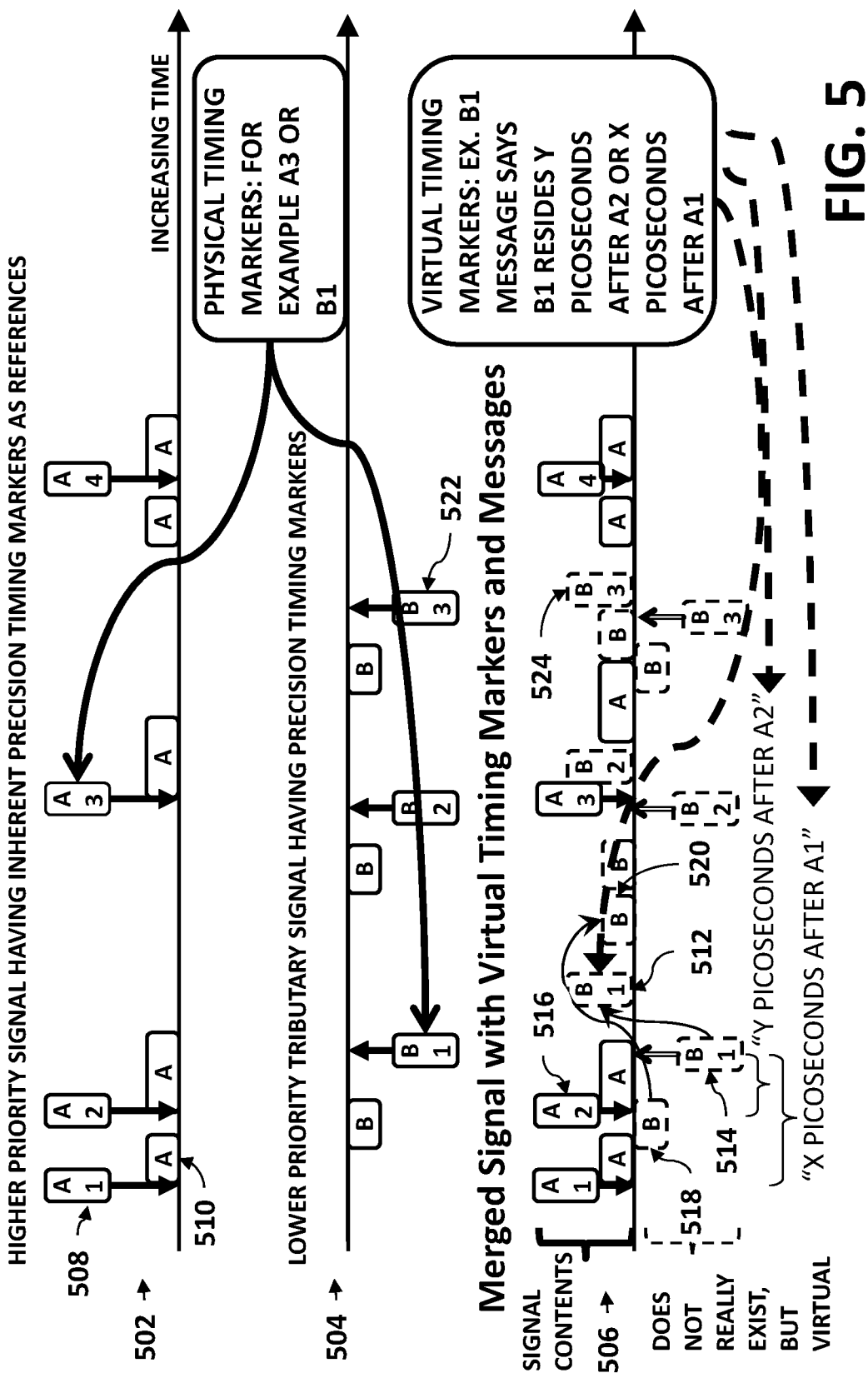
FIG. 5 illustrates an example of Virtual Timing Markers used in the merging or forming of signals according to an aspect.

FIG. 5 illustrates an example of virtual timing markers used in the merging of signals which have physical timing markers. As may be seen in FIG. 5, two input signals shown at 502 and 504 are merged into one signal 506. A higher priority signal 502 including Signal A contains physical timing markers such as A1 (508), as well as relocatable messages which are illustrated with rounded rectangles containing an A, such as item 510. The lower priority signal 504 including Signal B becomes a tributary to the final merged signal 506 at the bottom timeline. As item 512, the B1 timing marker, formerly an item 514 physical timing marker becomes a deferred virtual timing marker message which says that the item 512 B1 virtual timing marker is really targeted Y picoseconds after the item 516 A2 physical marker. The item 514 B1 virtual timing marker message cannot overlay any prior existing elements of Signal-A, so B1 is placed further downstream in the signal as item 512 as shown. (Alternatively this B1 virtual timing marker could have been messaged as being X picoseconds after A1.)

A B message at reference 518 is slightly delayed to the new position at item 520 when sufficient empty space is available for signal element insertion. FIG. 5 also shows that the B3 tributary timing marker as item 522 is also converted into a virtual timing marker on the merged signal and resides slightly later in another empty space interval as item 524 as a virtual timing marker message.

Primary Host and First-Come-First-Served Modes

It is noted that in other aspects, various signal modes are contemplated including a Priority Host Signal Mode, a First-Come-First-Served Signal Mode, and a Priority Preference Signal Mode. Generally speaking, most signals have some idle intervals or empty spaces. When the signal contains packets, often packet headers or packets contain empty, unused fields. Virtual timing markers are messages that indicate their targeted offsets to nearby physical timing markers which usually reside in an outgoing transmission signal. Because virtual timing markers are relocatable, they can be placed to avoid overwriting other elements in the signal.

When merging signal elements from multiple signals, one input signal can be initially used as a template signal where the other tributary signal elements are placed only on its empty spaces. This is termed herein as a Primary Host Signal Mode or Primary Host Mode. Any other input signals or newly created signal elements (which are to be merged) are used as tributaries having lower priority signal elements. It may be necessary for some or all tributary physical timing markers to be converted into virtual timing markers to avoid overwriting other signal elements.

Further, both the Primary Host Mode and another "Filling-Empty-Spaces-On-A-Time-Reference-Signal Mode" place virtual timing markers or other tributary signal elements on empty spaces of the Primary Host Signal. The Primary Host mode, however, can optionally use a host signal or a separate signal for physical timing marker references, whereas, the Filling-Empty-Spaces-On-A-Time-Reference-Signal Mode only uses a host signal for physical timing marker references. Moreover, the Filling-Empty-Spaces-On-A-Time-Reference-Signal Mode creates, transfers, converts, augments, or merges tributary signals or signal elements into empty spaces on outgoing signals having some physical timing markers. This process can place timing markers, messages, or events onto empty spaces unclaimed by Primary Host signal elements in an output signal, and can include substituting or augmenting tributary physical timing markers with virtual timing markers and messages. If a selected output primary host reference signal has physical timing marker voids, it may be necessary to inject additional precision timing markers in empty spaces to provide adequate continuity.

Figure 6:
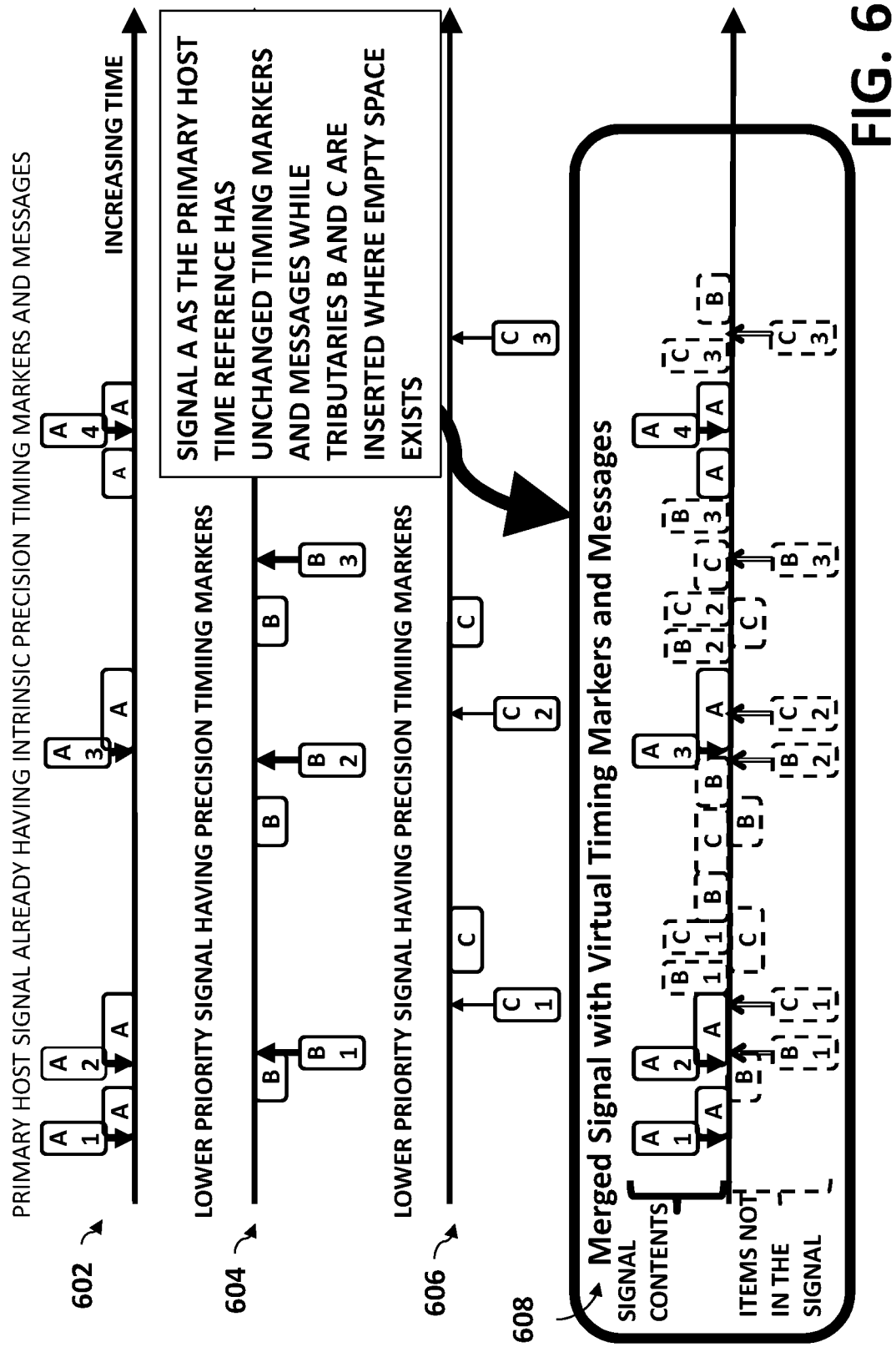
FIG. 6 illustrates an example of filling empty spaces on a timing reference signal mode using a primary host signal according to an aspect.

Filling Empty Spaces on a Time Reference Signal Mode Using a Primary Host Signal FIG. 6 illustrates an exemplary Filling-Empty-Spaces-On-A-Time-Reference-Signal Mode using a Primary Host Signal. As illustrated, FIG. 6 includes a Signal A 602 on a time line, where Signal A is a primary host signal already having intrinsic precision timing markers and messages which will not be relocated. A lower priority Signal B 604 includes tributary signal elements B and a Signal C 606 also with tributary signal elements C, where the signal elements of B and C are inserted where empty space exists on Signal A 602. The merged signal resulting from the merger of Signals A, B, and C on a common time line may be seen at 608 including the virtual timing markers and messages.

An Apparatus or System for Transmission and Reception

Figure 7:
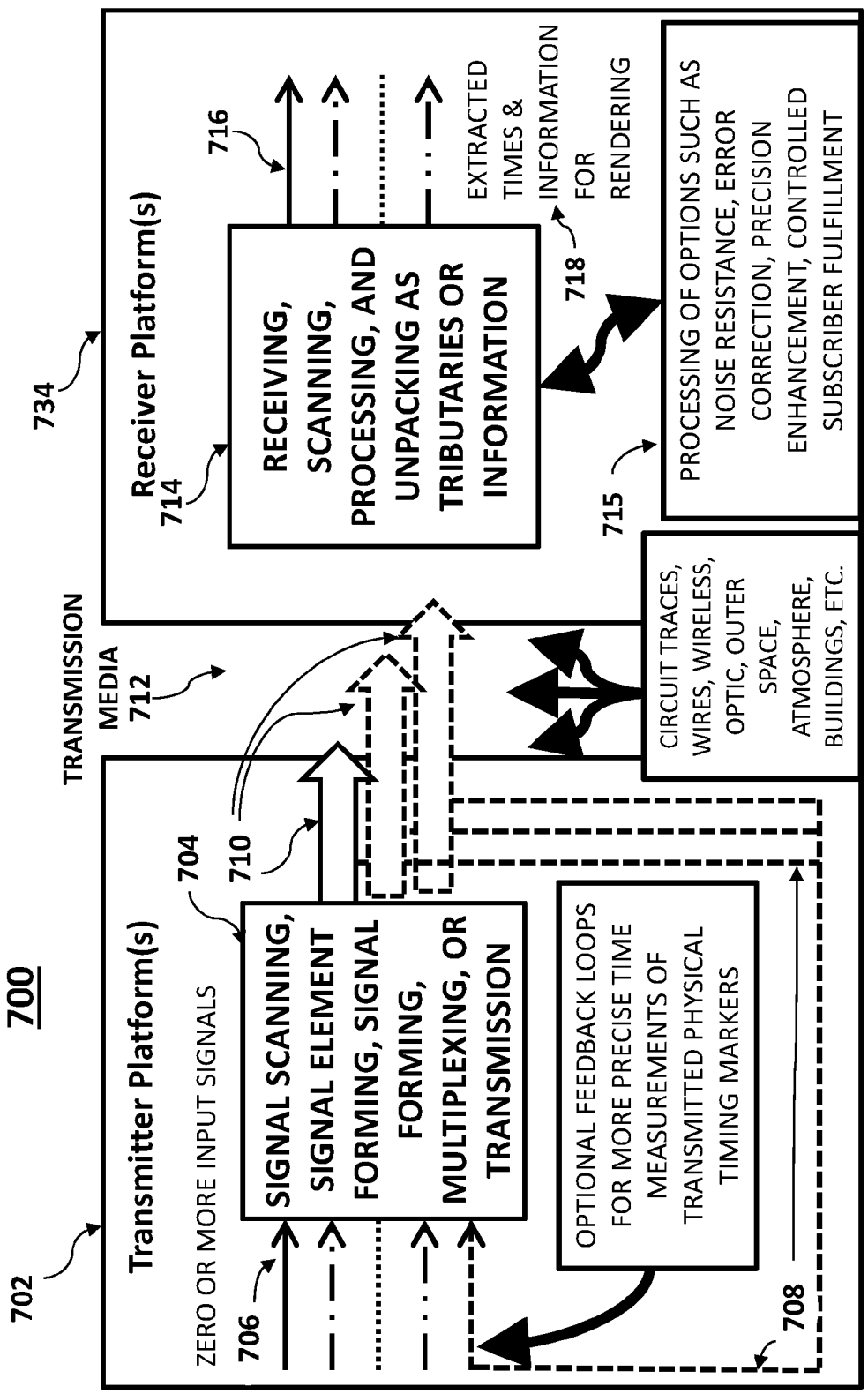
FIG. 7 illustrates the creation and transmission of signals having virtual timing markers from a transmitter platform to corresponding downstream receiver platform(s) processing the signals according to an aspect.

FIG. 7 illustrates an apparatus or system and the handing of signal elements and virtual timing marker signals with transmitter and receiver platforms. The apparatus or system 700 includes transmission and later downstream reception as well as optional (1) unpacking of signals or tributaries or (2) rendering of times-and-information. A transmitter platform 702 includes a processing element 704 configured for signal scanning, signal element forming, signal forming, multiplexing, or transmission of various input signals or signal elements 706. At item 706, there can be one or more signal inputs: signals with information or timing, time reference signals, or sources of internally generated signal elements for transmission. At item 704, scanning subsystems (a) detect signal elements of inputs, (b) measure signal element parameters, (c) time-tag timing markers, or (d) save this information in temporary storage areas. The storage areas may contain information such as timing markers, messages, signal events, element identification, locations, or schedules. Unit 704 also includes signal element forming subsystems which may create, generate, transfer, convert, replicate, disregard, or augment signal elements with optional features and especially convert some or all tributary physical timing markers into virtual timing markers. Signal forming subsystems may: (a) schedule, sequence, transfer, merge, format, or insert signal elements for output using priority host mode, first-come-first-served mode, priority preference mode, or other methods, (b) update signals, or (c) update temporary storage area contents; this can include formation or updating of virtual timing markers. Further, any inputs 706 may be simultaneously scanned for relevant signal elements such as timing markers, messages, empty spaces, events, etc. It is noted that element 704 may include one or more of a digital signal processor (DSP), microprocessor, wireless modem, wired modem, RF circuitry, multiplexer logic, encoder, modulator, or any other element for signal forming or transmission over wired, wireless, or optical media. Other signal elements may be generated by element 704. Forming or merging logic in element 704 may also determine the order in which the output transmission signal elements occur. Other tributaries may then be merged by putting their signal elements into empty spaces of the primary host signal, such as was illustrated in FIG. 6. One or more of final signal preparation subsystems can update virtual timing markers, modulate signals, encrypt signals, merge signals, multiplex signals, amplify signals, internally feedback signals to the input scanning subsystems as well as send or transmit signals. Further, at reference 708, optional feedback loops can be used to measure the outgoing times of physical timing markers so that other incoming signal timing markers can be more precisely compared with them; the result at receivers can be more exacting time-offsets In an aspect, the transmitter in 704 transmits one or more signals 710 to corresponding receiver platforms 734 via various transmission media 712. As shown by signals 710, the transmissions can be one or more short or long distance signals. The signals can cross a single medium or succession of one or more transmission media 712 such as circuit traces, wire, wireless-media, vacuum, atmosphere, outer space, water, ground, satellite communications links, or buildings; travel distances can be millimeters to millions of miles.

The receiver platform 734 receives the various signals 710 over the media 712 at a receiving portion or element 714. Each such receiver platform 734 can (a) receive transmission(s), (b) separate a transmission into individual signals, (c) process the signals, (d) forward the signals, or (e) extract only pertinent timing and information content. Item 714 receiver processing subsystems may include one or more of input time reference signals which may have timing markers, one or more of precision timing sources, clocks, counters, and one or more subsystems for processing. Processing in element 714 can include detection, signal receiving, noise rejection, signal distortion correction, decoding, demodulation, tuning, anti-jamming methods, anti-spoofing tactics, filtering, amplification, decryption, unpacking, demultiplexing, demerging, signal content separation, signal scanning, measurements, time-tagging, converting signal elements to binary values, signal element extraction, signal element classification, temporary storage or buffering, etc. Item 714 includes one or more temporary storage areas for input or optionally planned output signal element information such as timing markers, messages, signal events, times, element identification, location, or schedules. Furthermore, item 715 details the processing to include options such as noise resistance, error detection and correction, precision enhancement, or subscriber access fulfillment by encryption. Portion 714 may also separate the received signal(s) back into individual signals as indicated by element 716, as well as item 718 directly extracted timing and information for rendering. It is also noted that transmitter 702 or receiver 734 platforms may be stationary or moving.

As mentioned earlier, the implementers of each application may determine whether any of the signals has ample, adequately and uniformly distributed physical precision timing markers, where any such signal could be the primary host input signal template which would be used as the fundamental outgoing transmission signal. If there are gaps in the chosen primary host signal, it may be necessary to generate gap-filling physical timing markers. All other inputs may require some or all of their own physical timing markers to be converted into virtual timing markers with offsets to physical timing markers in the outgoing transmission signal.

Enabling Overlapping of Timing Markers

Figure 8:
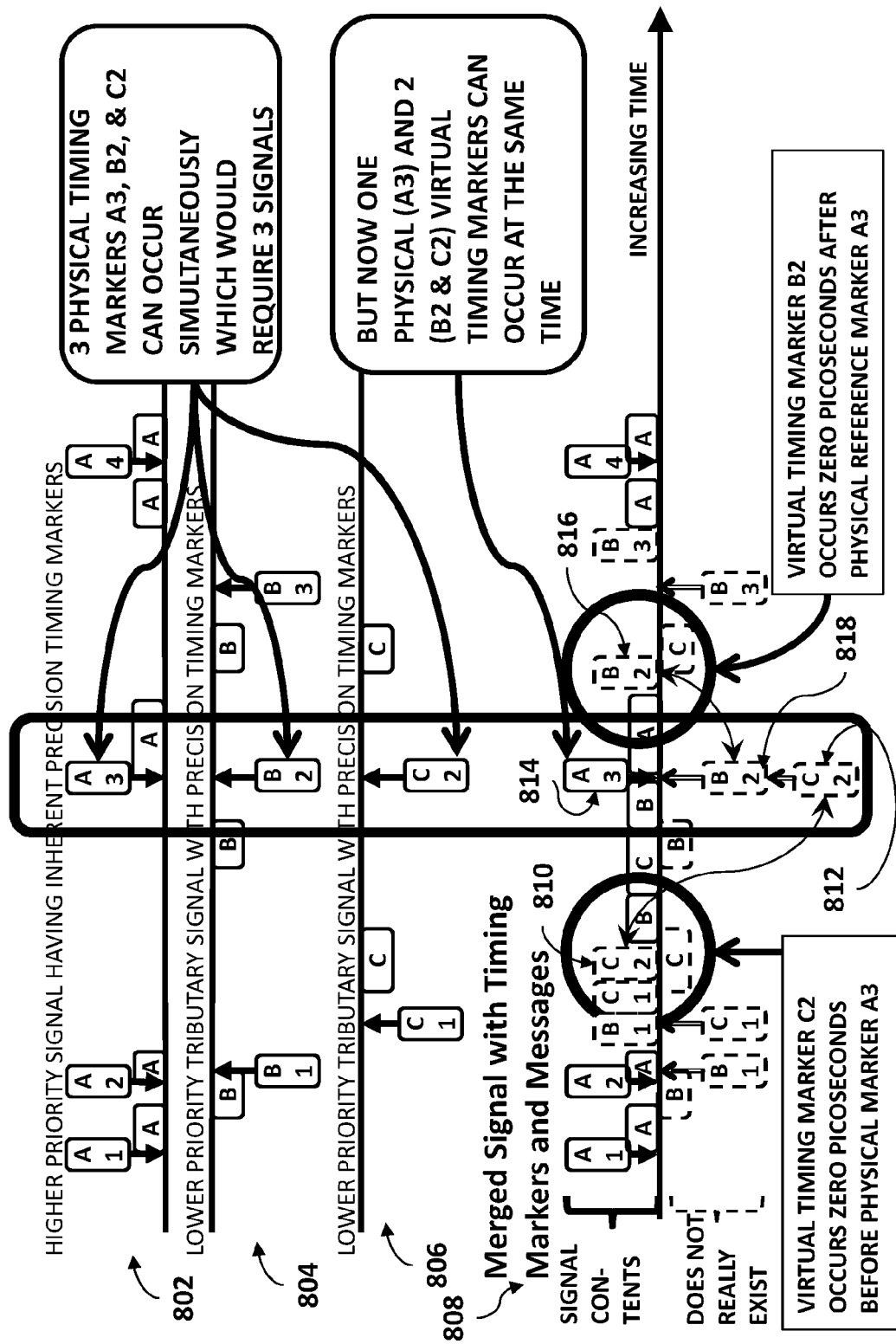
FIG. 8 illustrates overlapping timing markers in a single signal by using primary host mode and virtual timing markers

FIG. 8 illustrates the overlapping of multiple virtual timing markers on a same signal interval. It is noted that FIG. 8, in particular, is an example of Primary Host Signal mode where one signal acts as a host template. Tributary signal elements are inserted on a priority preference basis into "empty spaces" on the host template.

As illustrated, there are three input signals 802, 804, and 806 merging into one signal 808. A first Signal A 802 is being used as a primary host signal with intrinsic reference physical timing markers. When timing markers from a Signal B 804 and a Signal C 806 are merged onto the combined Signal 808, there is always the possibility that their timing markers may occasionally overlap each other.

Additionally in FIG. 8, reference 810 illustrates a virtual timing marker C2 having targeted item 812, a no-longer-physically-present timing marker located zero picoseconds before reference physical marker A3 814, and likewise B2 816 has become a virtual timing marker message targeting a no-longer-physically-present timing marker 818 at zero picoseconds after reference physical timing marker A3 814.

Primary Host Mode Preserves Timing Marker Sequences

Figure 9:
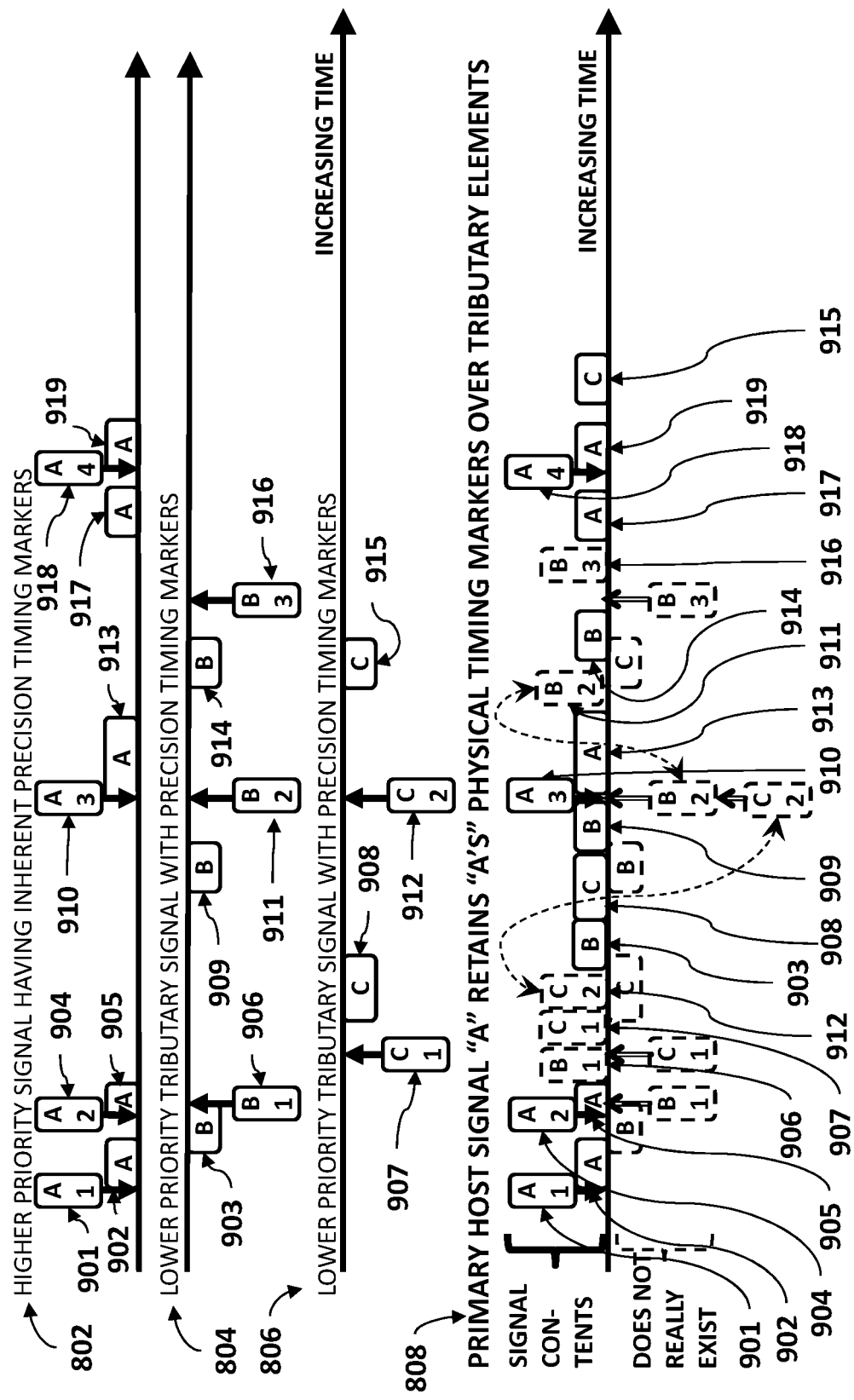
FIG. 9 shows exemplary merged and resequenced timing markers and other signal elements in Primary Host Mode

FIG. 9 illustrates another example of primary host mode merging which preserves timing marker sequences. Similar to preceding FIG. 8, Signal A 802, Signal B 804, and Signal C 806 are merged into a Signal 808. Additional items 901 through 919, sequentially, correspond to the order in which the signal elements would be originally received by scanners simultaneously looking at the three signals 802, 804, 806 (Note: the left to right numbering along the time line follows a "first-come-first-served" sequence). FIG. 9 also shows that the merged signals 808 have a slightly altered ordering of the numbered items 901 through 919. For example, item 912, which is a C2 virtual timing marker, has been inserted much earlier while item 911, a B2 virtual timing marker, has been inserted much later. As another example, the item 915 message C arrives much later than the item 918 marker A4, which is a primary host timing marker, in order to help preserve the priority or position of marker A4 918. It is also noted that merged signal 808 preserves the position of all Signal A physical timing markers (marker A1 (901), marker A2 (904), marker A3 (910), and marker A4 (918)), whereas the timing markers of the tributaries (marker B1 (906), marker C1 (907), marker B2 (911), marker C2 (912), and marker B3 (916)) are delayed, deferred, or advanced.

First-Come-First-Served Merging Preserves Timing Marker Sequences

Figure 10:
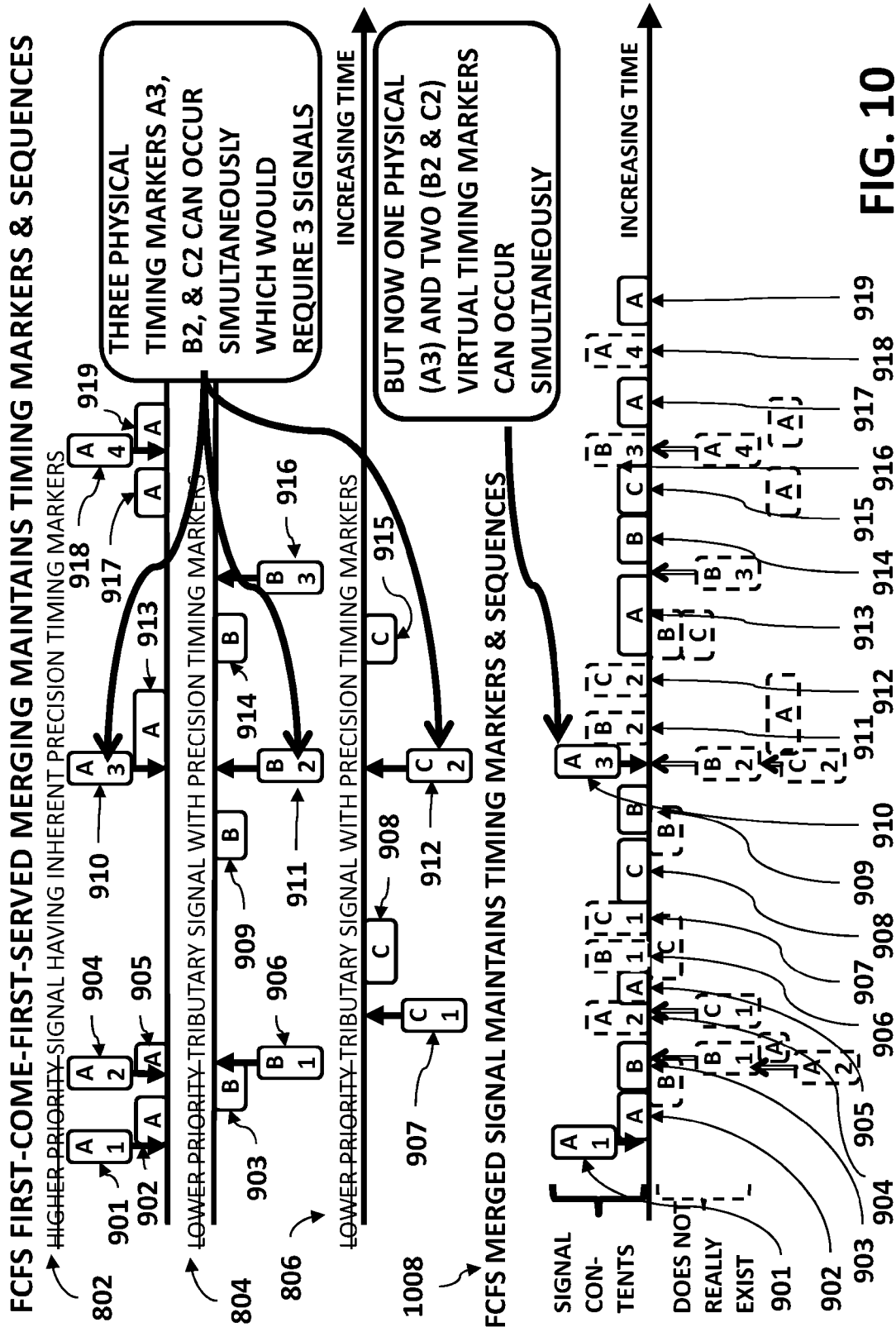
FIG. 10 shows exemplary merged and resequenced timing markers and other signal elements in First-Come-First-Served mode.

FIG. 10 presents a First-Come-First-Served (FCFS) mode in merging the same incoming signal elements. Signal elements in this example are chosen for insertion on a first-come-first-served basis. Note that this particular example assumes that the three signals are examined simultaneously as they arrive, but when elements occur at the same time, the signal elements are addressed in top to bottom order in one aspect, but also variations such as bottom to top can also be implemented in at least one other aspect. It is further noted that the final output signal can still render the aforementioned three simultaneous timing markers A3, B2, and C2 (items 910, 911, and 912). Note that the merged signal 1008 at the bottom of FIG. 10 shows that the numerical ordering (items 901 through 919) of the incoming signal elements (items 901 through 919) has been retained. This implementation causes both item 904 A2 and item 918 A4 to become virtual timing markers whereas the primary host mode illustrated in FIG. 9 retained them as physical timing markers.

Comparing the Results of First-Come-First-Served (FCFS) Versus Primary Host Mode FIG. 11 is a visual comparison to summarize the output signals of FIG. 10 First-Come-First-Served (FCFS) and FIG. 9 Primary Host Mode. As stated earlier, the numbers 901 through 919 indicates the final positions of the original corresponding incoming items 901 through 919. Primary Host signal mode will probably shift some tributary signal elements.

Priority Preference Mode

In "Priority Preference Mode", input signal scanners poll multiple signal inputs and assign each signal element a priority according to its identified signal element type such as: (1) highest for physical timing markers, (2) next highest for signal events such as signal start or break in signal, (3)

middle for virtual timing markers, and (4) lowest for other signal elements such as messages. When there is no signal element already being inserted on the output signal, the highest priority waiting and ready signal element will be selected as the next item for insertion on the output signal. When a signal element is already in the process of being inserted on the output signal, other ready signal elements will be deferred until the output signal becomes available and the elements individually have the highest priority amongst the waiting contenders. When a timing marker is deferred, it may be necessary to convert the timing marker into a virtual timing marker. (See also later discussion of FIG. 30).

Differences in the Handling of Incoming Signals and Signal Elements for Merging into an Output Signal The three modes described above are, thus, Priority Host Mode (or "Filling-Empty-Spaces-On-A-Time-Reference-Signal Mode"), the First-Come-First-Served (FCFS) Mode, and the Priority Preference Mode. The Primary Host Mode can have different underlying modes for the tributary signals (i.e., First-Come-First-Served or Priority Preference as an underlying mode of the Primary Host Mode). The following Table 1 below illustrates the various relationships between a chosen mode (i.e., Priority Host Mode (or "Filling-Empty-Spaces-On-A-Time-Reference-Signal Mode"), First-Come-First-Served (FCFS) Mode, or Priority Preference Mode), any primary host signal, and the possible corresponding tributary signal treatments, of which only two have been so far discussed in detail, but further alternatives or options are not precluded for each of the particular choices.

signal elements have a higher priority than any tributary signal elements and thus all primary host signal elements do not change their position in the signal. That is, in Primary Host Signal Mode, the Primary Host signal elements and positions are maintained while the tributary signal elements are inserted in the "empty spaces." The tributary signals for this mode have at least two implementation choices. In the first alternative, which is a First-Come-First-Served basis for tributary signals, all tributary signal elements have lower priority than the Primary Host signal elements. Signal elements from any tributaries are inserted in empty spaces of a Primary Host Signal image on a first-come-first-served basis.

In the second alternative for a chosen Priority host mode, a priority preference basis is assigned for the tributary signals. That is, all tributary signal elements will have lower priority than the Primary Host signal elements. Signal elements from any tributaries are inserted in empty spaces of a Primary Host Signal image (a) first, on a highest priority basis (within a short "viewable" time window), and (b) in cases of simultaneous arrivals at equal priority, on a first-come-first-served basis.

For the second mode choice (Choice #2) indicated in Table 1 (i.e., a First-Come-First-Served Mode), all signals are handled on a First-Come-First-Served basis. Here, Signal elements from any input signal are inserted on a first-come-first-served basis.

Finally, for the third mode choice (i.e., Choice #3), which is the Priority Preference Mode, all signals are handled on a Priority Preference basis. Thus, signal elements from any

TABLE 1

| CHOSEN MODE | PRIMARY HOST SIGNAL | TRIBUTARY SIGNALS CAN BE HANDLED WITH 2 DIFFERENT ALTERNATIVES | |
|---|---|---|---|
| Choice #1: Primary host mode or "filling-empty-spaces-on-a-time-reference-signal mode" | Primary host only All host signal elements are higher priority than any tributary signal elements. The primary host signal image of signal elements is maintained and tributary signal elements are inserted in "empty spaces". | Alternative #1 First-come-first-served 1) All tributary signal elements have lower priority than primary host signal elements 2) Signal elements from any tributaries are inserted in empty spaces of a primary host signal image on a first-come-first-served basis | Alternative #2 Priority preference 1) All tributary signal elements have lower priority than primary host signal elements 2) Signal elements from tributaries are inserted in empty spaces of a primary host signal image (a) first, on a highest priority basis (within a short "viewable" time window) and (b) in cases of simultaneous arrivals at equal priority, on a first-come-first-served basis |
| Choice #2: First-come-first-served mode | Not applicable | Signal elements from any input signal are inserted on a first-come-first-served basis | Not applicable |
| Choice #3: Priority preference mode | Not applicable | Not applicable | Signal elements from any input signal are inserted (a) first, on a highest priority basis (within a short "viewable" time window), and (b) in cases of simultaneous arrivals within the window at equal priority, on first-come-first-served basis |
| Choice #n: . . . | Not applicable | TBD | TBD |

As may be seen in Table 1, a first chosen mode (Choice #1) may include a Primary Host Mode or "Filling-Empty-Spaces-On-A-Time-Reference-Signal Mode." Here all host input signal are inserted first, on a highest priority basis (within a short "viewable" time window), and, in cases of simultaneous arrivals within the window at equal priority, on a first-come-first-served basis. It is also noted that other choices are envisioned as indicated by the final row of Table 1 showing "Choice "n"."

All of the above modes use virtual timing marker methods to "merge" signal elements into a single signal instead of multiplexing such signals together (e.g., time division multiplexing, frequency division multiplexing, code division multiplexing, etc.). With such modes, designers can multiplex some electronic signals together either before or after merging, but merging such signals before multiplexing, to be discussed later, and has advantages such as a lower overall channel capacity requirement.

Methods when Multiplexing

In further aspects, it is possible that, when adding signals having timing markers, implementers will need additional signal channel capacity or will want to avoid altering a primary transmission signal to avoid dealing with conflicts across organizational boundaries. In such cases traditional multiplexing is an option, but the potential cost may be significantly enlarged channel capacity or a corresponding request to widen their governmental FCC frequency band allocation.

As part of virtual timing marker methods, it is recommended that implementers consider merging most or all signals having timing markers while converting to virtual timing markers before any multiplexing, so the final result can require less channel capacity over solely multiplexing.

High precision timing markers often need sufficiently high bandwidth or channel capacity to provide precision time interval discernment. As an example, instead of multiplexing 5 high-channel-capacity signals together which requires the sum of all 5 capacities, multiplexing can be reduced to one high channel capacity signal by merging the other signals with virtual timing markers which reference the high channel capacity signal. Time division multiplexing or frequency division multiplexing may be preferable to CDMA in an aspect.

Figure 12:
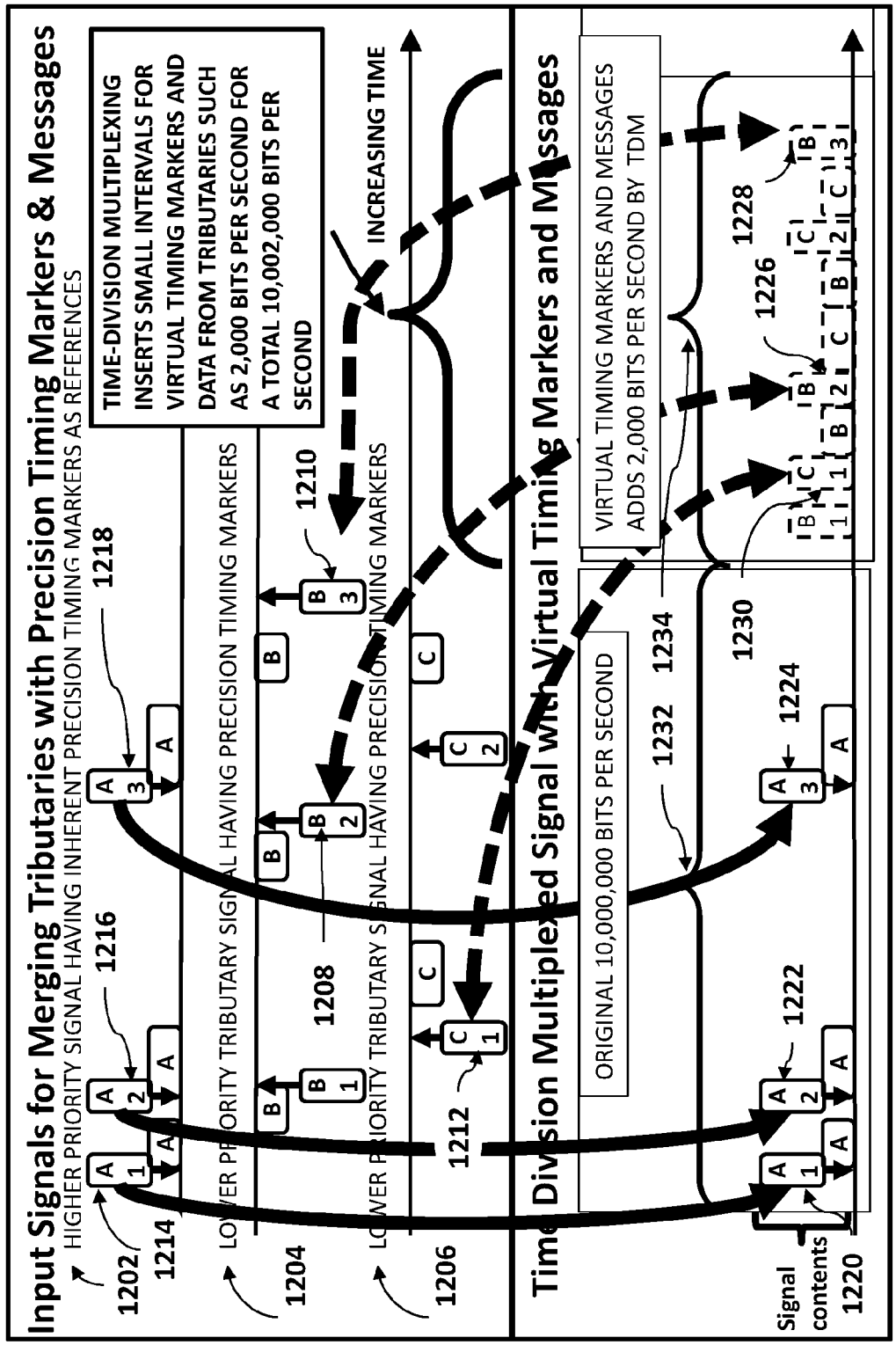
FIG. 12 illustrates an example of merging two signals having virtual timing markers before Time Division Multiplexing of the signals onto a third signal.
Figure 13:
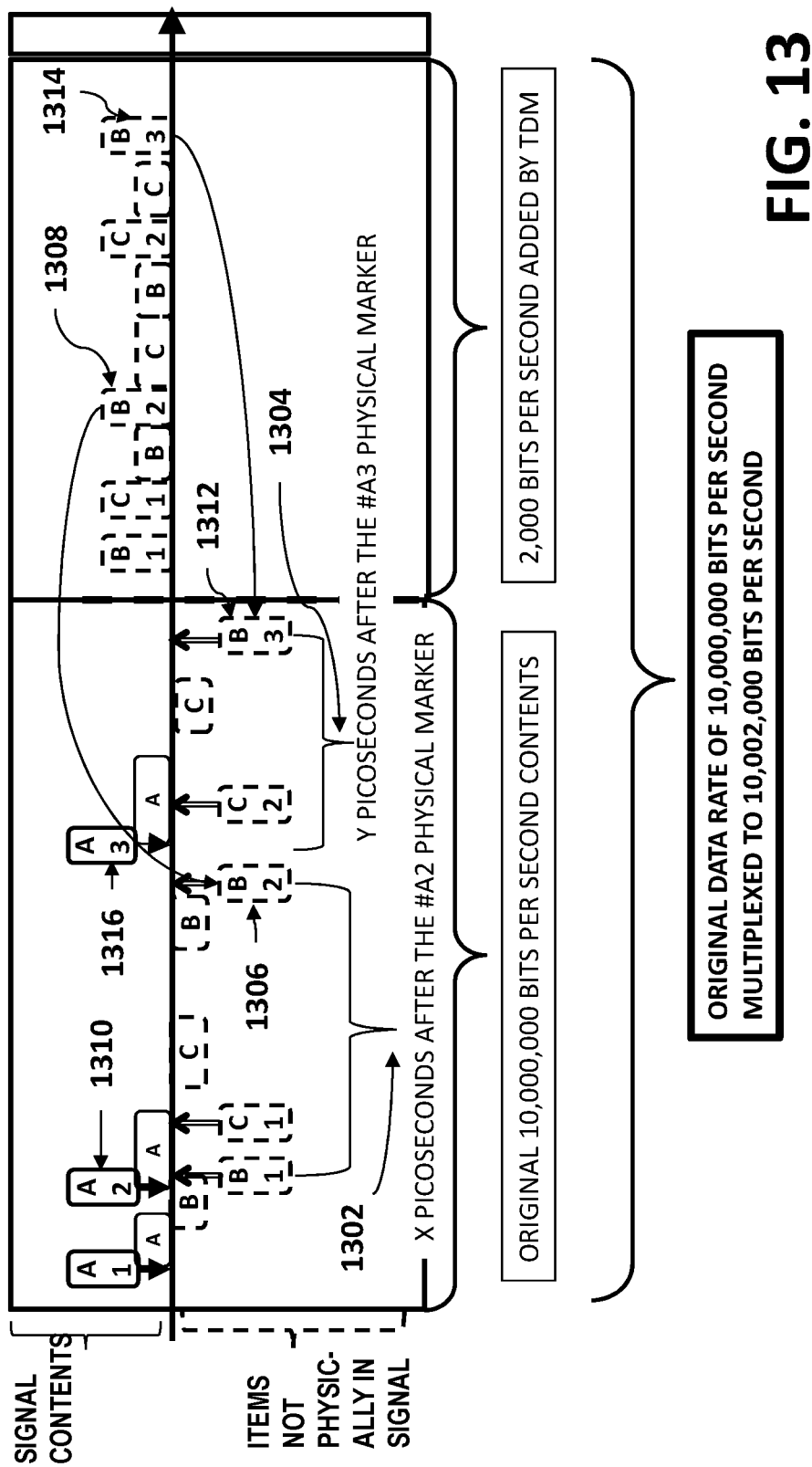
FIG. 13 illustrates additional results of merging two signals having virtual timing markers before Time Division Multiplexing of the signals onto a third signal.

FIGS. 12 and 13 provide example views of merging two lower priority signals B and C and then time division multiplexing them with a higher priority host signal A.

In FIG. 12, for example, reference 1202 is a Signal A, which is a high channel capacity signal such as a video signal at 10,000,000 bits per second. References 1204 and 1206 denote respective Signals B and C having precision timing markers, but sparse content. These signals could represent the typical real-time portion of a positioning-navigation-and-timing signal from a GPS orbiting spacecraft with rates around 50 bits per second. (Note: Such GPS signals still require the precision and channel capacity provided only by a multi-megabit per second carrier or carrier-less equivalent). Furthermore in this example, 2000 bits per second are safe maximum windows to accommodate B and C virtual timing markers and associated messages. Signal A 1202 will be time division multiplexed to increase the required channel capacity from 10,000,000 to 10,002,000 bits per second. So Signal B and Signal C will now alternatively use the precision provided by Signal A.

The two tributary signals B and C (1204, 1206) have physical timing markers such as items 1208, 1210, and 1212, respectively labeled B2, B3, and C1. The original Signal A timing markers A1, A2, and A3 at items 1214, 1216, and 1218 are replicated on the multiplexed signal as items 1220, 1222, and 1224. While the original Signal B and C physical timing markers B2, B3, and C1 (1208, 1210, and 1212) are converted to virtual timing markers and replicated as items 1226, 1228, and 1230. Notice at time interval 1232 the original Signal A over a time interval remains the same, but over time interval 1234, Signals B and C have become messages over a short interval of 2000 bits.

FIG. 13 illustrates the same system as that shown in FIG. 12. A difference, however, is that additional information is shown at items 1302 and 1304. Reference 1302 indicates that the virtual timing marker B2 (1306 or 1308) refers to "Signal A" physical timing marker A2 (1310) with the item 1306 or 1308 B2 timing marker being "x" picoseconds after the A2 physical marker. Similarly reference 1304 indicates that the virtual timing marker B3 as item 1312 or 1314 refers to Signal A physical timing marker A3 at item 1316, with the item 1314 B3 timing marker being "y" picoseconds after the A3 physical marker at 1316.

Figure 14:
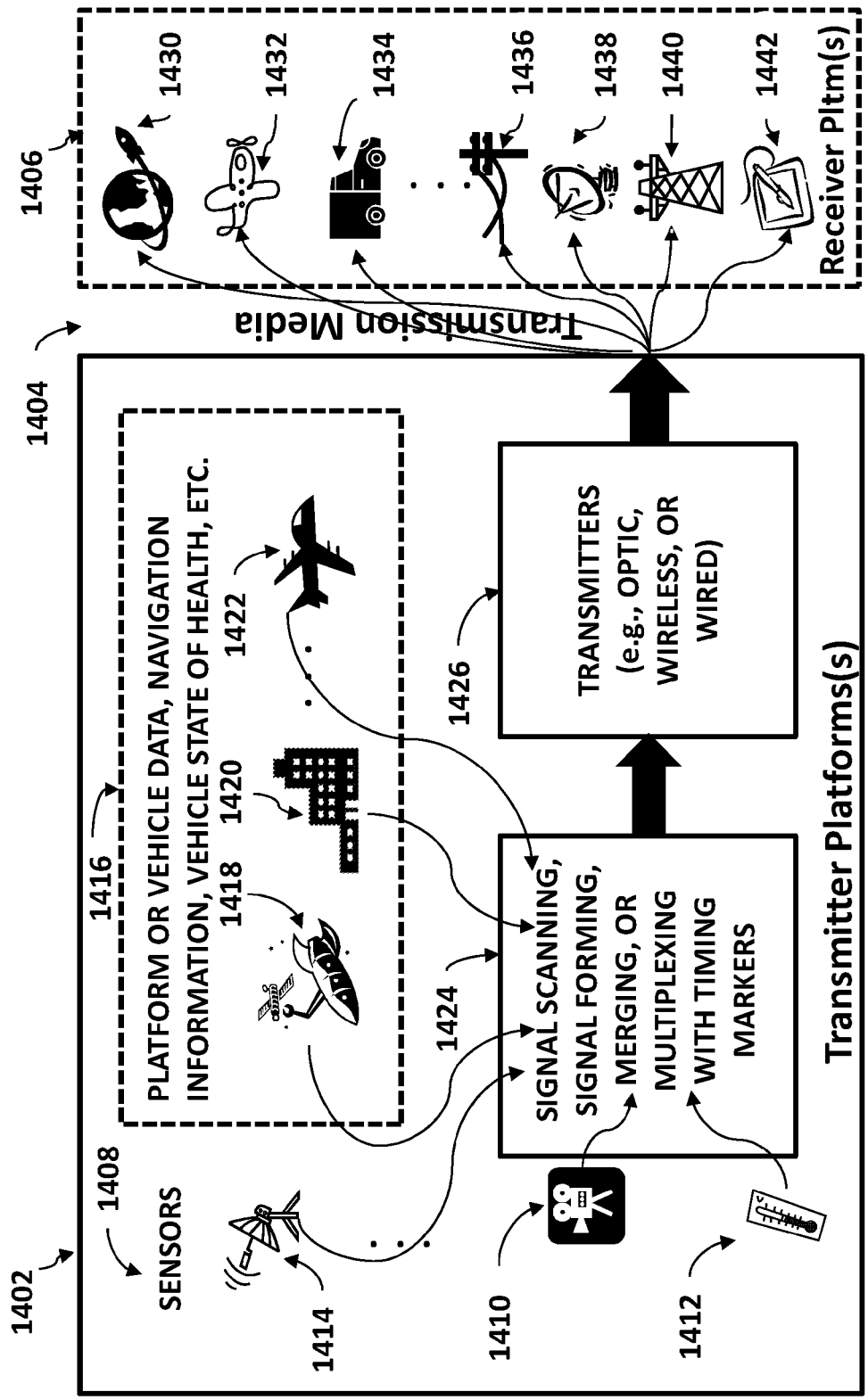
FIG. 14 illustrates an apparatus according to the present disclosure including a transmitter platform(s) forming, merging, multiplexing, or transmitting signals having virtual timing markers and receivers separating these signals or extracting content.

A General System of Transmission Platforms and Receiving Platforms Using Virtual Timing Marker Methods The FIG. 14 layout is very similar to that of aforementioned FIG. 7. FIG. 14 shows an apparatus according to the present disclosure including a general overview of transmitter platforms and corresponding receiver platforms. As illustrated, one or more transmitter platforms 1402 are provided for forming, merging, or multiplexing signals having timing markers for transmission over various transmission media 1404 to one or more receiver platforms 1406.

The stationary or mobile transmitter platform(s) 1402 may include various components such as sensors 1408, cameras 1410, temperature inputs 1412, or other types of signal originators 1414, such as GPS antennae. Additionally, the transmitter platform 1402 may include platform frameworks 1416 such as 1418, 1420, 1422 providing data, navigation information, vehicle state of health, etc. Each of the inputs may be received at a consolidating unit 1424 that performs signal scanning, forming, merging, or multiplexing for signals with timing markers. Furthermore, platform 1402 can have a transmit portion 1426 including one or more transmitters including, but not limited to, optical, wireless, or wired transmitters for transmission over corresponding transmission media 1404. It is noted that the transmission media can include successive combinations of circuit traces, wires, wireless interfaces, optic fiber, outer space, atmosphere, buildings, or other substances. Travel distance can range from millimeters to millions of miles.

Any of a number of corresponding stationary or mobile receiver platform(s) 1406 may receive the signals including platforms such as spacecraft 1430, aircraft 1432, vehicles 1434, mobile or fixed antennas 1436 or 1438, base stations or cell towers 1440, handheld or mobile units 1442, or other circuit components.

In operation, the system of FIG. 14 includes the stationary or mobile transmitter platforms 1402 creating signals having data, time-related data, and timing markers. The platforms use inputs 1408, 1410, 1412, 1414, as well units or platforms 1416, 1418, 1420, and 1422 to obtain, mark-or-time-tag, or report observations. Either or both sets of signals are fed into the item 1424 subsystem for signal scanning, signal element forming, signal forming, signal-merging, or multiplexing. Signal element forming would be the forming of basic signal items such as physical timing markers, virtual timing markers, messages, or signal events such as start of signal. Designers have the choice of (a) multiplexing the signals together, (b) optionally using virtual timing marker methods to merge two or more signals together before any multiplexing, (c) both, or (d) of course, forwarding the signals without multiplexing them.

At unit 1426, one or more transmitters or subsystems may send the signals. If the receiver platform 1406 is very close or onboard, a strong signal may be adequate to send a signal across circuit traces or through local wiring so that no separate transmitter is required. The transmission signals travel through item 1404 which can be a single medium, a combination, or a succession of pathway mediums which can individually, collectively, or successively alter the signal and signal speed of travel to reach one or more corresponding receiver platforms 1406. Additionally, as indicated by reference numbers 1430, 1432, 1434, 1436, 1438, 1440, or 1442, various corresponding receiver platforms can detect, receive and process the signal(s). They can either reconstruct original signals or merely extract timing and information directly. Note that the receivers can be stationary or mobile. It may be necessary for the receiver to perform traditional calculation corrections because the transmission mediums distorted signal speed of travel or the transmitter platform 1402 or the receiver platform 1406 was moving.

Figure 15:
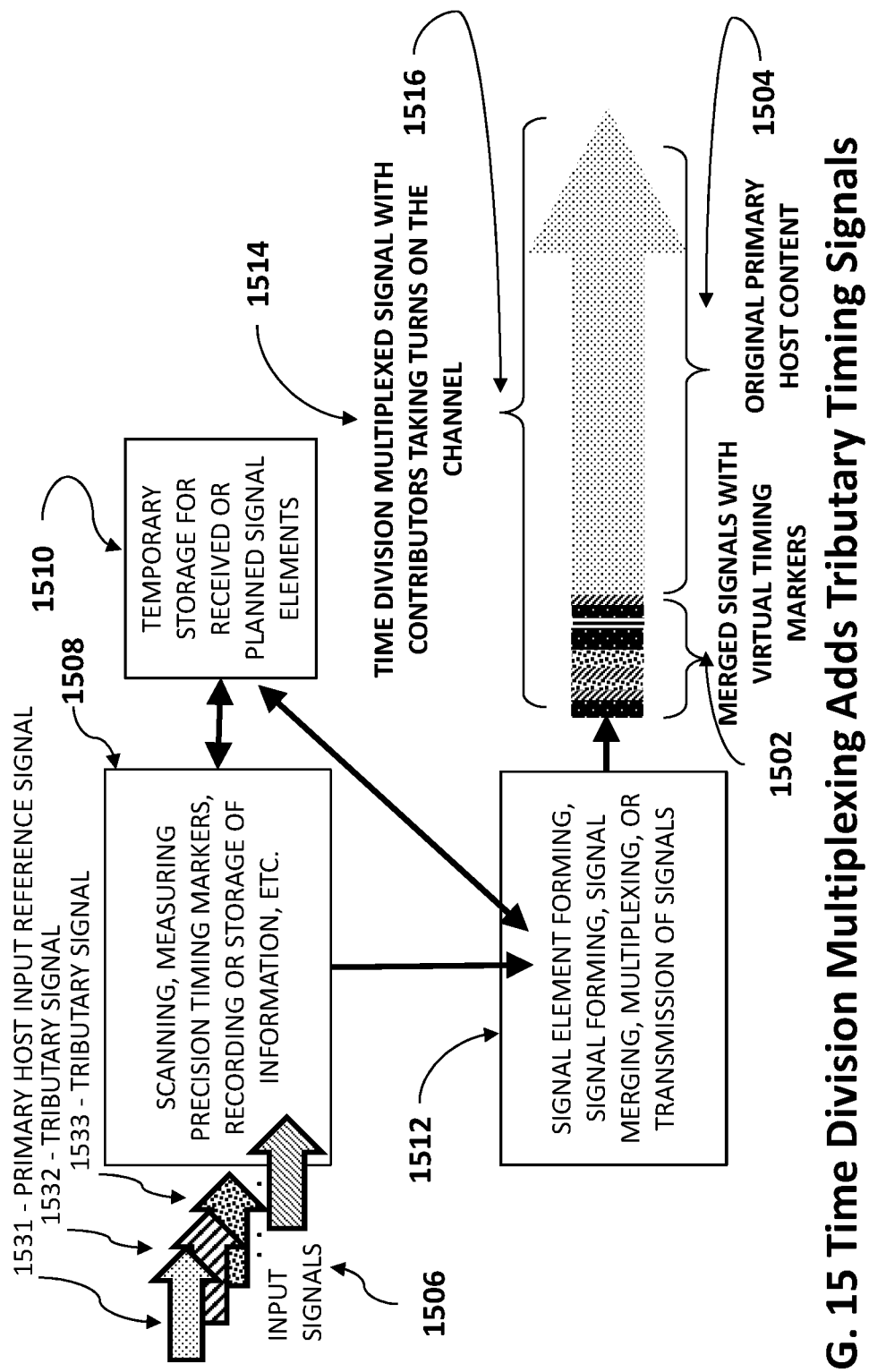
FIG. 15 shows an example of merging tributary signals with virtual timing markers before time division multiplexing them on a transmission signal.

Time Division Multiplexing Adds Tributary Timing Signals by Using Virtual Timing Marker Methods FIG. 15 illustrates a hypothetical Time Division Multiplexing on a transmitter platform, such as those in FIGS. 7 and 14. A difference from the earlier Empty-Spaces-On-A-Time-Reference-Signal perspective may be seen in items 1502 and 1504, wherein the output transmission signal has intervals of the original and merged tributary timing marker signals taking turns on the transmission channel.

In operation, the system of FIG. 15, the primary and tributary input signals #1531, #1532, #1533, etc. or other multiple input signals which are collectively indicated by reference number 1506 are input to a unit 1508, which includes a collection of subsystems for scanning and processing one or more signals. One of the 1506 signals, deemed item #1531, is the original primary host or independent reference signal because it contains most of the information to be transmitted by the platform host, it has many candidate physical timing markers, or it is an arbitrary decision. Meanwhile item 1510 acts a temporary storage area for received or planned signal elements. At item 1512, the timing markers on the other tributaries are converted to virtual timing markers which reference the physical timing markers on an output signal. Signal elements are formed; signals are formed; tributary signals may be merged; signals in this case will be time division multiplexed with the primary host signal; and signals may be transmitted or directly sent. At item 1514 and 1516, the outputs consist of a one or more signals which have time division multiplexed time intervals alternately containing (a) item 1504, the original primary host reference signal and (b) item 1502, a single-or-merged signal(s) having virtual timing markers and messages.

It is noted that FIG. 15 is similar to the system of FIG. 7, and, although not shown, any corresponding receiver platform demultiplexes the transmission near the receiver input and later either (1) reconstructs the signals including any original time reference signals or (2) directly renders any timing and information.

Example System to Piggyback or Relay Positioning-Navigation-and-Timing Signals on a Video or Similar High Rate Transmission In another aspect, GPS receiver-locator devices usually need line-of-sight access to at least 3 or 4 sources of overhead positioning-navigation-and-timing spacecraft signals, so triangulation or trilateration calculations can be performed. Local receiver obstructions such as mountains, buildings, or trees often cause connection failures. Solar flare noise or blackouts may be regional. Alternate signal sources could come from platforms originating or relaying GPS-like signals.

The real-time PNT positioning-navigation-and-timing portion of GPS transmissions has a low, 50 bits per second, rate. The signal still uses a high frequency bandwidth or channel capacity to provide GPS precision. Much of the rest of the signal is used to support discerning the GPS signal amongst 24 or more broadcasts from other GPS spacecraft on the same radio signal frequency bands—like the CDMA McFries analogy mentioned much earlier.

Since video transmissions often operate up to 10,000,000 bits per second, it is reasoned that such PNT signals can PIGGYBACK or RELAY on one or more other purpose transmissions to receiver platforms. This is especially useful when receiver-locators do not have direct line-of-sight access to enough overhead navigation spacecraft. Depending on the implementation, there can be: one, three, four, twenty, or more raw or processed piggybacking tributaries on such a single third-party transmission. Although video signals are usually compressed, the data rates remain at high megabits per second ranges, so compression does not interfere with the piggyback concept presented here.

Figure 16:
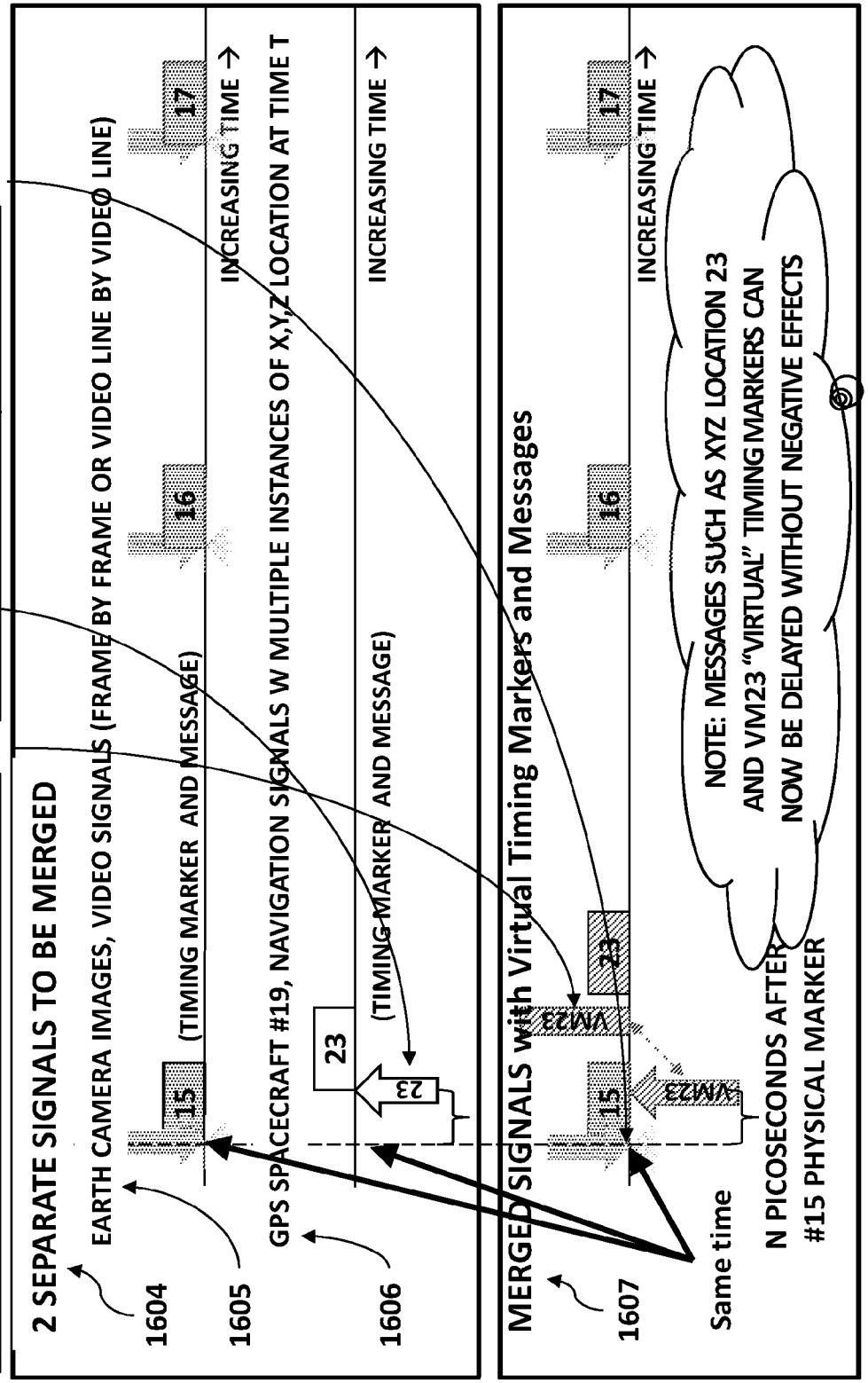
FIG. 16 shows an example of replacing a physical GPS precision timing marker with a message that a virtual timing marker occurs n picoseconds after a physical timing marker.

A system to relay and piggyback GPS-like signals on a video or similar high rate transmission can be arranged like that of the aforementioned example of FIG. 14. FIG. 16, in particular, shows an example on how GPS PNT positioning, navigation, and timing signals as well as timing markers can piggyback on a video or similar high rate transmission.

Reference physical timing markers can be predefined to start at each nth bit within each, tenth, or other stipulated successive video frame. In this example shown in FIG. 16, two signals in the block item 1604 are to be merged—including (a) item 1605 as the video signal to be the primary host signal and (b) item 1606, an example of one of the GPS PNT tributaries which are to piggyback on the video signal.

The block, item 1607, shows the merged signals with tributary virtual timing markers and messages. As an example, the processing logic must (a) at item #1, replace a tributary timing marker and message with (b) at item #2, a message saying that this virtual timing marker appears n picoseconds after (c) at item #3, the dotted physical marker.

Although FIG. 16 shows only one PNT positioning-navigation-and-timing signal, the relay platform could receive and relay multiple PNT signals on a single video signal. The relay platform needs to receive at least 3 or 4 PNT signals in order to calculate or trilaterate its precise location and corresponding navigation time; determination can be done at either the relay platform or at an appropriately equipped downstream receiver-locator.

A video transmission and relay platform can (a) receive the navigation signals, add precision time markers or time-tag them and (b) piggyback or relay them onto a video signal or many other types of signals. The signals of the transmitters and receivers may utilize different frequencies, modulations, protocols, etc. as needed to interface with other upstream transmitters and downstream receivers.

An appropriately equipped navigation receiver-locator receiving such a signal can (a) take the signal's collection of navigation data, (b) calculate the successive instantaneous positions of each relay platform, (c) integrate the travel time and position of the platform with other navigation signals from other relay platforms or originators of PNT navigation signals, or (d) determine the precise position of the navigation receiver-locator by using traditional triangulation or trilateration methods and any signal distortion correction calculations.

If a relay platform uses a commercially available multi-day stable precision clock, the relay platform could also act as a temporary backup or fallback navigation transmitter platform for others in case too few overhead navigation spacecraft are immediately accessible by periodically transmitting a GPS-like signal.

A Basic System Originating a Single Signal Having Virtual Timing Markers

Figure 17:
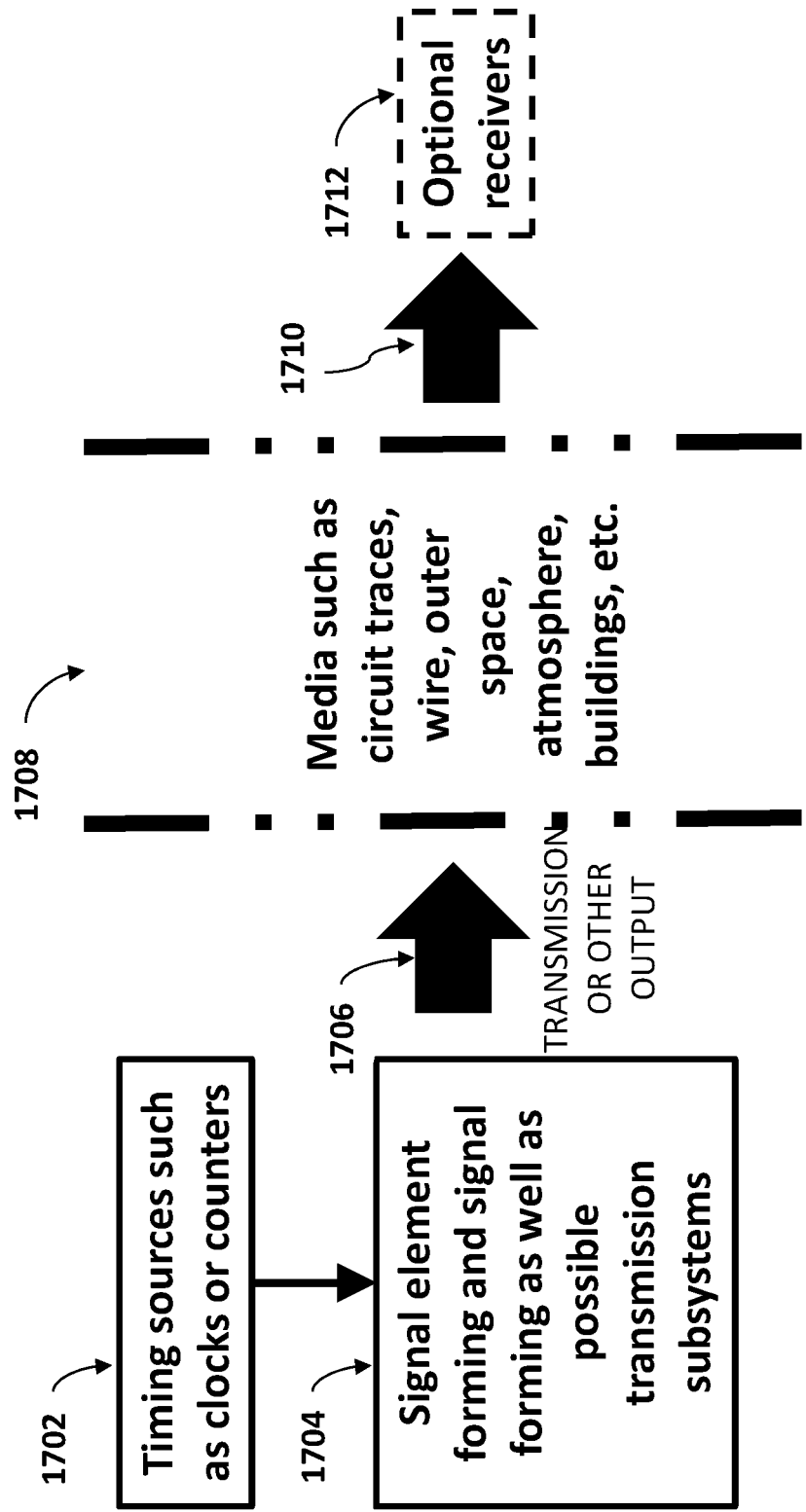
FIG. 17 shows a basic system originating a single signal having virtual timing markers.

FIG. 17 illustrates a basic transmission system for originating a single signal having virtual timing markers is made up of electronic, optic, or processing components and circuitry as well as possible firmware or software. Such a system comprises timing sources 1702 such as clocks, counters, or timing reference signals, signal element forming, signal forming components 1704 as well as possible transmission subsystems, the transmission of signals 1706 or other output, a succession of transmission media 1708 such as circuit traces, wire, outer space, atmosphere, buildings, etc., an incoming signal 1710 to any optional receivers 1712. If there are no receivers, the signal will exist but there will be no rendering of the signal.

In operation, timing sources 1702 such as clocks, counters, or timing reference signals are used to support precise timing in signal element forming and signal forming 1704 including physical timing markers and virtual timing markers. In an aspect, a transmitter may not be necessary for reasons such as a short wired travel distance.

For signal forming, since this case involves only the creation of a single signal, no merging of signals or signal multiplexing may be needed, but it may be necessary to encrypt, modulate, amplify, or transmit the 1706 signal. The 1706 signal(s) may travel through a variety or succession of mediums such as circuit traces, wires, outer space, atmosphere, buildings, etc. as illustrated at 1708 and emerge as a 1710 signal.

The 1710 signal(s) may then reach a corresponding receiver 1712. The corresponding receiver 1712 can (a) detect, filter, ingest, amplify, decrypt, interpret, ignore, or process the signal, (b) forward any unmodified signals, (c) separate signal elements into different sub-signals for forwarding, or (d) directly extract or render timing and information. Aforementioned beneficial options can be added such as redundant virtual timing markers, so the signal can better penetrate high signal noise environments, but they may not be needed in a very basic simple system.

A Basic System Receiving a Transmission Having Virtual Timing Markers

Figure 18:
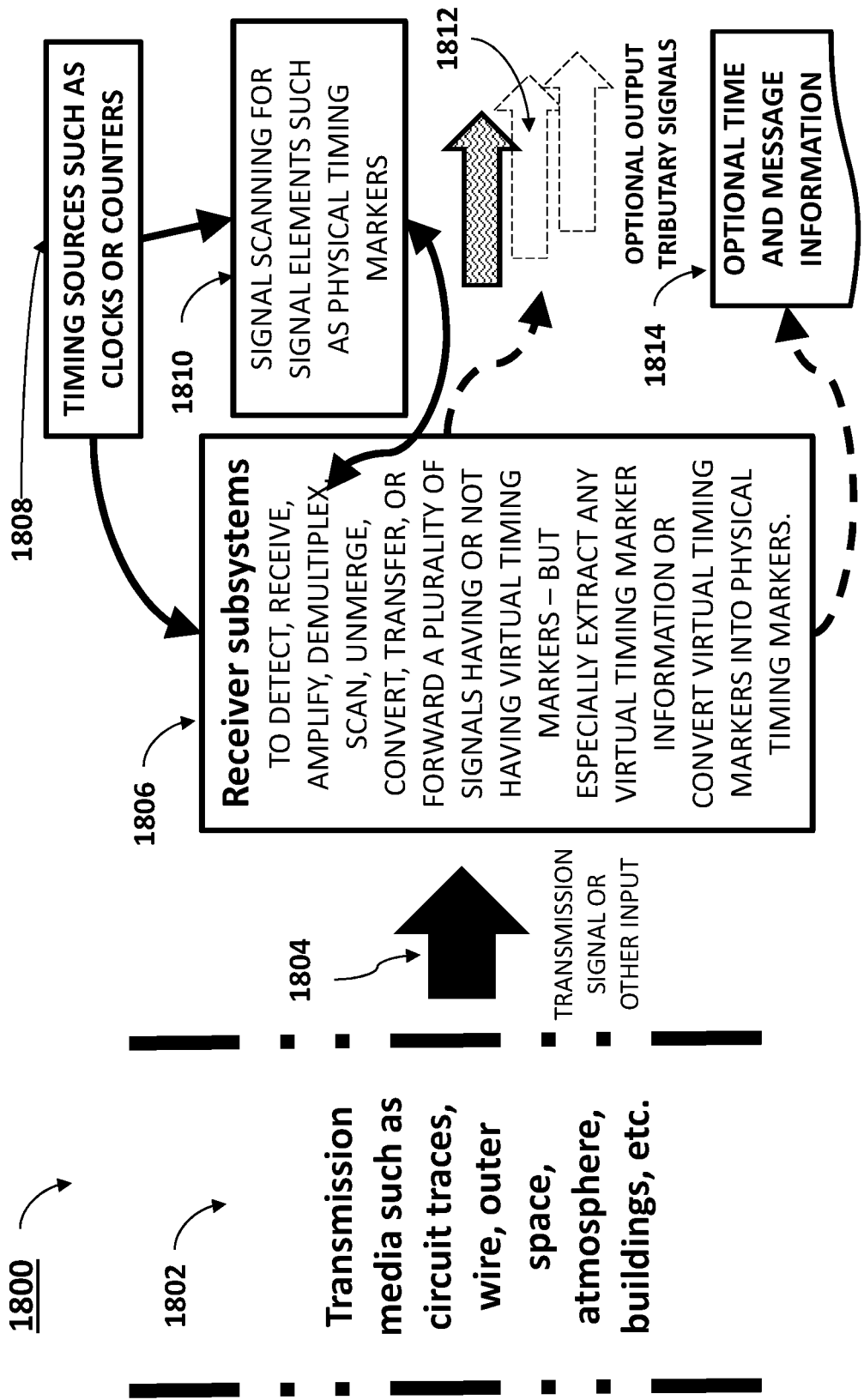
FIG. 18 shows a basic system receiving a transmission having virtual timing markers.

According to another aspect, a basic receiver system 1800 is illustrated in FIG. 18. The system 1800 includes for receiving a single signal having virtual timing markers is made up of electronic, optic, timing, or processing components and circuitry as well as possible firmware or software. Such a system 1800 includes a single or successive combination of media 1802 through which the incoming transmission or other signal input must travel. Additionally, the system 1800 includes an incoming transmission signal or other input 1804, and receiver subsystems and signal scanning and processing components 1806 for receiving the 1804 transmissions. The system 1800 also includes timing sources 1808 such as clocks, counters, or timing reference signals. Moreover, the system 1800 features supporting subsystems 1810 to scan the signal for signal elements such as physical timing markers. The receiver subsystems 1806 may optionally output signals such as the original tributary signals or other optional outputs as directly rendered time and message information as indicated by references 1812 and 1814. Depending on the design and circumstances a receiver may or may not need filtering, anti-jamming subsystems, anti-spoofing subsystems, decoders, tuning, demodulation, or decryption—for example, a short-distance wired connection. In operation, timing sources 1808 can be used by other components to time-tag or measure incoming signal elements. A transmission or other signals 1804 received over media 1802 are received at the receiver subsystem platform 1806. The receiver subsystem 1806 can be used to detect, tune, receive, demultiplex, demodulate, decrypt, separate, or amplify the incoming transmission signals 1804. In conjunction with subsystems 1806, the special a scanning subsystem 1810 (utilizing one or more timing sources supplied by source 1808) can be used to precisely scan incoming signals to detect signal elements such as physical timing markers and virtual timing markers, wherein the scanning can utilize the timing sources and other devices such as analog-to-digital converters to measure signal element parameters such as precise local time of arrival. The aforementioned beneficial options can be added including analyzing redundant virtual timing markers so that any timing markers penetrating high signal noise environments can be better discerned and measured.

Additional Details of Transmitter Subsystems Using Virtual Timing Markers

Overview

Figure 19:
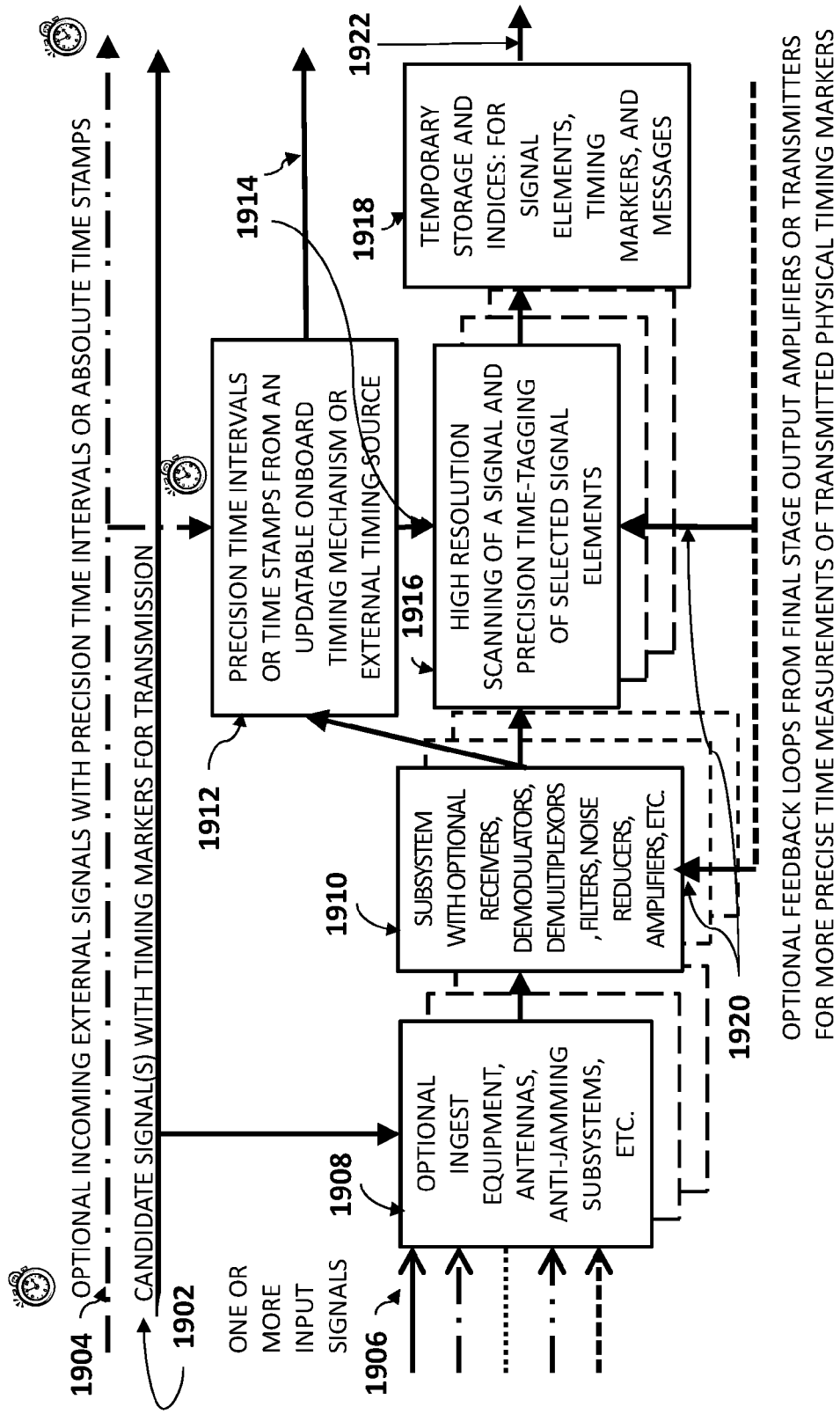
FIG. 19 shows an exemplary transmitter block according to the present disclosure.
Figure 20:
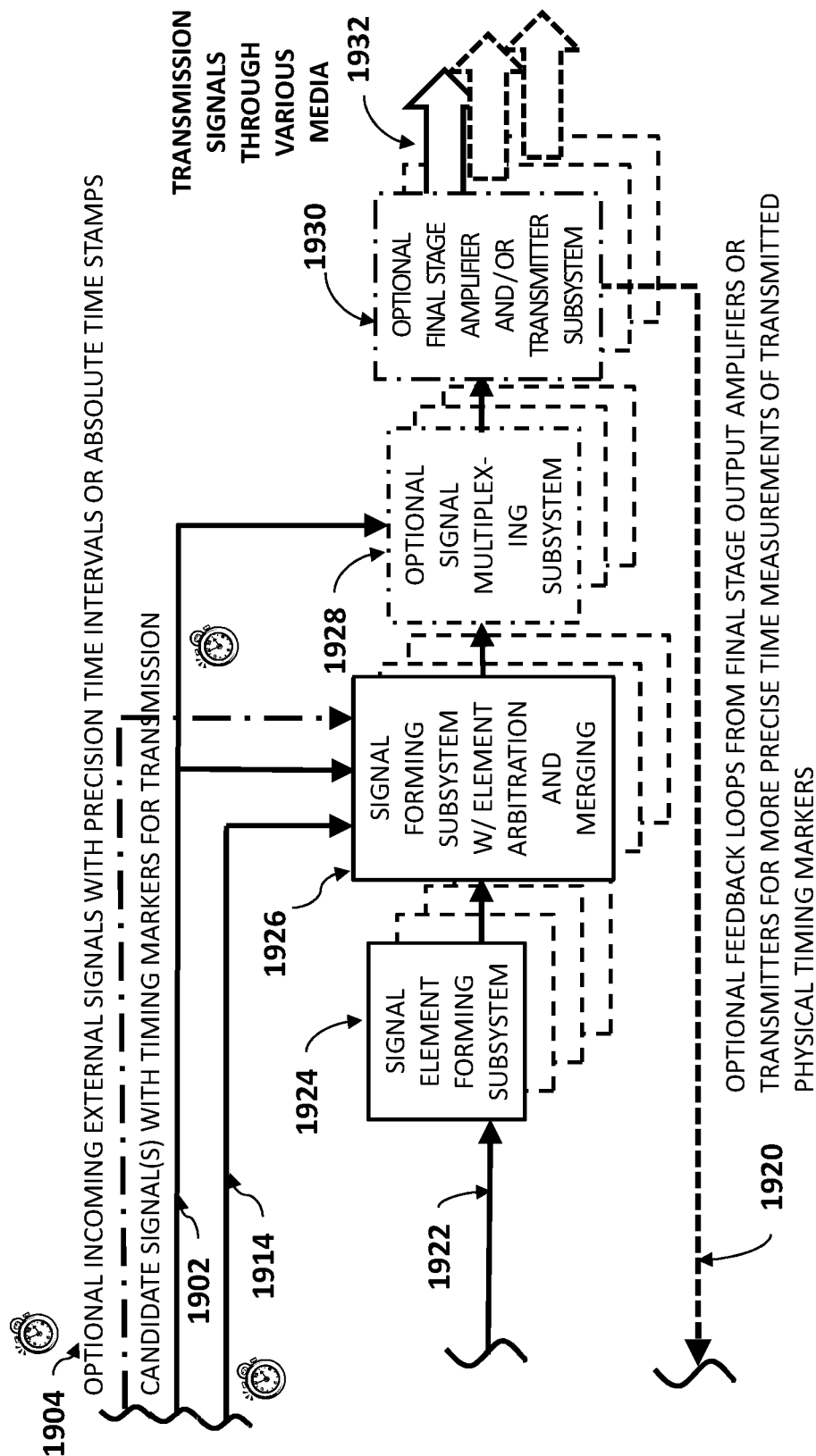
FIG. 20 shows further aspects of the transmitter block of FIG. 19.

FIGS. 19 and 20 illustrate another example of a system for transmitting signals using the presently disclosed virtual timing marker methodology. As may be seen in FIG. 19, candidate signal(s) 1902 for transmission includes timing markers for transmitting the signal. Additionally, optional incoming external time reference signals 1904 with precision time intervals or absolute time stamps may be received. Further, one or more input signals or internally generated streams 1906 are received via single or multiple ingest subsystem(s) 1908 which may include antennas, anti-jamming equipment, etc.

The system of FIG. 19 also may include single or multiple receiver(s) 1910 as well as subsystems such as demodulators, demultiplexors, filters, noise reducers, amplifiers, decryptors, etc. A subsystem or signal source 1912 provides precision time intervals or time stamps engendered by using an updatable onboard timing mechanism or external timing signal source to provide internal usage precision time interval or absolute time stamp signal(s) 1914.

The apparatus of FIG. 19 also includes single or multiple subsystem(s) for high resolution scanning and precision time-tagging 1916 that receives the output of subsystem 1910 and the time intervals or time stamp signals 1914 from subsystem 1912. The subsystem 1916 may also include or effectuate detection, measurement, abstraction, or storage of selected signal elements. A temporary storage system or buffering system 1918 receives the output of subsystem 1916. System 1918 may further include optional indices for signal elements, timing markers, measurements, and messages, as well as other pertinent information. Optional feedback loops 1920 from taps near the final output stage or output transmitters may also be included.

FIG. 20 illustrates a continuation of the system of FIG. 19, and common reference numbers are used through FIGS. 19 and 20 to denote the same system elements or signal. 1922 outputs from subsystem 1918 are inputs to a single or multiple signal element forming subsystem(s) 1924 for elements such as physical timing markers, messages, events, etc. Further, the system includes a single or multiple signal forming subsystem(s) 1926 with signal element arbitration and merging. An optional single or multiple signal multiplexing subsystem(s) 1928 may receive the output of subsystem 1926. The system of FIG. 20 may also include an optional single or multiple final stage amplifier(s) and/or transmitter(s) 1930 for transmission of output signals 1932 through via various media.

Referring back to FIG. 19, signals 1902, 1904, 1906 may enter initial input subsystem(s) 1908, 1910, 1912, 1916 either continuously or at random intervals. The signals may include signal inputs from other nearby subsystems (and not necessarily all from external radio transmissions). In other aspects, 1902 or 1906 signals may comprise tributary signal inputs, or the 1902, 1904, and 1906 signals may comprise one or more timing reference signals.

Further Details

Depending on the implementation, it is possible that one signal may be deemed to be a primary host signal with physical timing markers. Also signal(s) 1906 may include any internally generated tributary signal elements. Moreover, the optional feedback loops 1920 may be derived from taps near the final output stage or an output transmitter (e.g., 1930 in FIG. 20).

As subsystem 1908, for each channel or signal stream, an ingest subsystem may tune for the correct frequency, search for a signal, detect, and ingest relevant input signal(s) Additionally, subsystem 1908 may reduce noise, counter jamming, or otherwise enhance discernment of the input signal.

For each channel or signal stream, the subsystem 1910 may receive, amplify, filter, demodulate, demultiplex, demerge, decrypt, etc., as necessary in order to extract the relevant input signal(s). Subsystem 1912 provides for internal usage precision time intervals or absolute time stamp signals from either an updatable onboard timing mechanism or external signal timing source. The scanner subsystem 1916 may, for each input stream, receive timing information from the timing subsystem 1912 to scan a signal waveform stream by at least one of: (1) clocking the digital signal into binary values; (2) using special circuits to detect crossings of a threshold amplitude level; (3) using a high-speed analog-to-digital converter with sample-and-hold logic driven by a local platform clock or timer or signal; (4) using salient points in the waveforms of the underlying signal carrier or carrier-less-equivalent as reference physical timing markers; or (5) other suitable methods.

It is further noted that the system of FIGS. 19 and 20 effects discernment of physical timing markers and analysis of the incoming waveforms as well as TIME-TAGGING or otherwise performing measurements of the physical timing markers. Depending on the implementation, the system may retain a digital image or artifacts of physical timing markers and, especially the precise instant of such timing markers. Categorization and placing of corresponding informational entries successively into temporary storage subsystem 1918 may be performed, and includes a short-term-storage, logging of recent arrivals, or event buffering with optional indices to expedite later access. It is also noted that for the optional feedback loop signal(s) 1920. which return from final output stage(s) or output transmitter(s) to either of subsystems 1910 or 1916 or both, the feedback signals 1920 may be in some representation of a transmitted signal such that the feedback signal(s) 1920 may require demodulation, demerging, decryption, filtering, or other processing to convert the transmission back into a discernable and measurable signal stream for a signal scanner.

Referring to FIG. 20, at subsystem 1924, single or multiple signal element forming is used to help create, convert, transfer, annotate, or augment signal waveform elements for each anticipated output signal by accessing the information contained subsystem 1918 of FIG. 19, which is the temporary storage and index subsystem.

For any primary host signal or other specified reference signals having physical timing markers, physical timing markers are preserved or replicated as physical timing markers. For any tributary signal, some or all physical timing markers may be translated into virtual timing markers which reference physical timing markers in a primary host signal or other specified reference signal. Also, for any internally generated tributary signal and, depending on the particular application, timing markers may be retained as physical timing markers or created or translated into virtual timing markers which reference physical timing markers in a primary host signal or other specified reference signal. Optionally, the subsystem 1924 may form particular dispersed redundant signal elements, encrypt particular signal elements, or add or implement other virtual timing marker options or other features.

The signal forming subsystem(s) 1926 provide signal element arbitration and merging for predetermined combination(s) of input signals or internally generated tributary streams which may use timing information from items 1902, 1904, or 1914 to schedule or position signal elements on the signal being formed. Additionally, system 1926 may merge elements from different signals or form a signal while using virtual timing marker methods for virtual timing markers, in general, or for arbitration of signal elements such as implementing "First-Come-First-Served", "Priority Preference Mode", or "Primary Host Mode". Still further subsystem 1926 may position any "Primary Host Mode" elements onto the signal normally on a high priority basis.

Yet further, subsystem 1926 may use or form reference physical timing markers which are discernible waveforms either in the modulated signal or in the underlying signal carrier or carrier-less-equivalent. Otherwise, the subsystem 1926 will use physical timing markers on the enveloping modulated signal. Virtual timing markers will be positioned onto the signal on a medium priority basis or as space is available, and other messages will be positioned onto the signal on a low priority basis or as space is available. For Priority Host Mode, First-Come-First-Served, or Priority Preference modes, the system in FIGS. 19 and 20 may update virtual timing marker displacements or time offsets The optional single or multiple signal multiplexing system(s) 1928 may, if appropriate, multiplex any specified number of any multiple signals together. Furthermore, the subsystem 1928 may encrypt all or portions of any multiplexed signal being created.

Further, the optional final stage amplifier or transmitter subsystem(s) 1930 may be used to amplify or transmit a signal. Additionally, the subsystem 1930 may optionally provide taps for the feedback loops 1920 to allow input signal subsystems or scanners to more precisely measure outgoing times of physical timing markers and for signal element and signal forming subsystems to construct more accurate and precise virtual timing markers. Transmission signals 1932 leave the platform illustrated in FIGS. 19-20, and enter one or more successions of transmission media.

Figure 21:
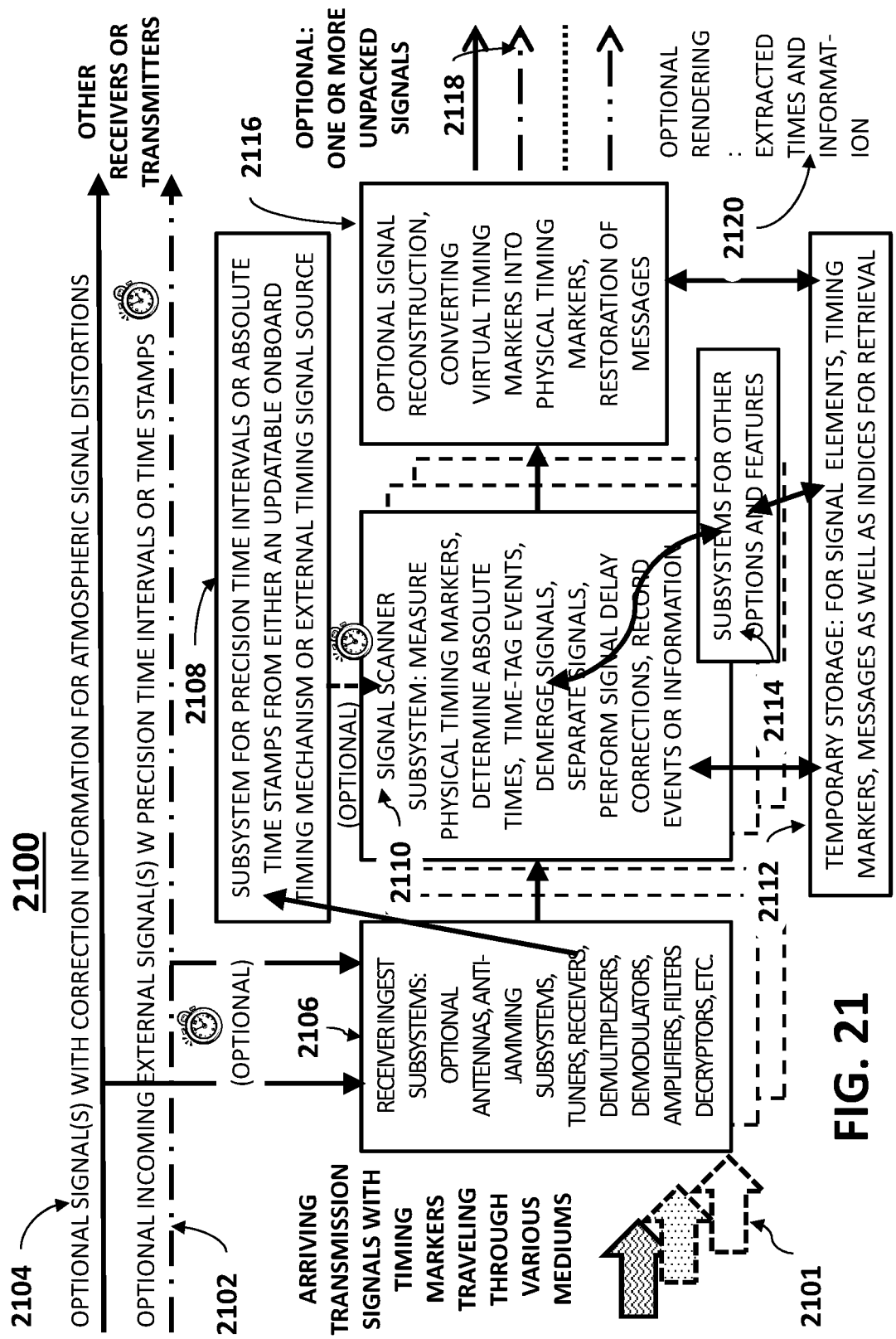
FIG. 21 shows receiver block details.

Additional Detailed Descriptions of Receiver Platforms for Virtual Timing Markers Overview FIG. 21 illustrates another example of a receiver block 2100, such as the variation of the receiver block illustrated previously in FIG. 7. It is noted that in the various examples disclosed herein, spacecraft, aircraft, or other transmitter platforms can be moving because it is understood as a design condition that their precise location at the instant of timing marker departure at transmission is known or can be determined. Fortunately for relatively slow moving receiver-locators, such as those traveling at less than a hundred miles per hour (i.e., 146 feet per second), movement does not create a significant noticeable difference in position readings. Conventional receiver-locators can lose position or velocity precision and accuracy when their platforms are fast moving or turning, as well as when there are infrequent updates from upstream transmitters (e.g., annotated GPS updates once every 6 seconds, or by using the more frequent GPS epochs, once every second), or when there are delays or pauses before the intended transmissions. In such cases, common velocity determination methods and workarounds include using inertial navigation systems, gyroscopes, accelerometers, speedometers, radar, measuring signal Doppler shifts, Kalman filtering, averaging changes in location, etc.; and there are other additional methods.

For purposes of the discussion of the apparatus of FIG. 21, however, it is noted the receiver platform 2100 may be assumed to be stationary or to be adequately slow moving. As illustrated, various incoming candidate signals 2101 are from received from a transmitter platform(s) after traveling through various transmission media. Additionally, an optional incoming external time reference signal(s) 2102 with precision time intervals or absolute time stamps may also be received. Furthermore, other signal(s) 2104 with correction information for signal travel delays or atmospheric distortions published by other neighborhood stations or units may be received.

The various signals 2101, 2102, and 2104 may be input to an ingest subsystem(s) 2106, which may include optional antennas (including multipath signal reflection reducers such as choke ring ground planes), anti-jamming equipment (such as directional antennas or nulling radio lobe antennas), etc., as well as receivers, demodulators, demultiplexors, filters, noise reducers, decryptors, and amplifiers, as examples. Additionally a subsystem or signal source 2108 is included to provide local internal usage precision time intervals or absolute time stamps from an updatable onboard timing mechanism or external timing signal source Receiver 2100 further may include a single or multiple subsystem(s) 2110 for high resolution scanning, precision time-tagging, and waveform measurements as well as detection and storage of selected signal element information 2112 or demerging. Temporary storage 2112 for signal elements, timing markers, messages, pertinent information, etc. as well as optional indices for retrieval. Furthermore, subsystems 2114 for processing other options and features such as timing marker error detection and correction, dispersed redundant timing markers, statistical precision enhancement, subscriber level access by decryption, etc., may be provided. Optional subsystems 2116 for signal reconstruction may receive signals from subsystem 2110, and output unpacked signals 2118 or direct rendering of extracted times and information 2120.

Further Details

In operation of 2100, the receiver-ingest subsystem 2106 inputs signals or streams from items 2101, 2102, and 2104 from external sources or onboard subsystems. These signals may include primary use signals including (1) multiplexed, merged, or individual signal inputs or (2) direct connections such as signals containing virtual timing markers having "First-come-first-served" formats, "Priority preference mode" formats, or "Primary Host Signals" with tributaries using one or more virtual timing marker formats (or other formats where virtual timing markers are present). Additionally, the signals may include signals that have physical timing markers, but do not have virtual timing marker formats, signals that do not have physical timing markers or virtual timing markers, or auxiliary supporting signals such as timing reference signals having (a) precise intervals between pulses or (b) precision absolute time stamps. Furthermore, a transmission input stream may contain one or more multiplexed channels or individual signals where one or more signals may contain timing markers and messages.

The receiver subsystem 2106 ingests and processes each pertinent transmission by using components such as antennas, tuners, anti-jamming subsystems, demultiplexers, demodulators, amplifiers, filters, decryptors, signal demerging subsystems, signal separators, etc. Subsystem 2106 may receive a timing signal from an antenna/receiver subsystem and forward it to subsystem 2108.

As discussed before, 2108 is an internal local timing source subsystem for precision timing signals that may enable this or other subsystems to have their own local clock or timing mechanisms which may need updates or corrections, receive external master clock reference signals having physical timing markers or absolute time stamp messages, or synchronize subsystem 2108 as a slave timing subsystem(s) to master time source(s). Also, 2108 is capable of updating, throttling, or precisely correcting local clock-or-timing frequencies, pulses, or absolute times of local platform or local scanner timing mechanisms.

The single or multiple scanner subsystem(s) 2110 may be configured to detect, measure, or otherwise determine any needed signal element waveform parameters such as time of arrival. Subsystem 2110 also is configured to scan input streams by (1) clocking digital signals into binary values, (2) using special circuits to detect any predetermined threshold amplitude level crossings, (3) using a high-speed analog-to-digital converter with sample-and-hold logic driven by a local platform clock, timer, or signal, or (4) using other methods to precisely sample, measure, or examine the input signal waveforms.

Subsystem 2110 may also process physical timing markers such as measure, time-tag, time-stamp, or otherwise determine physical timing markers and relevant parameters. Depending on the implementation, record waveforms or artifacts of physical timing markers, and, especially, precise instances of selected timing markers. The subsystem 2110 may also record corresponding informational entries successively into storage 2112, which may be short-term storage, a buffer, or log of recent arrivals with optional indices.

Still further, subsystem 2110 may correct for incoming signal travel delay variations or distortions, or detect and process virtual timing marker messages and other types of messages or types pertinent signal elements. Furthermore, when error detectable and error correctable messages are encountered, the subsystem 2110 may perform any appropriate predetermined error detection and correction algorithm for such messages (which may include virtual timing marker messages). In yet further aspects, the subsystem may reconcile any irregularities in the messages, or eliminate any "out-of-family" messages such as "wild point" values that do not match the other values for the same target timing marker point in the case of redundant timing marker messages.

Additionally, system 2114, as part of the subsystem 2110, may optionally perform any additional chosen options such as noise resistance, precision enhancement, subscriber access fulfillment such as decryption by password access, and special functions or algorithms such as traditional GPS trilateration, Differential GPS, Code-Phase GPS, and corrections for signal travel delay variations. Also, system 2114 may optionally update or store any pertinent information into storage 2112 (e.g., for later retrieval, to later perform statistical enhancement of any time related value for timing markers; eliminate "out-of-family" messages for timing markers).

Of further note, in an aspect subsystem 2116 may reconstruct signals 2118 as unpacked signals including optionally converting virtual timing markers into physical timing markers and restoring messages. Optionally, subsystem 2116 may also directly render items as signal timing markers, messages, or other information 2120.

Further Notions for Primary Host Signal Mode in Transmitter Subsystems

Electronic Considerations for Signals with Timing Markers

Other transmission mode examples are also envisioned, as will be described in the discussion that follows. As background, however, it is noted that while gigahertz signals may be needed to achieve 10 foot discernment for navigation purposes and gigahertz components have become commercially available in large quantities and at reduced prices within the last decade or so, certain applications such as flight hardware may also require shock testing and otherwise "certified" components. Some megahertz or gigahertz signals may still need very high speed circuits or other special hardware. Also, "FPGA fabric" may be used to interconnect different high-speed electronics technologies in support of these operations. FPGA field programmable gate arrays or application specific integrated circuits (ASICs) are usually implemented by user software programs and statements which are translated into "programmed" hardware circuits by the vendor's compiler, code generator, and libraries.

If the above technologies are not adequate, it may often be possible to streamline or parallelize the operations. High rate signal element scanning and manipulation can often become more efficient and effective merely by simplifying real-time operations or special circuitry. It should be noted that while some of the operations below may appear to be multi-step and complex, an implementation may actually be simple. For example, a 50 bit per second real-time GPS tributary signal should not be demanding for any merging with a 10 megabit per second Primary Host signal.

Exclusive-OR circuits, "test and set" locking, and "compare and swap" locking are common traditional hardware or software methods to cooperatively gain temporary immediate exclusive access to an item. If multiple independent activities want to access the same resource and if an activity is currently performing a "test and set" on that resource, no other activity may successfully complete another "test and set" until the first activity is done. The activities may repeatedly interrogate an item's state and, if available, by such rules of engagement, they can immediately change something to "lock" the resource and later "unlock" it to re-enable cooperative access. For example, conflicting simultaneous users can be prevented from overwriting each other's changes to an output signal. If a "test and set" (on a flag register) indicates that access to a particular signal tap is currently not being used by another (it is "unlocked"), then the aforementioned "test and set" will simultaneously "set or lock" the flag register to deny access to others. Then when the loop or task completes the signal insertion operation, the loop or task will "unlock" the structure for future access by others.

Note also that the methods below may include "test and set" exclusion-like operations even though the steps may not specifically mention them.

Some key functions in support of (a) signal scanning, (b) signal element detection, (c) signal element forming, and (d) signal forming may include: (1) translation of input digital signals into binary values such as by traditional "clocking" or "toggling" an incoming data signal into registers or memory with the clocking occurring near the signal bit rate but at a much lower resolution than high resolution scanning, (2). high resolution scanning for finer discernment, measurement, or time-tagging of the precise positions of physical timing markers in the signals, or (3) finding the beginning, duration, and end of adequately long, empty space intervals on (to be described below) Direct or Delayed Primary Host signals, so that tributary signal elements can be inserted.

A transmission signal is designed such that ultimately a receiver can extract (1) a waveform or (2) succession of values representing the waveform at intended times or intended time intervals. The representations can take many forms or modulations.

Sometimes a signal implementation has a symbols-per-second rate where each "symbol" represents "a multi-bit value or a few multiple bits" and thus not necessarily a zero or one. Sometimes the signal sample intervals are tightly coupled to the modulation.

Also before examination, additional circuitry can sometimes be used to "clean up" slight distortions and noise in the signal (e.g., bit synchronizers).

But because (1) traditional transmitter-receiver systems already support physical timing markers with appropriate precisions over long distances and varying environments and (2) the new methods herein only substitute or augment physical timing markers with virtual timing marker messages, there is no reason to detail those electrical aspects where solutions and practicing examples already exist:

Note that a few types of signals, such as GPS CDMA waveforms, must be "correlated" (i.e. overlaid and aligned) against a predefined unique periodic waveform contour before "clocking". In other words, by (1) adjusting the clocking beforehand to follow some recognizable always-present prearranged preamble sample waveforms in the signal, (2) "sliding and shrinking-or-widening" a clocking template into position, or (3) thus achieving precise synchronization, it will be better possible to precisely discern and measure signal waveforms at critical points.

While topics here are at a general communications level, it should be recognized that there are a wide variety of circumstances, problems, and approaches which might be applicable. Lower level technologies could include (1) carrier synchronization—matching a reference with the data signal, (2) bit synchronization—synchronizing a receiver clock to a baseband data-symbol sequence, (3) synchronization content—such as repetitive insertion of bits or words solely for synchronization purposes, (4) methods of bit or carrier synchronization which minimize the use of available channel capacity, etc. And when an unmodulated component is present, a common approach to carrier synchronization is to use a phase-locked loop (PLL) which "locks onto" or "closely follows" the carrier component (i.e., via a feedback loop). Such subsystems are often used as parts of an overall signal phase recovery system.

An input signal handler can be continuously or repeatedly commanded to "clock" or toggle an input data signal into a stream of binary values for storage in hardware registers or memory arrays. Each command requests a handler device to gather hundreds or thousands of successive time samples from an input signal—usually to a different cluster of register or memory addresses to avoid overwriting previous data. And when the commanded number of samples has been gathered, higher level logic quickly restarts the next gather iteration without creating any sample gaps. (Note: Alternatively it can temporarily (1) save and (2) reconstruct or reinsert—any overflowing samples). Later processing can detect waveforms and accurately interpret them into signal element records.

For this discussion, although the incoming signal can have one of many possible formats and modulations, the sampling component must be coupled ultimately to a precise and accurate timing source so that the time intervals between the samples can be measured and finely throttled-or-tracked. If the time intervals are used for standard distance calculations, the time intervals must correspond to a standard time reference.

Zero-Delay-Leg and Slight-Delay-Leg Signals for Tracking Empty Space Intervals

For more precise handling in regards to physical timing markers and empty space intervals, the designers can also split a Primary Host input signal into (a) a "zero delay" leg and (b) a "slight delay" leg.

The "zero delay" leg is herein referred to as the Direct Primary Host Signal. Its main use includes (1) the detection and precise measurement of physical timing markers, (2) "clocking" the signal into binary values, and (3) the measurement or counting of successive empty space values to determine which any empty space intervals are long enough for inserting tributary signal elements from other signals.

The "slight delay" leg or Delayed Primary Host Signal will be essentially an exact identical copy of the Direct Primary Host signal which can accommodate insertion of tributary signal elements on empty space intervals. It may or may not be necessary to precisely know or determine the "slight delay" for later operations. As incoming signal elements pass by, the scanning and insertion logic will already know (1) when empty spaces are available for tributary signal element insertion and (2) whether the empty spaces are large enough.

There is no such splitting to create delayed signals for tributary input signals or internally generated signal element streams. There is also no need for splitting when tributary signal elements are placed on predefined and identifiable empty spaces of packets and packet headers of a Primary Host Signal.

Meanwhile, a parallel activity can more precisely scan and time-tag the points where physical timing markers of the incoming signal resides. Usually high resolution scanning must occur at rates which are adequate for the needed discernment of the signal positions of precision physical timing markers, and additional traditional methods or algorithms can be used to enhance preciseness. The (1) sampling device and (2) any clocking circuits should also be coupled or synchronized to the same precise and accurate timing source of any other scanners. If phase locked loops are used, they are sometimes used to also generate signals at multiples of the entering frequency.

Because physical timing markers might be used for very precise times with high channel capacity signals, it is appropriate early in the design or implementation to identify or define all pertinent physical timing marker types so scanners can be designed to quickly detect as well as precisely measure or time-tag them. For example, physical timing markers can be defined to be (1) the leading and rising edge of the nth bit of a type x data packet, (2) an n percent rise towards maximum value, or (3) the nth bit of every $x^{th}$ frame. For precise signal tracking over time intervals, arrangements or formations of successive timing markers or values can be defined and implemented (e.g., signal waveform templates having portions with already expected shapes for precise alignment).

In some cases when detecting physical timing markers, (1) traditional high speed analog to digital converters may not have adequately fast sample "settling times" or (2) the time to convert a sample and successively ("too high"; "too low") converge to 8 or 12 bit precision values may not really be necessary for physical timing marker detection. Instead for example, special circuitry may be used to more quickly detect a signal rising above a predetermined threshold value and capture the precise time or time-offset of the event. This may obviate the need to save or examine datasets of successive samples.

Beyond examining data or timing marker representations which are embedded within a "coded" signal, a physical timing marker threshold can be more precisely seen when it is more precisely defined or associated in some way by using the underlying signal carrier waveform (because the carrier frequency is much higher and thus more precise and discernable).

When a Direct Primary Host or Delayed Primary Host ("data") signal is "clocked" into binary values, a processor or special circuit can simultaneously count groups of successive binary values of zeroes (or for greater flexibility, "a threshold maximum value" close to zero) to (a) identify empty space intervals and (b) measure or count successive uninterrupted "empty space" interval durations.

A more optimized implementation can have separate queues for tracking and recalling short, medium, or long sizes of empty space intervals. This can improve handling of very short virtual timing markers or very long messages.

Records stored in hardware registers can be used to more quickly track signal element arrivals and process them rather than use inherently slower (a) computer speeds or (b) economical memory. On the other hand, applications with sparse tributary signal elements may not present challenges at all.

Preparation of data insertion records as early as possible streamlines later time-critical real-time processing. For example, in converting a physical timing marker into redundant virtual timing markers—the processing would, of course, set up signal ID, repeat counts, length of dispersion, or associated physical timing markers—but most importantly this would also include "constructed bit" images which are prepared in advance for immediate transfers or insertions onto the output with absolute minimal steps at insertion time.

Further Notions for Primary Host Signal Mode in Transmitter Subsystems

4 Types of Databases for Processing a Primary Host or Tributary Signals

Figure 22:
FIG. 22 shows key data structures for signal scanning, signal element recognition, signal element forming, and signal forming.

FIG. 22 summarizes some key data structures that can be helpful for transmitter subsystems, such as for signal scanning, signal element recognition, signal element forming, and signal forming. Illustrated is first "Type 1" 2201, which is a more precisely time-tagged and most recent physical timing markers database or list. This can be used to hold records of the most recent input signal physical timing markers in the form of a limited capacity searchable time-tagged structure, and, if needed, any corresponding sample datasets, or the most recent physical timing markers placed on an output signal. These can be in the form of storage registers or memory.

FIG. 22 also illustrates a second "Type 2 Signal Element Databases" 2202 that are used to store temporary signal element related records which are created or updated by loops or tasks which examine Direct Primary Host Signals, tributary signals, or internally generated signal element streams. A "Type 2 Signal Element Database" 2202 can be implemented in the form of a relational database, doubly-linked-list, or alternative which holds temporary records for selected signal elements. Database balanced trees may be one of the overall faster approaches. Records may include items such as Signal ID, record number, precise time-tag, carrier cycle count or similar value, signal element type, sequence number, assigned priority for any contended insertion on a merged output signal, any messages or data contents, and constructed bit image as the (ready or almost ready) field of constructed bits to be moved onto a merged output signal.

Also stored in a Type 2 database 2202, a "Virtual Timing Marker Extension" may be appended to the above "Type 2 Signal Element Database" record. The extension would be used to temporarily hold additional information specifically pertaining to virtual timing markers. For example, a Bit Image Ready and Waiting flag could indicate that a "constructed bit image" of this record is ready and waiting for insertion or merging into an output signal. A virtual timing marker may need to defer until its corresponding physical timing marker is detected and its displacement or time offset is determined, or alternatively the value may be designed to be updated later.

Additional extension options may include: (1) Reference physical timing marker identification or signal ID; (2) Reference physical timing marker type; (3) decrementing count of candidate reference physical timing markers or frames to be traversed before a physical timing marker is actually used; (4) refresh value for above decrementing count of reference physical timing markers or frames; for example, use every nth packet frame or superframe; (5) Redundancy current decrementing count: The current decrementing count of redundant virtual timing markers to be created for any particular targeted virtual timing marker; normally 1 or more; (6) Redundancy refresh value: current decrementing count redundancy refresh value for the "Redundancy current decrementing count"; normally 1 or more; (7) Dispersion value for one dataset of a redundant virtual timing markers: a numeric value or algorithm identifier which is used to define the spread of any redundant virtual timing markers over a wide signal interval; (8) Encryption indicator for virtual timing marker: value of 0 (i.e., no encryption) or identifier of algorithm to be used in encrypting a virtual timing marker message; (9) Key to be used in encrypting a virtual timing marker message or zero; (10) Record in-use flag; (11) backwards link; or (13) forward link.

FIG. 22 also illustrates a third type Type 3 2203. This type provides temporary storage of binary value sequences created by "clocking" of a signal into time-tagged binary values. "Clocked" time-tags for physical timing markers may not be as precise as corresponding Type 1 Database 2201 records created with specialized measurements.

Finally, FIG. 22 illustrates fourth type Type 4 2204, which is a database of records for the current and most recent empty space intervals in a Direct or Delayed Primary Host Signal with beginning time, duration, and ending time, signal ID, etc.

Processing a Primary Host Signal

Figure 23:
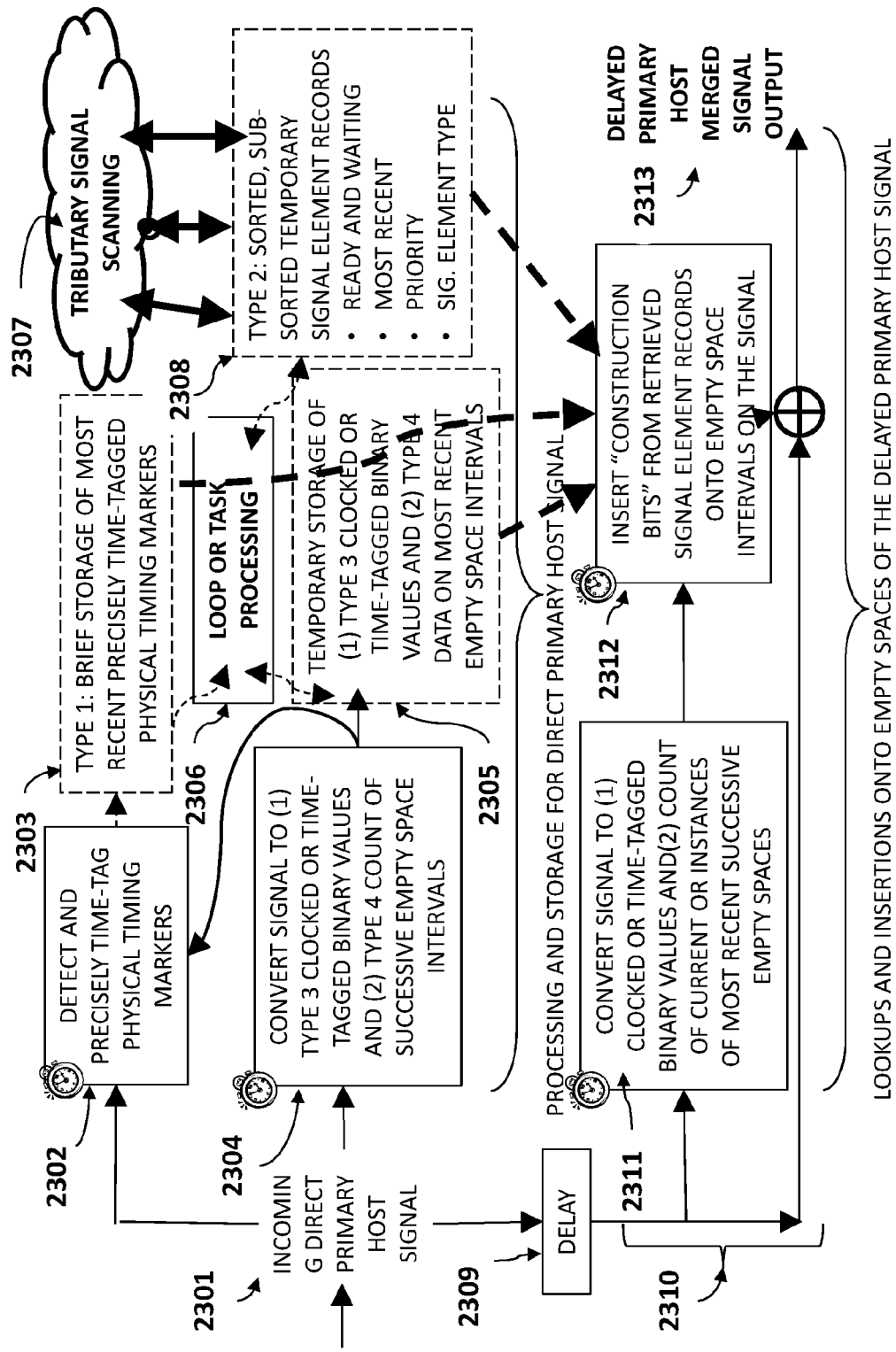
FIG. 23 further details transmitter signal subsystem processing of a primary host signal.

Referring to FIG. 23, this figure illustrates an exemplary process for transmitter subsystem processing according to an aspect of the present disclosure. Input 2301 is a continuous incoming (Direct) Primary Host Signal. A subsystem 2302 detects and precisely time-tags instances of physical timing markers, where these markers generally correspond to less precise time-tags of clocked binary values on a parallel pathway illustrated by 2304. Subsystem 2302 may use current or recent item time-tagged samples to time-correlate or signal correlate system 2304's observations. In an aspect, subsystem 2302 may also use algorithms to more finely determine the time-tag. The "Type 1: Brief Storage of the Most Recent Precisely Time-Tagged Physical Timing Markers" 2303 may act as temporarily storage for the time-tagged marker records and possibly datasets of successive values.

The incoming signal 2301 also enters hardware circuitry 2304 which will "clock" the direct signals into time-tagged binary values into "Type 3" temporary storage 2305, which will be used for detection of signal elements. The clocking will occur (1) near the intended bit rate of the signal and (2) thus at a "clocking" resolution which is less precise than the previous physical timing marker subsystem 2302. Also at circuitry 2304, parallel circuits will also (a) measure-or-count successive empty space intervals (1) which have time-interval samples and (2) which all have successive values less than a predetermined threshold value and (b) identify separate empty intervals by time-tagging as well as by sequence or record number. At temporary storage 2305, the stored records will also contain Type 4 indexed accessible records having recent empty time interval information such as signal ID, start-time-tag, duration, or end-time-tag.

Processing 2306 for a Primary Host Signal, includes a processing loop or task which (1) detects, ignores, transfers, or processes binary values which are read from temporary storage 2305 and (2) forms database storage 2308 as sorted or sub-sorted Type 2 database records with optional insertion-ready "constructed bit" images. The storage 2308 is in the form of intrinsically high-speed registers or slower access memory. At 2307, tributary signal or internally generated stream processing loops or tasks will also similarly store information records in the same Type 2 database 2308.

An incoming Primary Host Signal can also pass through a delay component 2309 (or splitter or suitable equivalent), which results in two ongoing signal images herein referred to as 2301, the Direct Primary Host Signal and 2310, the Delayed Primary Host Signal.

Signal element and signal forming tasks when scanning delayed primary host signals insert (1) virtual timing marker messages or (2) plain messages onto empty spaces of a Delayed Primary Host Signal. The Delayed Primary Host Signal continuously passes through FIG. 23 signal-merging or signal-insertion components 2311 and 2312. The signal element and signal forming tasks operate in conjunction with appropriate hardware which can merge or insert their own trains of "constructed bits" upon the signal, by planning and design, onto empty space intervals. All main and ancillary tasks follow "exclusive-OR" or "TEST AND SET" locking rules of engagement to maintain data integrity and prevent overwriting of signal elements.

Similar to 2304, the Delayed Primary Host Signal enters subsystem 2311, which will (1) "clock" the direct signals into time-tagged binary values and (2) recognize previously detected empty space intervals for the 2312 loops or tasks which will be used for insertion of selected tributary signal elements on adequate-size empty space intervals. The 2312 loop or task can also use the Type 2 or 4 databases to track candidate empty space intervals for appropriate signal element insertions. Loop or task 2312 will retrieve Type 2 database records (1) which are "ready" or (2) in a predetermined-mode-or-sub-mode order when Primary Host Signal mode is used. Also, loop or task 2312 will insert "construction bit" images from the retrieved signal element records onto selected empty space intervals on the Delayed Primary Host Signal for a Delayed Primary Host Merged Signal Output 2313. If (a) the chosen implementation rules create Type 2 tributary physical timing markers and (b) loop or task 2312 cannot find adequate empty space at the targeted output signal interval, 2312 may alternatively create a corresponding Type 2 virtual timing marker record and extension for later insertion.

Note that the above sorted storage and retrieval criteria will change when using different and later embodiment modes: (a) a "first-come-first-served" order for FIRST-COME-FIRST-SERVED mode and (b) a "highest priority" order without any even-higher priority Primary Host Signal template for PRIORITY PREFERENCE mode.

Processing a Tributary Signal

Figure 24:
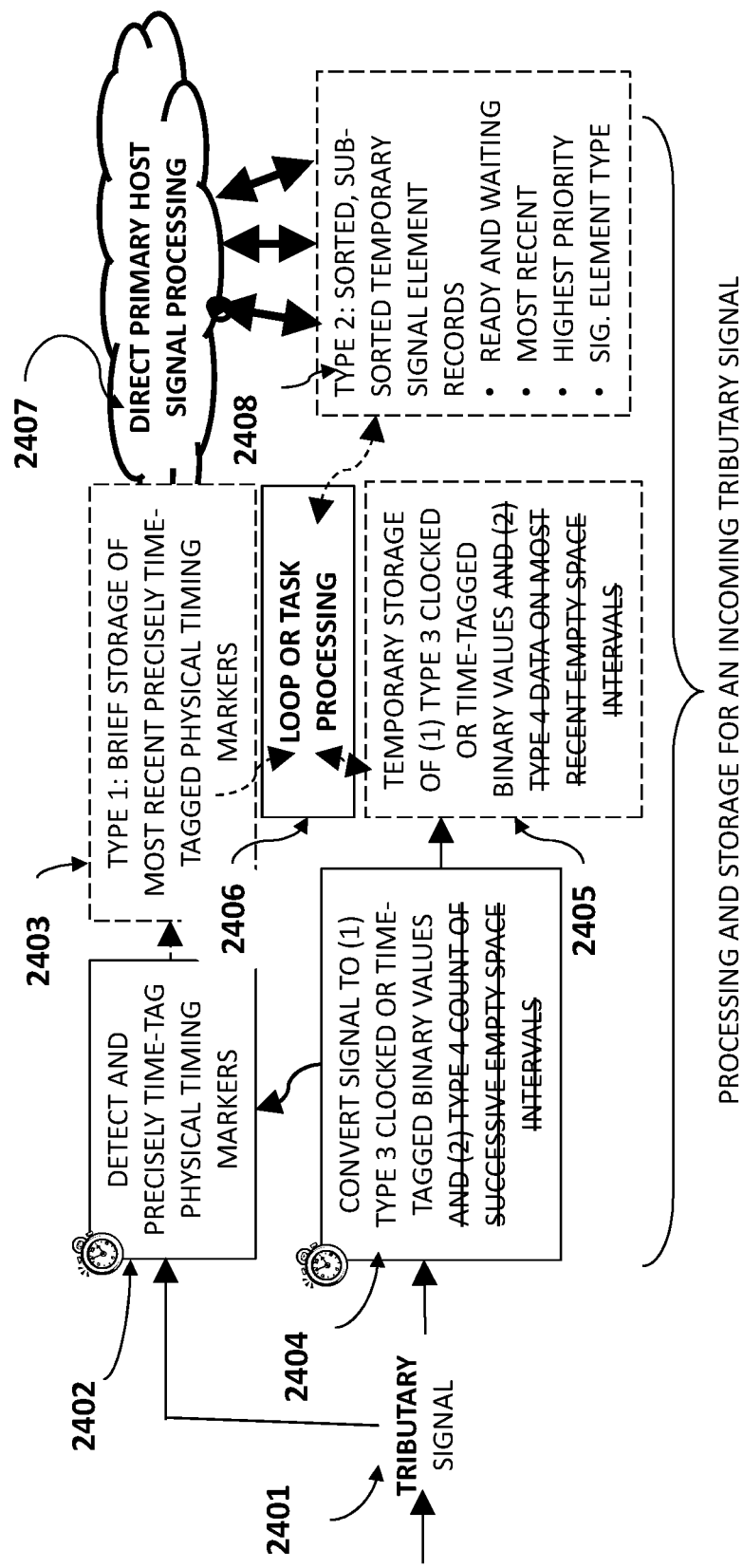
FIG. 24 further details transmitter signal subsystem processing of a tributary signal.

Earlier it was mentioned that at 2307, each tributary stream may have virtual timing marker and message signal elements to contribute as records in the Type 2 databases 2308. FIG. 24 illustrates an exemplary Tributary Incoming Signal Subsystem Processing methodology according to the present disclosure. When a tributary signal 2401 enters as an incoming signal, the top half of the diagram is similar to Primary Host signal processing in FIG. 23, but the bottom half (i.e., elements 2309, 2310, 2311, 2312, and 2313 in FIG. 23) is not used because there will be no insertions onto any tributary empty spaces and, as a consequence, there is no delayed tributary signal image.

Items 2401-2408 of FIG. 24 (as tributary incoming signals) are essentially the same as elements 2301-2308 of FIG. 23 (as a Direct Primary Host Signal). Differences in FIG. 24 from FIG. 23 are that there are no tributary empty space intervals that are monitored or stored at items 2404, 2405, and 2406. Item 2407 now refers to a Direct Primary Host Signal instead of tributary signals as additional sources of Type 2 database records.

At FIG. 24, 2402 is a continuous dedicated loop is used to (1) examine an incoming tributary signal to precisely time-tag physical timing markers and (2) update a 2403 Type 1 database of the most recent physical timing markers.

At figure FIG. 24, item 2404 is another loop used to (1) convert the signal into clocked or time-tagged binary values and (2) but not count the current instances of successive empty space intervals. At FIG. 24, item 2406 is a loop or task to repetitively scan and examine an incoming signal in a binary value sample-group by sample-group sequence and update database 2408 which is the same database as 2308.

Direct Primary Host Mode Loop or Task

Figure 25:
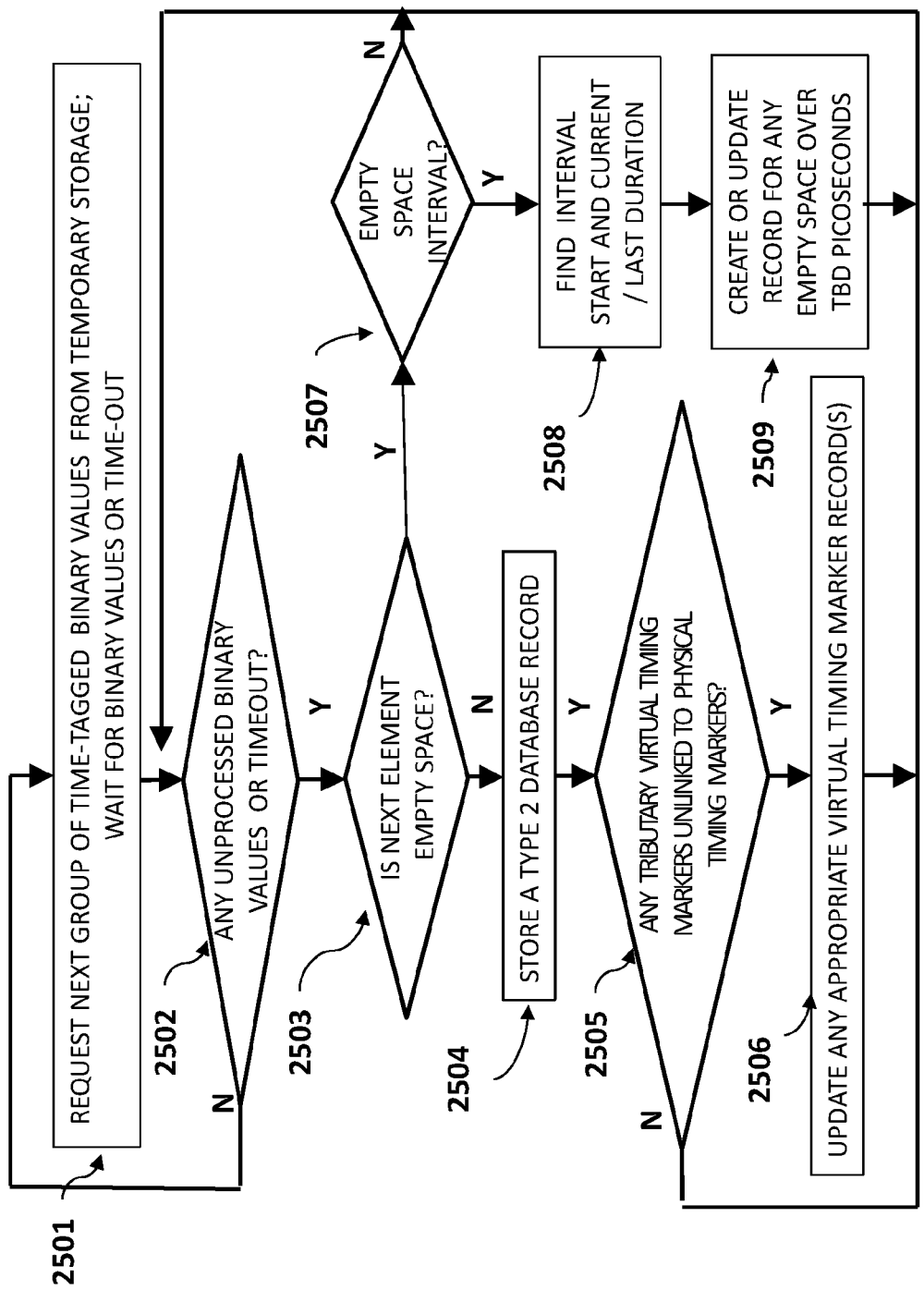
FIG. 25 diagrams a direct primary host mode loop or task.

FIG. 25 illustrates a flow diagram of an exemplary method for a Direct Primary Host Mode Loop or Task. As shown, the method includes a block 2501 of requesting a next group of binary values from temporary storage. This block 2501 may include waiting for binary values or a notice of time-out. Flow proceeds to block 2502 where a determination is made whether any unprocessed binary values remain in a fetched binary value field or a timeout has occurred. If not, flow proceeds back to block 2501. On the other hand, if unprocessed binary values are present or a timeout has occurred, flow proceeds to decision block 2503, where a determination is made whether a next signal element is empty space. If so, flow proceeds to block 2507. Alternatively, flow proceeds to block 2504.

At block 2504, if there is an unprocessed signal element, the signal element is used to store a corresponding Type 2 database record. If the signal element is a physical timing marker, it's time-tag may be used to retrieve the corresponding more precise record from the Type 1 More Precisely Time-tagged Database or List of the Most Recent Physical Timing Markers. Optionally, this could include storing a record in the Type 2 database as shown in FIG. 22. In a further aspect, a request flag could be posted to activate any pertinent tributary scanning loop task(s) to process any relevant Type 2 database signal element record After block 2504, flow proceeds to block 2505 to determine if any tributary virtual timing markers records are unlinked to physical timing markers (i.e., unlinked meaning no corresponding physical timing markers). If so, then any appropriate virtual timing marker record(s) are updated using new precise physical timing markers as indicated at block 2506. Otherwise, flow proceeds back to block 2502.

Turning back to block 2507, this decision block determines if an empty space interval exists. If not, then flow proceeds back to block 2502. On the other hand, if space exists, flow proceeds to block 2508 where a current or latest empty space interval count is retrieved from the parallel empty space interval Type 4 databases. Next at 2509, if the empty space increment count is greater than some predetermined valued (e.g., 1 or To Be Determined (TBD) value), then create or update a Type 4 empty space record having empty space duration, counts, beginning time-tag, ending time-tag, etc. over a corresponding time interval (such as in milliseconds, microseconds, nanoseconds, or picoseconds).

Tributary Loop or Task for Each Input Tributary During Primary Host Mode

Figure 26:
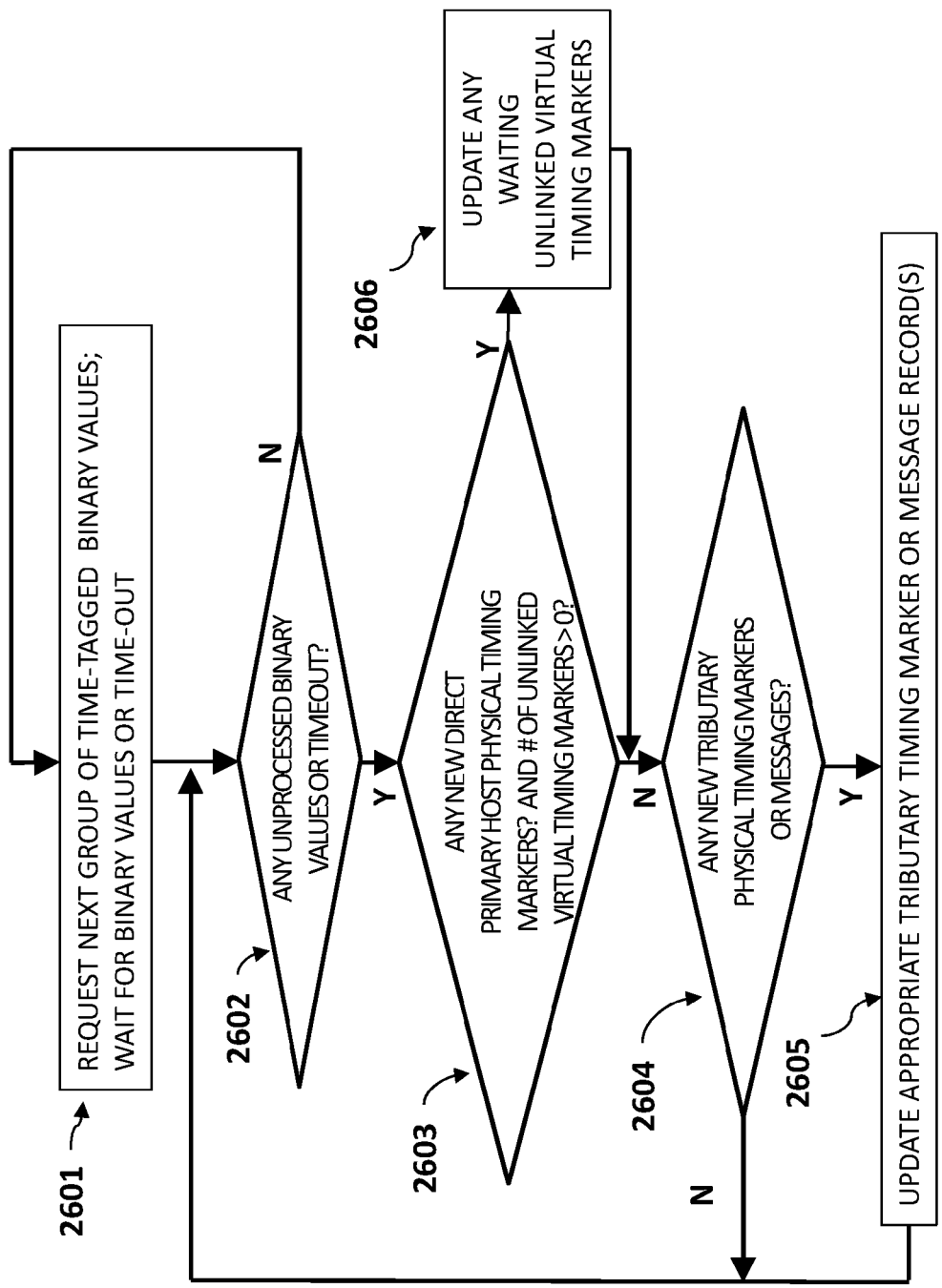
FIG. 26 diagrams primary host mode: a tributary loop or task for each input tributary stream.

FIG. 26 illustrates an exemplary flow diagram of the operation of a Tributary Loop or Task for Each Input Tributary Stream during Primary Host Mode. The method is configured as a continuous loop to repetitively scan either an incoming group of signal sample values or each newly internally generated group of sample values for pertinent tributary signal elements or timeout. As illustrated, the loop includes block 2601 where an input command is issued to request a next group of binary values, and the block waits for binary values or for a notice of time-out. Next, flow proceeds to decision block 2602 where a determination is made if any unprocessed binary values remain in the requested binary field or a timeout has occurred. If not, flow proceeds back to block 2601.

On the other hand, if unprocessed values exist or a timeout has occurred, flow proceeds to block 2603 to determine if any new Direct Primary Host Mode physical timing markers have been detected and the number of waiting Type 2 database "unlinked" virtual timing markers records is greater than zero. That is, determine whether a search is needed to possibly update any unlinked virtual timing marker database records.

If yes, flow proceeds to block 2606. Attempts are made to link new Primary Host physical timing markers to any currently unlinked virtual timing marker database records according to pertinent virtual timing marker record rules such as in fulfilling redundancy minimum instance counts, adequately dispersing redundant virtual timing markers, etc. When such rules are met for any virtual timing marker database record, the record is updated and a "ready and waiting" flag on the record is raised.

If the answer is negative in block 2603, then flow proceeds to block 2604 where a determination is made whether there are new (tributary) physical timing markers or messages.

If there are new tributary physical timing markers, then block 2605 activities may include, for each new tributary physical timing marker: (1) saving the precise time-tag of the tributary physical timing marker which is preferably discerned by the "Type 1 More Precisely Time-tagged Database or List of the Most Recent Physical Timing Markers" component, circuit, or optional algorithms, (2) selecting an appropriate record from the list of most recent physical timing markers of the Direct Primary Host Signal, (3) calculating the time-offset or displacement of this timing marker from the list entry, (4) converting to form any needed "constructed bit image", (5) storing the tributary physical timing marker as (a) a Type 2 physical timing marker record—or (b) a Type 2 virtual timing marker record with virtual timing marker extension record, (6) updating the ready or waiting status flags, and (7) requesting activation of the corresponding Delayed Primary Host task.

Furthermore, if there are new pertinent messages (including any prior embedded existing virtual timing marker messages), then processing may include, for each such message: (1) preparing and forming the signal element into a temporary "Type 2 Signal Element Database" record or any applicable virtual timing marker extension type record including any "construction bit field" and (2) requesting activation of the corresponding Delayed Primary Host task On the other hand, if the signal element is something else or an empty space interval then the flow proceeds from block 2604 to block 2602 as illustrated. Note: no empty space intervals are sought in tributary or internally generated streams.

Loop or Task for Scanning the Delayed Primary Host Signal

Figure 27:
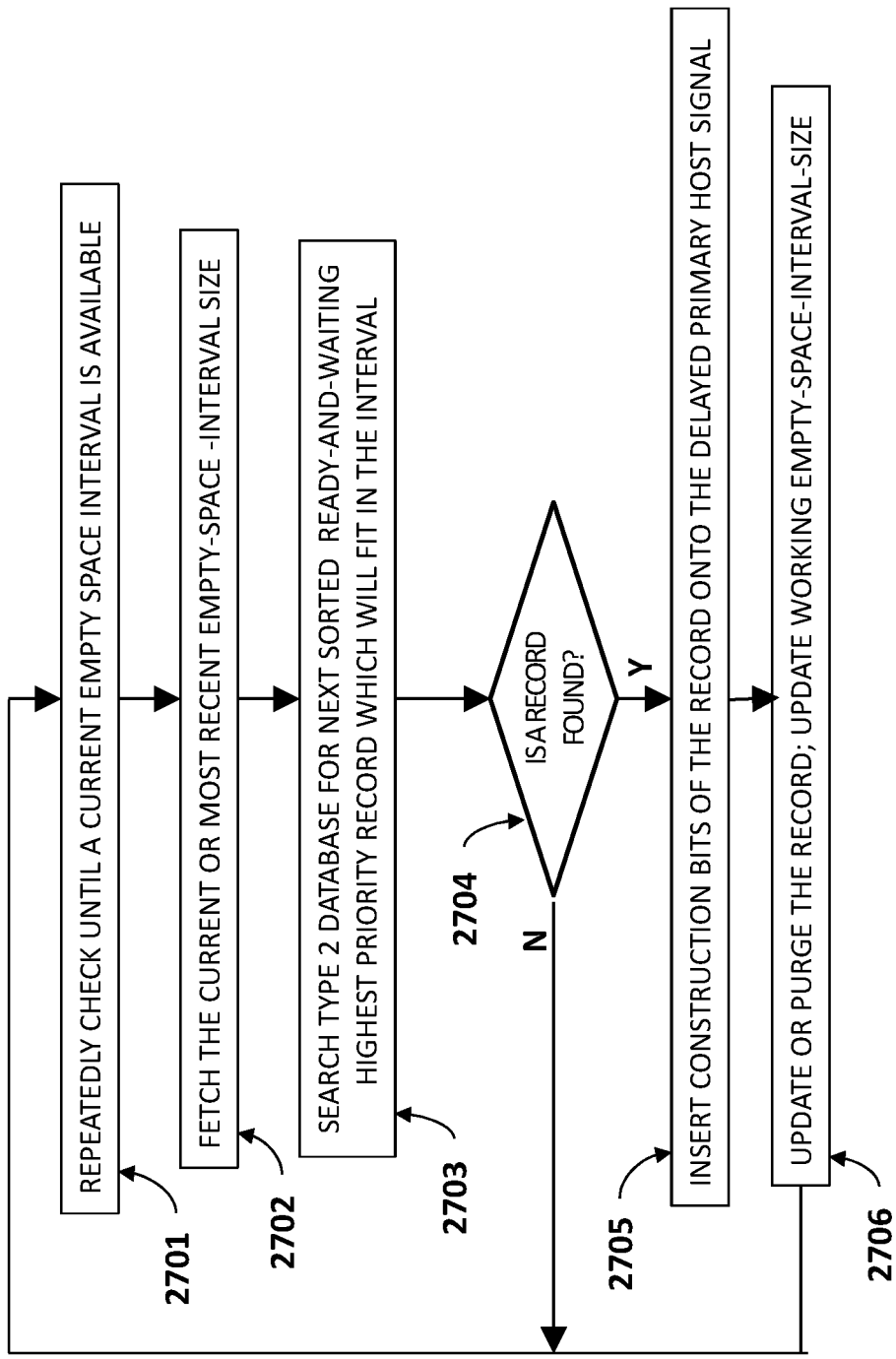
FIG. 27 diagrams a loop or task for scanning the delayed primary host signal.

FIG. 27 illustrates another exemplary flow diagram of a method of a Loop or Task for processing a Delayed Primary Host Signal. As illustrated, the process includes block 2701 where a repeated check is made until an empty space interval occurs by monitoring or tracking (1) the results of the clocking of subsystem 2311 in FIG. 23 or (2) the empty space intervals of the Type 4 database, all while compensating for the delay between the Direct and Delayed signal. Flow then proceeds to block 2702 where the current or most recent empty space interval size is fetched, such as fetching current data from subsystem 2305 in FIG. 23 or subsystem 2204 in FIG. 22 (i.e., "Type 4 records for the current and the most recent empty space intervals"). In an aspect, subtraction of another additional very infinitesimal interval from the size as a margin of safety may be made to prevent overwriting any signal elements on the output signal.

Next, flow proceeds to block 2703 where the "Type 2 Signal Element Database" is searched for a next priority-sorted-list for a record with (1) the highest priority "ready and waiting" record (e.g., ready and waiting virtual timing marker message or a plain message) and (2) a size which will fit in the (margin of safety adjusted) current empty space interval. From block 2703, flow proceeds to decision block 2704 to determine if a record is found. If a record is found, then flow proceeds to block 2705 where the current record message construction bits are inserted onto the empty space interval of the Delayed Primary Host Signal. Next, flow proceeds to block 2706 where either (1) the record for the next iteration is updated or (2) the record is purged, and an update of the current remaining working size of the empty space interval is made. From here, the process loops back to block 2701. It is further noted that if no record is found at decision block 2704, then flow proceeds back to block 2701.

Regarding block 2705, in another aspect and in compliance with a possible alternative mode variation, if the Type 2 database record is marked to request insertion of a physical timing marker and the targeted space interval is available as empty space and adequate in size, a physical timing marker is inserted; optionally a signal ID may be added for possible later demerging of signals. But if the targeted space or interval is not available or adequate in size, the database record is instead updated to form a virtual timing marker.

Additional Notions for First-Come-First-Served Mode in Transmitter Subsystems

Salient processing differences of FIRST-COME-FIRST-SERVED MODE over the above-described PRIORITY HOST SIGNAL MODE are as follows: (1) there is no splitting into direct and delayed signals; (2) an additional "Type 1 database is used as a tracking list of the most recent physical timing markers deposited on the OUTPUT SIGNAL" which is separate and distinct from Type 1 databases to track TRIBUTARY INPUT physical timing markers; (3) Instead of tributary signal elements being inserted onto empty spaces of a PRIORITY HOST SIGNAL, (a) FIRST-COME-FIRST-SERVED tributary signal element insertions are made on an entirely empty signal on a first-come-first-served basis and (b) only when the first attempt of a signal element's aforementioned exclusive "test and set" access to the merged or output signal immediately succeeds. Unsuccessful requests must wait, and thus any late tributary physical timing markers must be converted into virtual timing markers and stored in Type 2 Database records with virtual timing marker extensions. Any other types of pertinent signal elements are also stored as Type 2 Database records.

Figure 28:
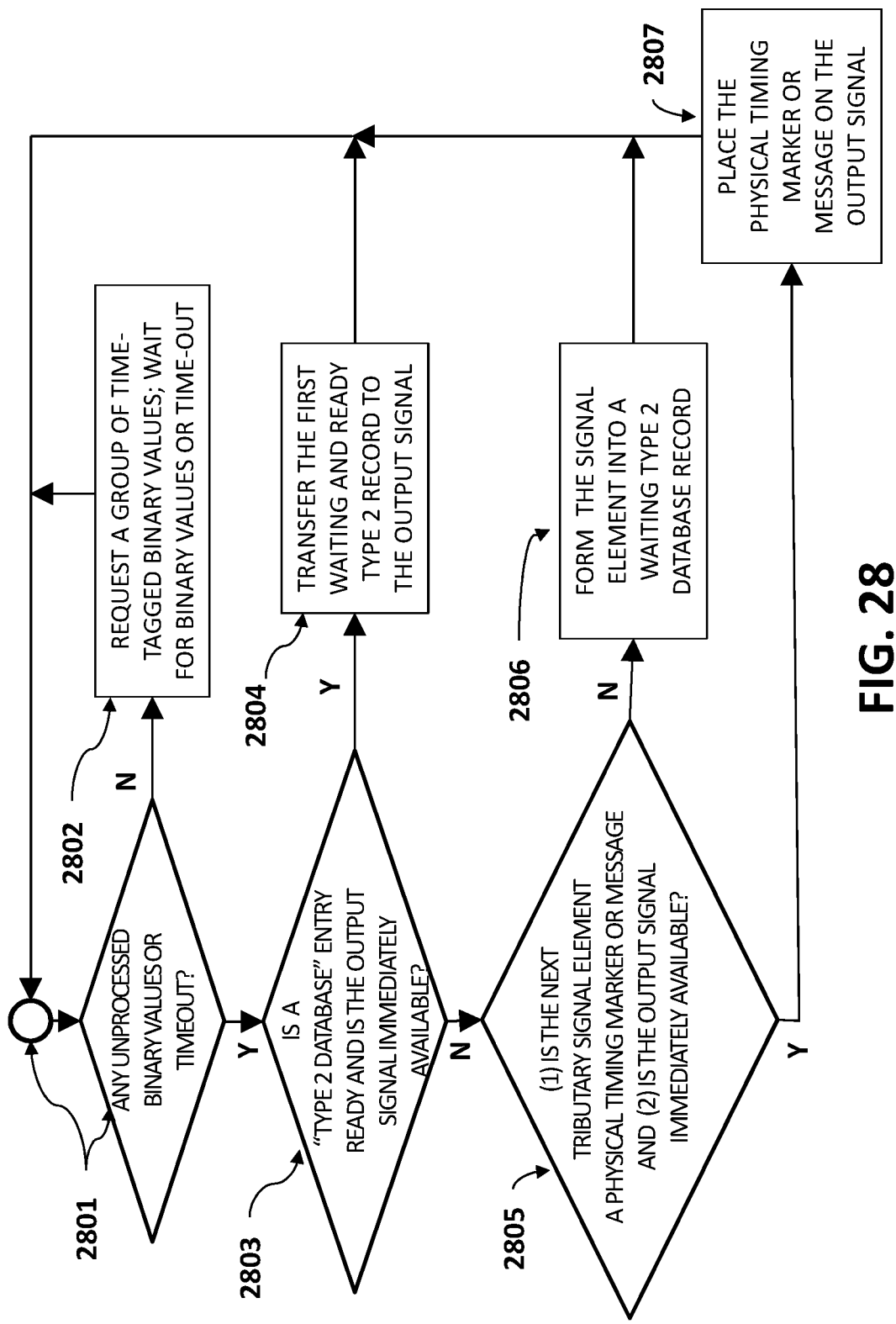
FIG. 28 diagrams a first-come-first-served tributary loop or task.

Therefore there are no dedicated loops or tasks to scan a direct Priority Host signal input because no template Priority Host signal will be used at a higher priority than the tributary signal elements. Similarly there are no dedicated loops or tasks to scan a delayed priority host signal because there is no delayed priority host signal FIG. 28 illustrates an exemplary flow diagram of a methodology for a First-Come-First-Served Mode Tributary Loop or Task. This process may be configured as a continuous loop to cyclically scan (a) an incoming group of signal sample values or (b) each newly internally generated group of sample values for pertinent tributary signal elements At decision block 2801, a determination is made whether any unprocessed binary values are available or a timeout has occurred. If not, then flow proceeds to block 2802 where a request is made for a group of time-tagged binary values, and the process waits for binary values or time-outs. Optionally, this process could include also waiting for activation by another task, or return to block 2801.

If there are unprocessed values or timeout, as determined at 2801, flow proceeds to decision block 2803 where a determination is made whether a type 2 database is entry ready and (2) whether the output signal is immediately available (note: in an aspect a choice is made to choose the earliest time-tagged ready record—specifically for this first-come-first-served mode). If these conditions are met, then flow proceeds to block 2804 where a transfer is made of the "constructed bit image" with signal ID of the chosen record to the output signal. If this is a redundant virtual timing marker record then update the virtual timing marker record accordingly.

On the other hand, if the conditions of block 2803 are not met, then flow proceeds to decision block 2805 where it is determined (1) if the next tributary element is a physical timing marker or message and (2) if the output signal is immediately available for insertion (e.g., via simultaneous "test and set" locking logic). If yes, then flow proceeds to block 2807 where a physical timing marker or message is placed on the output signal. In an aspect, retrieve the corresponding more precisely time-tagged physical timing marker data from (a) the current (possibly parallel) component, circuit, or optional algorithms or (b) Type 1 tributary input physical timing marker database. Then, place the physical timing marker and signal ID on the output signal.

In an aspect, a "Type 1 OUTPUT SIGNAL database or tracking list of the most recent physical timing markers which have been deposited on the OUTPUT SIGNAL" is updated.

In the alternative at block 2805, flow proceeds to block 2806 where the signal element is formed into a waiting Type 2 database record.

In another aspect, the method includes either (a) finding an appropriate record from a "Type 1 OUTPUT SIGNAL database or tracking list of the most recent physical timing markers deposited on the OUTPUT SIGNAL" then (i) calculating the time-offset or displacement of this physical timing marker from the tracking list entry and (ii) forming any needed "constructed bit image" or (b) flagging this record as waiting for an appropriate physical timing marker. Then (1) store this physical timing marker as a virtual timing marker message in a "Type 2 Signal Element Database" with virtual timing marker extension record with a signal ID, precise target time, precise time-offset or displacement, and "constructed bit image", and (2) update ready or waiting status flags In still another aspect, if the signal element is a pertinent message (including any prior embedded existing virtual timing marker message) then prepare and form the signal element into a temporary "Type 2 Signal Element Database" record including any "construction bit field." Otherwise, if the signal element is something else or an empty space interval then ignore the item and note that there are no empty space intervals sought in tributary or internally generated streams.

Further Notions for Priority Preference Mode in Transmitter Subsystems

As stated earlier, PRIORITY PREFERENCE MODE attempts to IMMEDIATELY place any incoming tributary physical timing markers onto the output signal. Other physical timing markers, which are too late because another entry is already currently being posted on the output signal, must wait until access to the output signal is available. There is polling for (a) an immediate arriving physical timing marker for immediate transfer or else (b) the next highest priority waiting and ready available Type 2 database record. Any waiting record is chosen by the record signal element type PRIORITY which, of course, is different and opposed to FIRST-COME-FIRST-SERVED's search which selects by (1) the first ready and waiting record with (2) the earliest time-tag.

Figure 29:
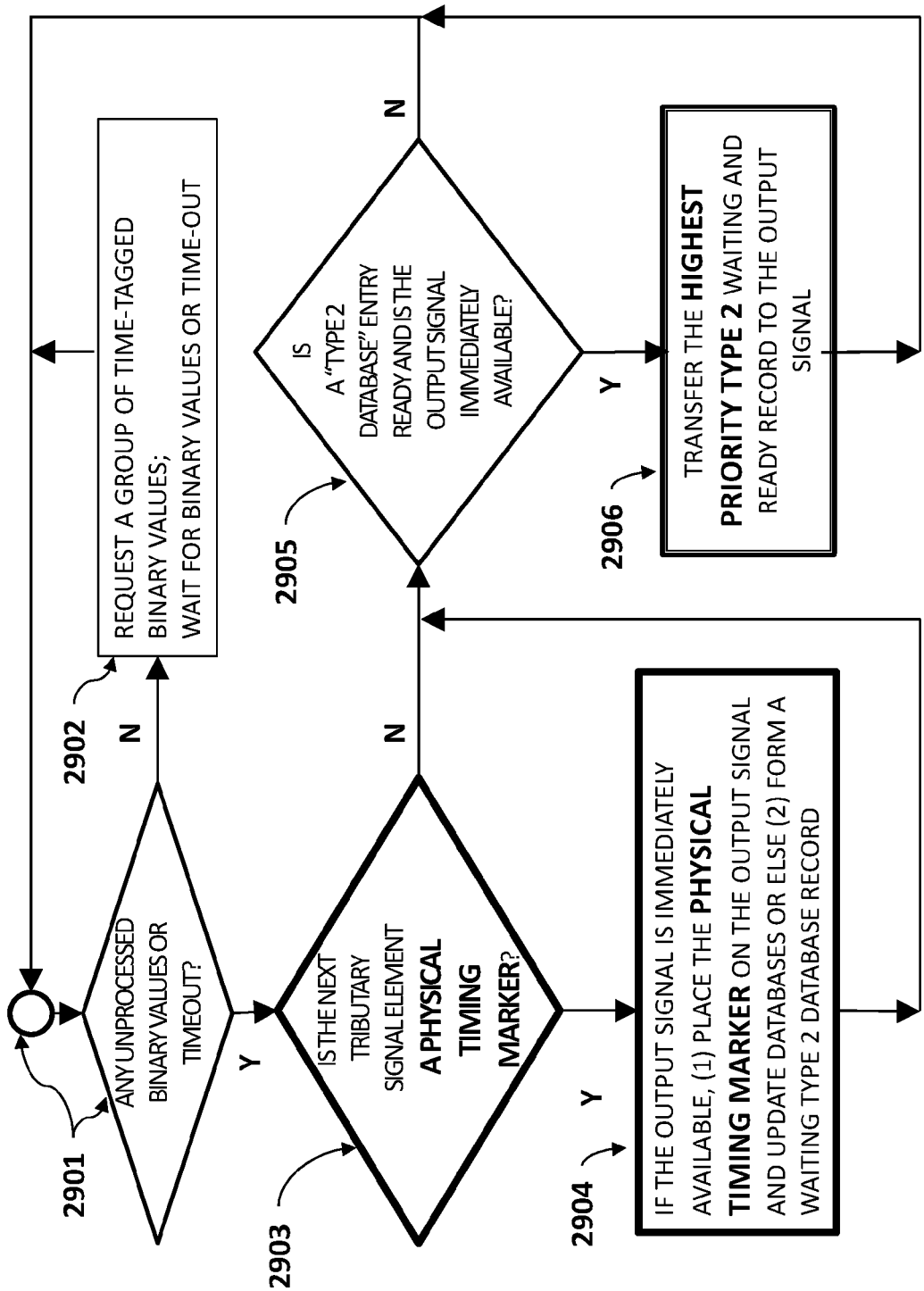
FIG. 29 diagrams a priority preference mode tributary loop or task.

FIG. 29 illustrates an exemplary flow diagram of a priority preference mode tributary loop or task process. It is noted here that the FIRST-COME-FIRST-SERVED MODE processes 2801 and 2802 on FIG. 28 are identical to processes 2901 and 2902 in FIG. 29 for PRIORITY-PREFERENCE MODE.

FIG. 29 illustrates at decision block 2903 that a check is made if the unprocessed values include the next tributary signal element being a physical timing marker (i.e., not messages). If so, the process 2904 includes, if the output signal is immediately available, placing the physical timing markers (i.e., not messages) immediately on the output signal whereas others must be initially posted on Type 2 databases and wait for later insertion. In other aspects, some database records may be updated. The flow then proceeds to block 2905, which is also the destination should decision 2903 yield a negative result.

At block 2905, a determination is made whether a type 2 database entry is ready and if the output signal is immediately available. If not, flow proceeds back to block 2901. In the alternative, flow proceeds to block 2906 where the highest priority type 2 waiting and ready record is transferred to the output signal. In some cases such as redundant virtual timing markers, some database records may require updating rather than purging.

Other Notions on Delays

It should be noted that significant signal delays may or may not be introduced by the preceding embodiments. Delays can be added (1) merely by the innocent act of redirecting a signal through a subsystem or additional circuit or (2) by deliberate delays to measure empty space intervals of a signal just prior to insertions. Sometimes delays of physical timing markers matter; and sometimes delays are innocuous. Depending on the application and circumstance, virtual timing marker methods may also be implemented in ways which eliminate delays or minimize the effects of delays. Some will be mentioned here but not detailed for the sake of brevity in this document.

For example, if there are only internally generated tributaries and no input signals, no Delayed Primary Host signal is needed. If the design calls for tributary signal elements to be stored only on PREDEFINED empty spaces of Primary Host Signal packets or packet headers, then (a) tributary insertions can take place as the packets or headers go by and (b) no Delayed Primary Host signal is needed. Designers can compensate or erase the effects of "known measurable delays" for timing markers by correspondingly adjusting pertinent virtual timing marker offsets to earlier or otherwise desirable target positions in the output signal. While there must be physical timing markers which are reference-able at pertinent times, ALL INPUT SIGNALS (Primary Host or tributary) can have virtual timing markers added which can be adjusted to (zero any delay offsets and counter effects) by including the known delay figures in virtual timing marker computations.

Additional Basic Details and Methods of Signal Forming—Especially Using Priority Preference Mode This is (1) a less important detailed discussion regarding virtual timing marker methods to merge signal elements into an output signal, (2) merely a continuation of the discussion on decision options, benefits, and goodness criteria when merging signal elements, and (3) more specifically an embodiment example of PRIORITY PREFERENCE mode which was not detailed as much in the earlier discussions and embodiments.

As stated earlier, since input or internally generated signal elements arrive for signal forming, designers or implementers need to choose policies on which signal element of several potential incoming signals must be inserted next on any merged output signal.

Priority Preference Mode means that while examining incoming signals simultaneously or instantaneously within an infinitesimally small time window, the selection logic chooses the next signal element for insertion based on the highest priority signal element available. In cases where more than one signal elements have EQUAL PRIORITY, (1) probably the FIRST one encountered is better or (2) a more cumbersome alternative would be to choose the ones in a very short time window which have the shortest messages first—such as virtual timing markers.

The signal forming logic polls or scans each input source for its next signal element and determines its priority according to signal element type such as: (1) highest for physical timing markers, (2) next highest for signal events such as signal start or break in signal, (3) middle for virtual timing markers, and (4) lowest for other signal elements such as messages.

It should be noted that if (a) a signal element message is currently being inserted onto the output signal and (b) a slightly late but higher priority physical timing marker then arrives, that the slightly late but higher priority physical timing marker cannot be immediately placed on the signal (unless the design includes the ability to abort the message insertion). Thus, generally speaking, this probably means that in most implementations, the late physical timing marker will be converted into a deferred virtual timing marker message.

Figure 30:
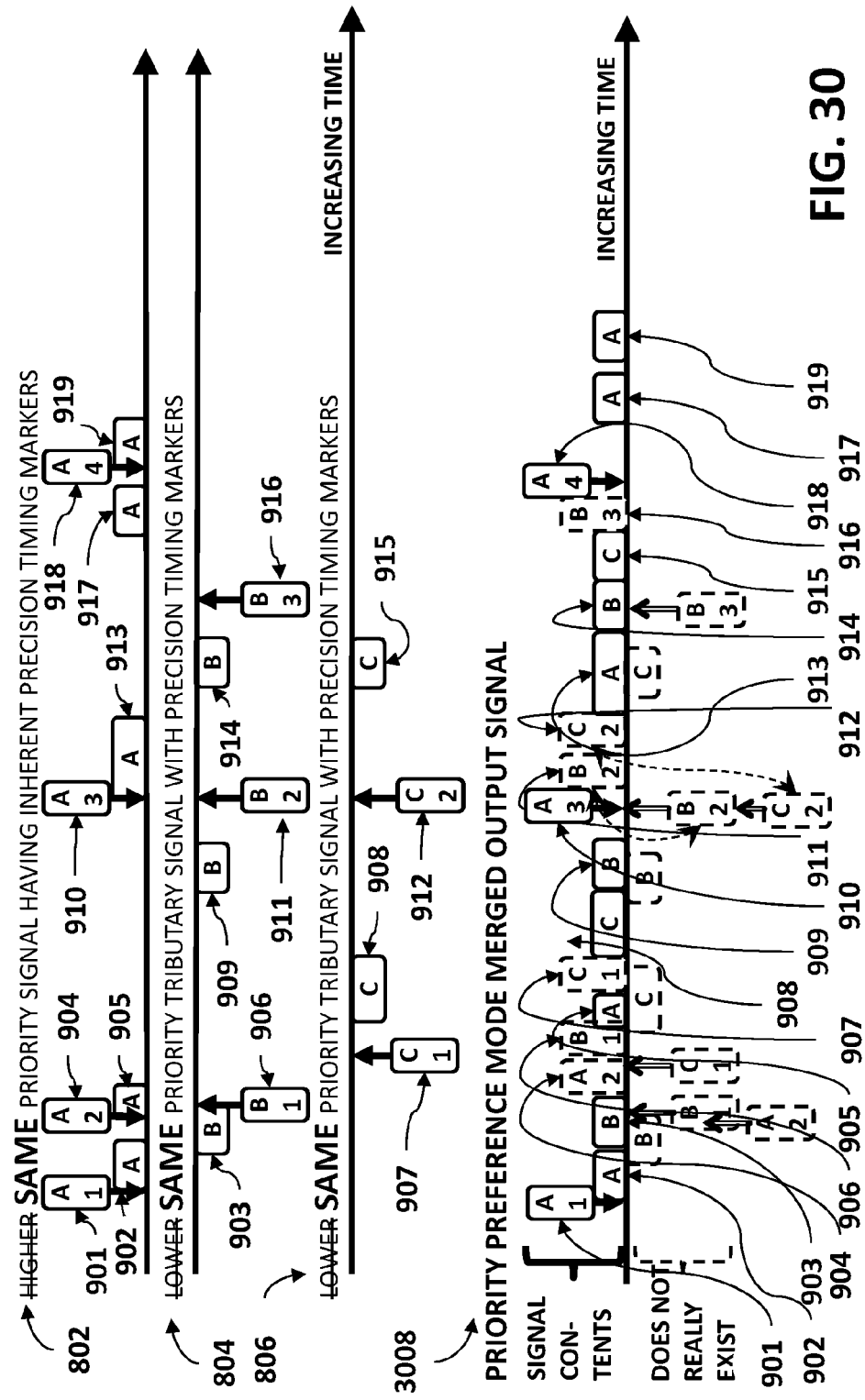
FIG. 30 shows a "PRIORITY PREFERENCE MODE" when all signals have the same entering priority signals but signal elements are prioritized by signal element type.

FIG. 30 shows what may happen under "PRIORITY PREFERENCE MODE" methods when three SAME priority signals are merged by following previous example signal element priorities. Note: (References below include: (a) FIGS. 8, 9 (in Priority Host Mode), (b) FIG. 10 (in Priority Host Mode and First-Come-First-Served Mode), and (c) FIG. 30 (in Priority Preference Mode)

FIG. 30 (in Priority Preference Mode) uses the same signals and signal element items as the preceding FIGS. 8, 9, and 10 in other modes, but FIG. 30 now shows that the item 3008 merged signal output has slight sequence changes for the (identically) numbered items 901 through 919.

There are instances where a higher priority physical timing marker arrived slightly after a lower priority message. In such cases the message was already being inserted on the output signal, hence could not be interrupted (i.e., there was no capability to abort the message insertion in this example). The late physical timing marker had to be converted into a deferred virtual timing marker message.

For example in FIG. 30, item #904 as an A2 physical timing marker and item #906 a B1 physical timing marker—have both become delayed virtual timing marker messages. In both cases, messages were being transferred to the merged output signal when the physical timing marker was encountered. So in each case, the physical timing marker was converted into a deferred virtual timing marker. When the item #916 B3 physical timing marker became a virtual timing marker message, there was still sufficient space for the item #918 A4 physical timing marker to be directly transferred to the output signal. Item #917 message A has been deferred because of the ongoing items #916 and #918—thus item #917 has been inserted much later.

Figure 31:
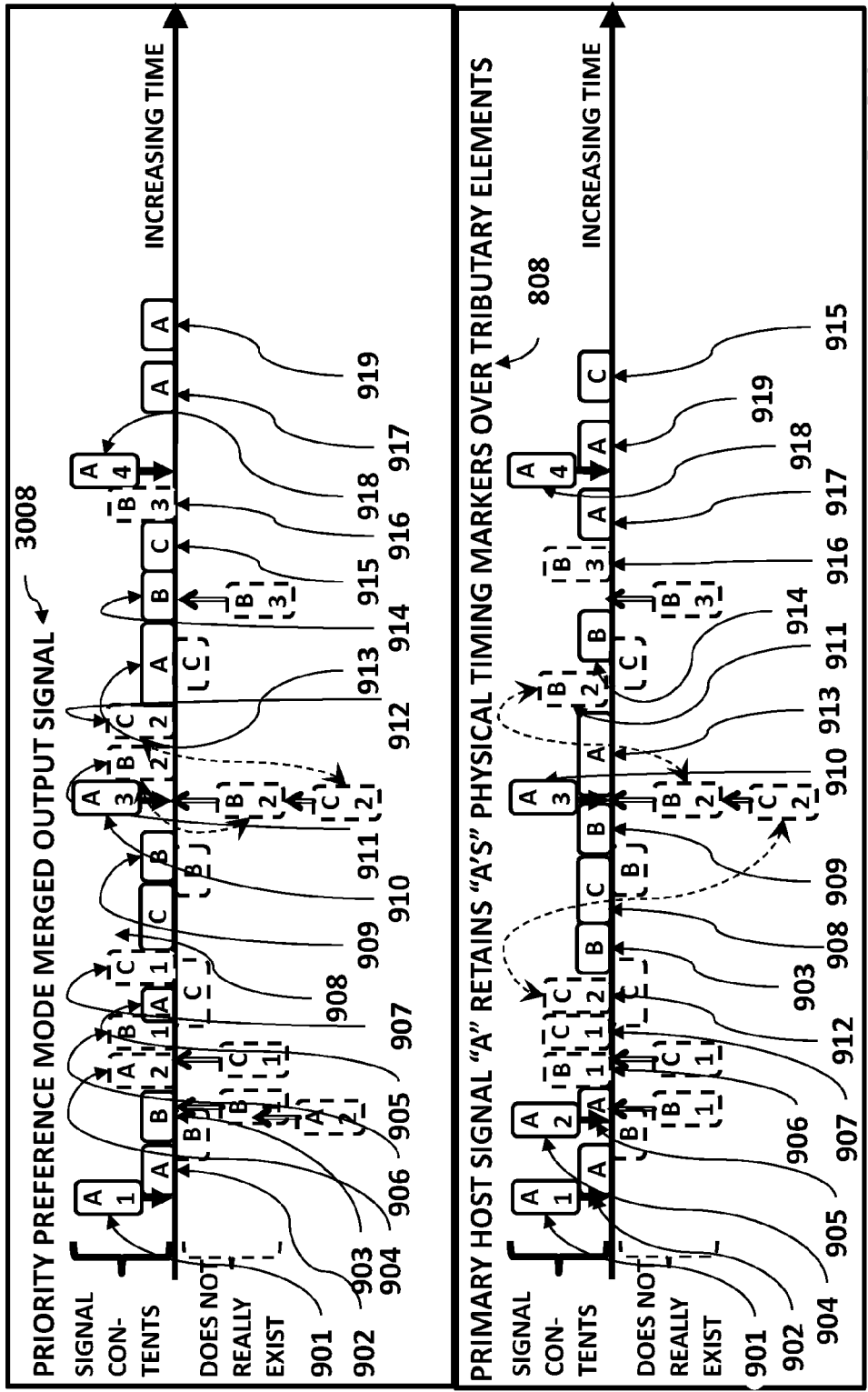
FIG. 31 compares results of priority preference mode vs primary host signal mode.

The earlier FIG. 11 compares the results of First-Come-First-Served versus Primary Host Signal modes for the same 3 entering signals. Likewise FIG. 31 compares the results of PRIORITY PREFERENCE MODE versus Primary Host Signal Mode.

For this short sample, it should be expected that Primary Host Signal Mode preserves all signal A physical timing markers because all item 802 Signal A elements are of higher priority than item #804 Signal B or item #806 Signal C elements; it does.

Note that in FIG. 30, the Priority Preference Mode Merged Output Signal 3008 had one instance where an A2 physical timing marker had to be converted into a virtual timing marker message. Note also in this particular short example that neither signal B nor signal C had any physical timing markers preserved as physical timing markers.

When the merged output signal will be dense, it can be expected that more tributary physical timing markers might be converted into virtual timing marker messages when using Priority Preference Mode compared with Primary Host Signal Mode. It might be prudent to have test runs on representative signals and data. They should be run to confirm behavior and goodness criteria outcomes when performing design trade-off decisions. Note: Items #901 through #919 represent the same signal elements in FIGS. 8, 9, 10, 11, 30, 31, and 32.

Figure 32:
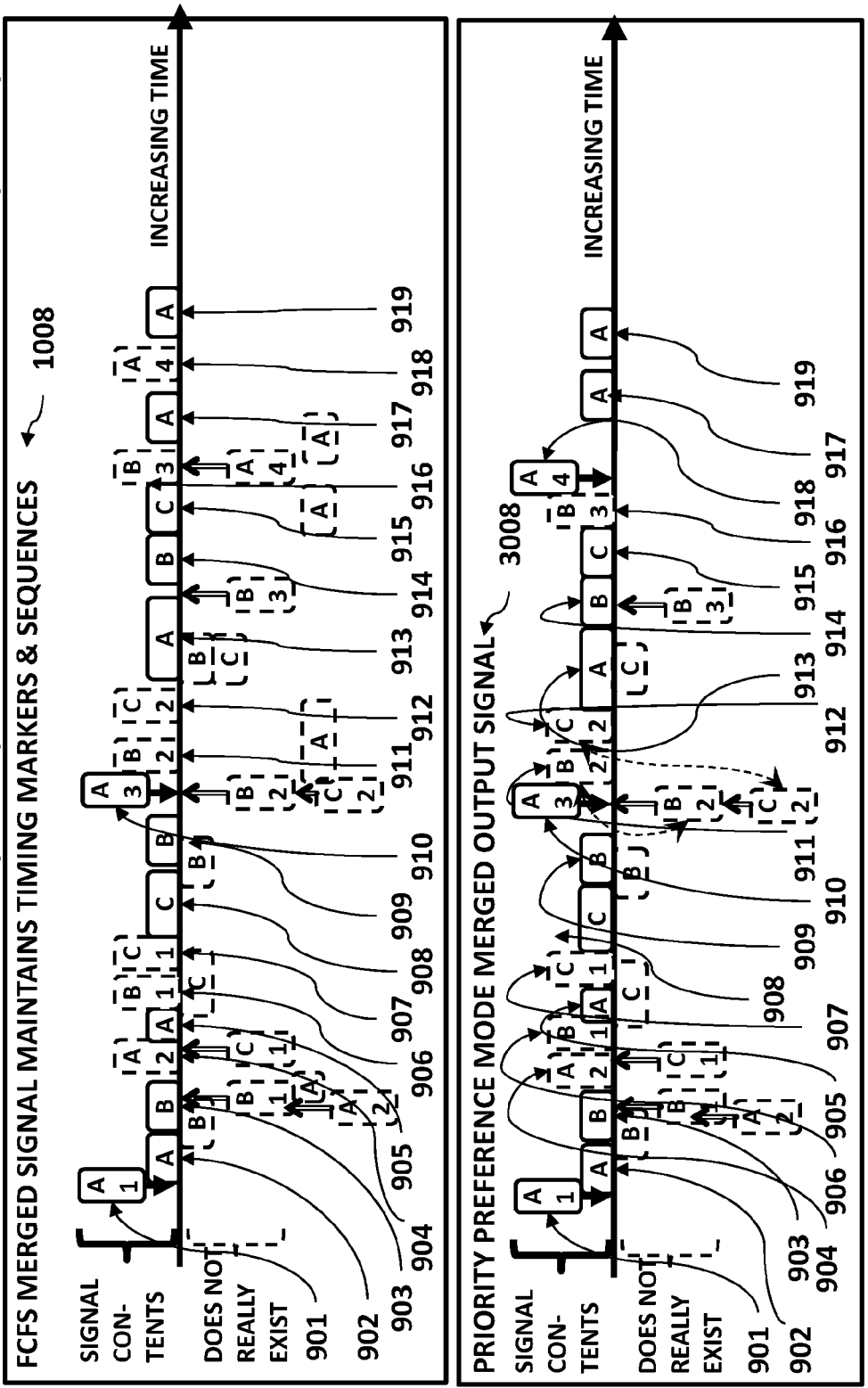
FIG. 32 compares results of first-come-first-served vs priority preference mode.

Similarly, FIG. 32 compares the results of First-Come-First-Served 1008 versus Priority Preference Mode 3008. Items #901 through #919 represent the same signal elements in FIGS. 8, 9, 10, 11, 30, 31, and 32. The outputs of both modes appear (1) to be almost identical in sequence ordering of the signal element items, (2) to suggest that Priority Preference mode may preserve slightly more physical timing markers than First-Come-First-Served mode, and (3) to suggest (for further investigation) whether the presence of a dense signal having a large proportion of messages in either mode could cause relatively more delays for timing markers when compared with Priority Host Mode.

Performance Criteria

Performance profile or goodness criteria for Primary Host Mode, (Filling-Empty-Spaces-On-A-Time-Reference Signal), First-Come-First-Served-Mode, Priority Preference Mode, or similar schemes—might include: (1) the number of physical timing markers preserved or presented on the merged output signal and (2) the maximum displacement or time-offset used for virtual timing markers—or even better: (3) the arithmetic mean of timing marker errors, (4) the maximum time error encountered, or (5) effectiveness measures of noise or jamming-resistance. So designers or implementers may want to (a) compare the above or similar criteria on representative cases for mission adequacy or (b) conduct optimization trade-offs.

Virtual Timing Markers Referencing Underlying Signal Carrier or Similar Waveforms It is generally accepted that modern electronics can measure time-offsets within ONE PERCENT of a digital signal's pulse width. For older GPS signals, this is about 10 nanoseconds or 10 feet of location uncertainty. But even better, designers can sometimes use the more precise underlying carrier cycles to measure or time-tag a position on a signal such as in "Carrier-phase Differential GPS".

Figure 33:
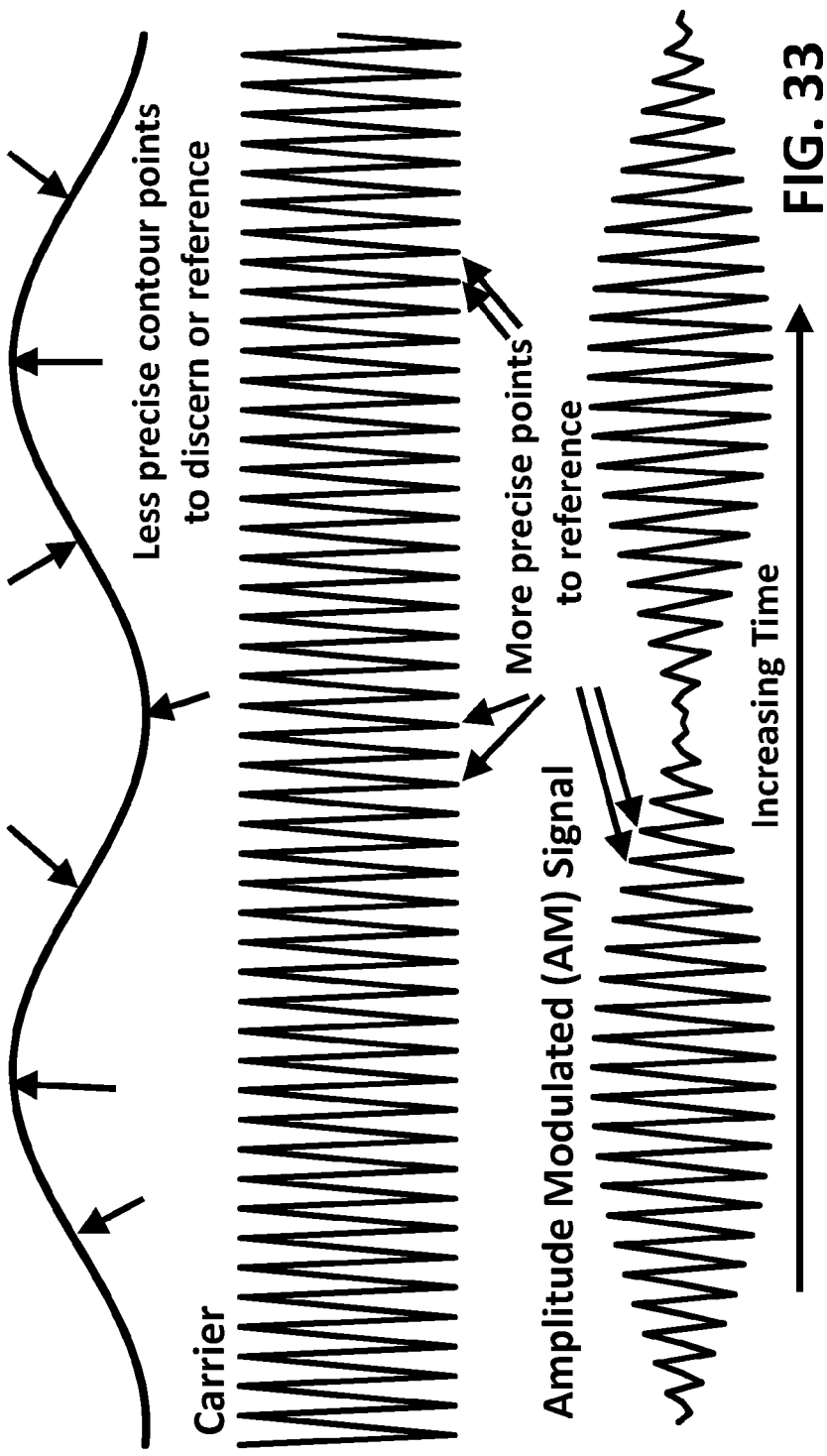
FIG. 33 shows an underlying carrier of a signal having more precision than the incoming signal to be modulated for an amplitude modulated (AM) signal.

FIG. 33 demonstrates that there are many more identifiable physical waveform reference points which may be used to identify times (a) on the carrier than (b) the overall enveloping amplitude modulated (AM) signal. The carrier cycle peaks or zero crossings can be more precisely seen. Carrier-based physical timing markers can be defined by easily measurable carrier waveform events. Thus, they can be far more precise than, for example, the more commonplace modulated signal contour timing markers which can only refer to shape changes of GROUP FORMATIONS which are formed by several underlying carrier waveforms and cycles.

Figure 34:
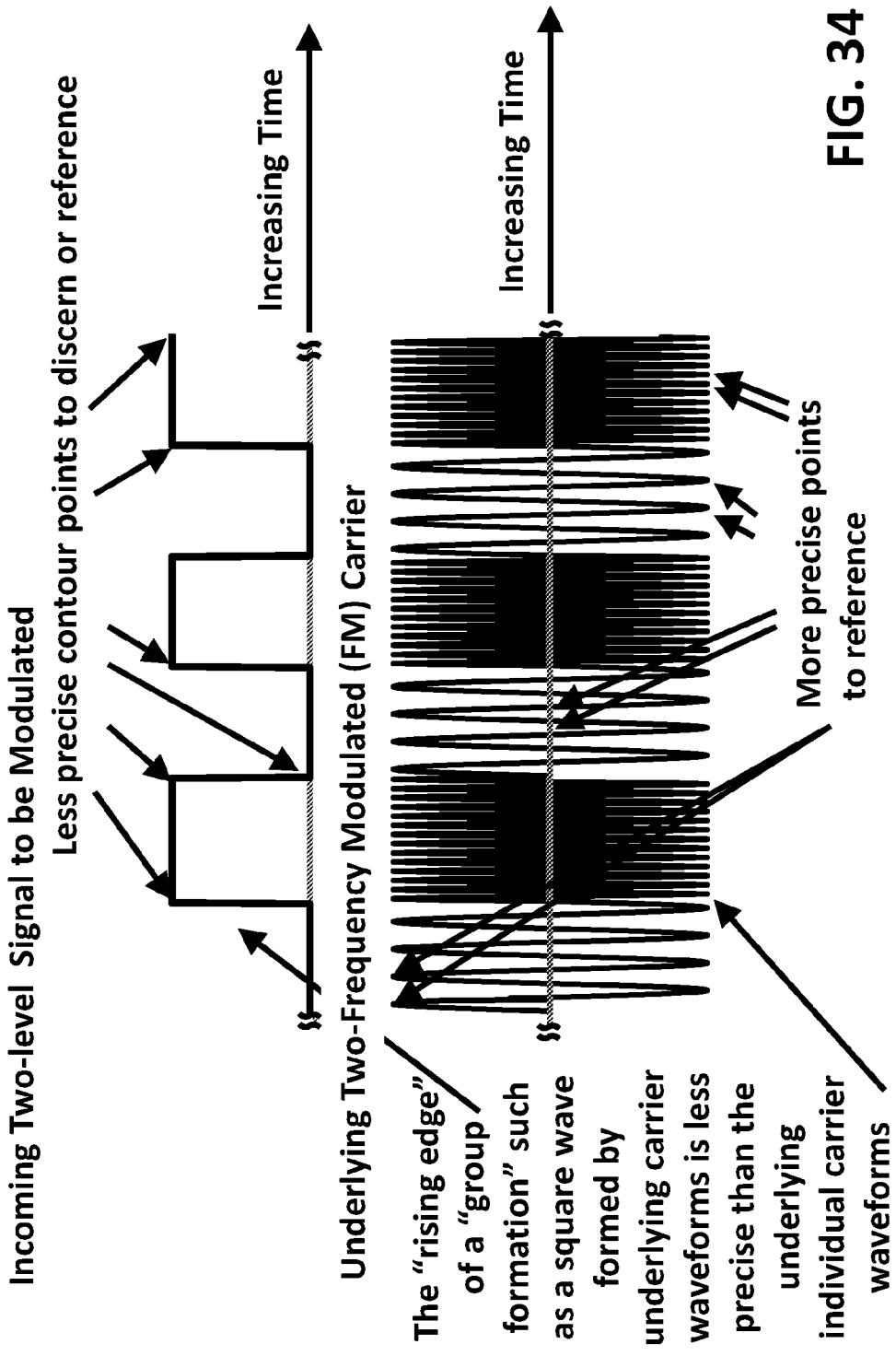
FIG. 34 shows that an underlying carrier can have more precision than the signal to be modulated for a frequency modulated signal.

FIG. 34 similarly demonstrates (1) how two frequencies of an underlying FM frequency modulated carrier can be used to render a two-level signal containing information and (2) that the underlying carrier has far more discernible events which can be more precisely measured and time-tagged.

It should be noted that a traditional timing signal which is modulated by a carrier requires an adequately high channel capacity to achieve and discern precise time resolution. Successive values of such a signal can be plotted over time in order to detect a waveform event such as a peak. So frequent updates along the timeline are necessary to provide adequate time-tag resolution. And higher channel capacities are needed to provide more updates or bits per second. But users only need updates at the times of relevant events in order to time-tag them. The other updates may be otherwise unused or wasted.

Only a transmitted small channel capacity is needed to provide a distinct discernible frequency change from one frequency to a second frequency. A frequency change in a traditional timing signal which is modulated by a carrier—instead can be rendered in in a carrier or carrier-less equivalent—provided that that particular change can be identified by receivers. That identification is discussed further below. In other aspects, discernible changes besides amplitude or frequency changes commonly include changes in signal phase, whereas changes in signal polarization might be difficult to implement.

In summary, virtual timing marker methods can reduce support needs because (1) they can use carrier-based or carrier-less-equivalent physical timing markers, (2) they can use intermittent signals, (3) they can make accommodations in "reaching for nearby physical timing markers", or (4) they can reduce the needed channel capacity.

Less transmitted annotation information may be needed if there are predefined conventions such as PERIODIC physical timing markers ROUGHLY at (1) "minute crossings" or (2) "crossings every 6 seconds"—based on a standard time of day.

For example, the GPS constellation of 24 minimum spacecraft will broadcast over continuous transmissions—a total of 24 precise annotated timing markers every 6 seconds (for now, disregarding the option to incorporate "one second GPS epochs"). For discussion purposes, if we also temporarily disregard GPS timing marker annotations, an alternative scheme could consist of transmission rotation as in (time division multiplexing) such as 0.25 seconds apart (i.e., 6 seconds/24-spacecraft is 0.25 seconds) to achieve (1) much lower capacity signal channels, (2) spacecraft transmission power savings afforded by short intermittent rather than continuous transmissions (i.e., intermittency is discussed elsewhere), (3) alternative closer, higher power land based transmitters, or (4) reduced interference because multiple transmissions on the same shared GPS frequency would be reduced (i.e., comparatively reduced from 24 simultaneous GPS transmissions to one).

Any annotated information can travel as non-time-critical data on a modulated signal or another signal. Even better, since this portion no longer has precision physical time markers, its channel capacity requirement can also be comparably reduced. In the case of GPS navigation signals, this is not 1 million bits per second but only 50 bits per second per transmitter.

Often the designers need to correlate the positions of underlying carrier cycles with the corresponding contour positions on the modulated signal. For GPS resolving to millimeter precisions rather than the usual one meter precisions, this has often been problematic but can be solved by tailoring several algorithms, additional signals, or additional transmitter-receiver systems to specific situations.

(1) From an electronics standpoint, the carrier component of amplitude modulated or frequency modulated signals can account for more than half the transmission signal power—as opposed to the message information component of the signal. (2) The signals may also be more vulnerable to noise when they have a narrow frequency band.

Therefore some designers may resort to carrier-less modulations such as spread spectrum or ultra-wide spectrum techniques. Signals without carriers may contain alternative underlying discernible structures which may be used as physical timing markers for virtual timing marker references. And often carrier-less signals have enough features so that some or all of their signal contents can optionally be translated or rendered as signal(s)-with-carrier-like outputs.

Thus, some virtual timing markers may use time-offsets or other displacement offsets to reference physical timing markers which can be situated on underlying signal structures such as (1) signal carrier waveforms or (2) other waveform representations.

Figure 35:
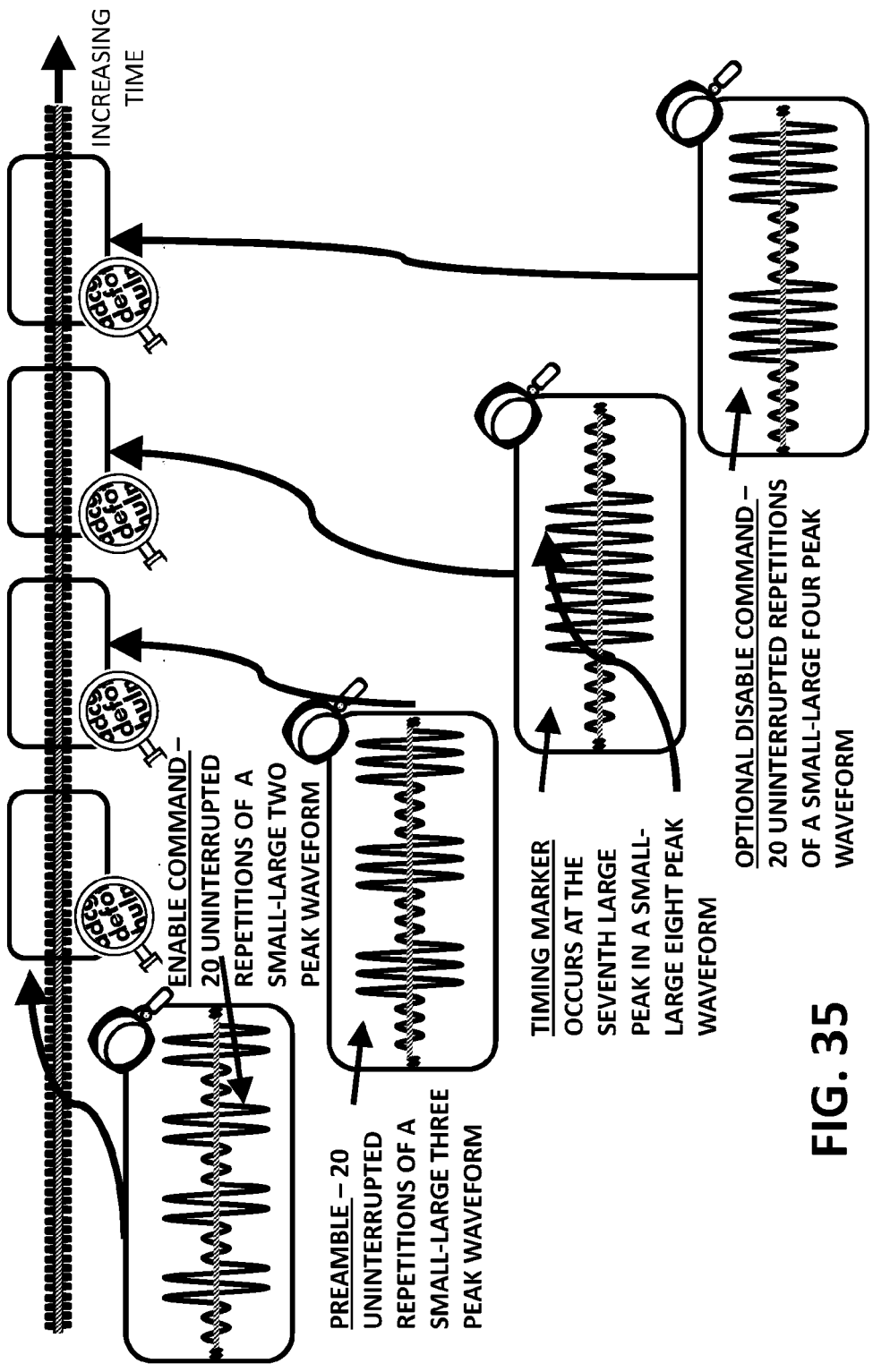
FIG. 35 shows an example of an implementation of an identifiable and reference-able physical timing marker on an AM carrier.

Referencing FIG. 35, "uniquely identifiable" structures may surround, supplement, or comprise referenced underlying physical timing markers such as preambles, referenceable timing markers, physical timing markers, or disable commands Other associated identification or information may reside on the enveloping modulating signal or another channel.

An "enable command" can be used to indicate to any corresponding downstream receivers that they can or should start searching for a preamble or physical timing marker. An enable command could reside (a) on an underlying carrier or carrier-less waveform or (b) on an enveloping modulated signal itself. Predefined, adequately unique, and identifiable patterns may be chosen for an enable command, such as on a carrier: twenty uninterrupted repetitions of two-small-cycles followed by two-large-cycles.

A "preamble" might be included so any corresponding downstream receivers will know that a referenced precision timing marker is very imminent—may be chosen as an adequately unique and identifiable pattern—such as on a carrier: an uninterrupted succession of twenty repetitions of three-small-cycles followed by three-large-cycles.

A "reference timing marker", of course, is included so any corresponding downstream receivers can discern, measure, or time-tag this as an identifiable and precise event. In this example on a carrier, the seventh tall peak in a train of 8-small-peaks-followed-by-8-tall-peaks may be identifiable, unique, and precise enough.

Physical timing marker identification, sequence numbers, or time-of-transmission time-tags may be inserted in the enveloping modulating signal or another channel as ordinary messages.

Current value(s) of a resettable or cyclically overflowable transmitter's count of carrier cycles or carrier-equivalent waveforms—may also be inserted in the enveloping modulating signal or another channel for purposes such as to determine the time interval associated with a span of n cycles.

An "optional disable command" is optionally included so any corresponding downstream receivers will know that a physical timing marker or its associated information has passed and that logic to detect a timing marker can be temporarily suspended. The command could be (a) on an underlying carrier or carrier-less waveform or (b) on the enveloping signal itself. In this example, an adequately unique and identifiable pattern on a carrier might be an uninterrupted succession of twenty repetitions of four-short-cycles followed by four-tall-cycles. Optionally, or in cases of high noise or signal gaps, time-out logic could alternatively disable this monitoring until another enable command is encountered.

Because carrier or carrier-less waveforms may enter at very rapid rates, it may be necessary to use (1) specialized, very high speed circuitry, (2) short-interval capture and later (possibly slower replay) examination methods, or (3) similar methods to scan, discern, identify, measure, or time-tag physical timing markers.

Downstream corresponding receivers can be implemented to process the aforementioned waveforms for virtual timing markers which reference physical timing markers in the underlying carrier or carrier-less equivalent and their associated information content.

Virtual Timing Markers or Referenced Physical Timing Markers can Optionally Reside on Intermittent Signals Rather than Continuous Ones Sometimes it may be advantageous to send timing markers on intermittent signals. For example, there is the industry term "1 PPS" which means a precise timing pulse occurs once per second but otherwise nothing intervening is required. Over 24 hours or much longer durations, a local subsystem using such a signal could have very little jitter or long-term drift. The navigation signal from a GPS spacecraft provides one precise annotated timing marker every 6 seconds while other portions of the signal are either (a) not time critical or (b) present only to distinguish its signal from other shared simultaneous transmissions on the same frequency band.

Designers may prefer to use intermittent signals to (a) reduce overall power requirements of the transmitter, (b) reduce signal interference with other simultaneous users on the same frequency band, or (c) better conceal their transmissions, In so doing, they may use implementations such as alternating intervals of (a) adequately high power and (b) zero power (or much lower power).

Formations of precise timing markers which represent precise time intervals regularly over longer durations could be used to throttle and update (a) any on-board receiver timing mechanisms, (b) any signal code tracking, or (c) carrier tracking for timing purposes.

For example, each GPS spacecraft orbits 12,500 miles above the earth. GPS spacecraft solar panels, batteries, radiant coolers, antennas, supporting equipment, redundant backups, consequential weight increases such as fuel, etc. limit the designer's final choice on transmitter power. Their transmitters are usually limited to the equivalent of 50 watts of transmitter power which diminishes over 12,500 miles of travel to a signal level well below background noise by the time it reaches the earth's surface. Sometimes the additional dish antenna on newer GPS spacecraft can also transmit a spot beam at a singular geographic locale with roughly 100 times more power than normal GPS signals when passing overhead.

The impact of multiple transmitters simultaneously sharing the same frequency band for corresponding receivers can also be reduced if each such transmitter can be expected to have only very short intermittent bursts of transmissions rather than continuous ones. Each annotated GPS timing marker transmission occurs once every 6 seconds.

Hypothetically, if designers could send physical timing markers on 0.06 second signal intervals rather than on the existing continuous transmissions which have one annotated timing marker every 6 seconds, it is posed that a 0.06 second signal with roughly a hundred times more signal power could be equivalently available for the physical timing marker portions (while, for this discussion, neglecting the non-time-critical information content which is only 300 annotation bits per timing marker).

Thus virtual timing marker implementations can enhance the use of traditional physical timing markers in signals not only because (1) virtual timing markers can reside on intermittent signals, but also, they can simultaneously (2) be non-time-critical on the signal, (3) reference the more precise signal carrier-waveforms-or-equivalents, (4) piggyback on the transmission signals and infrastructures of other systems, or (5) have greater effective dB power levels (because of intermittency, redundancy, or error correction).

Figure 36:
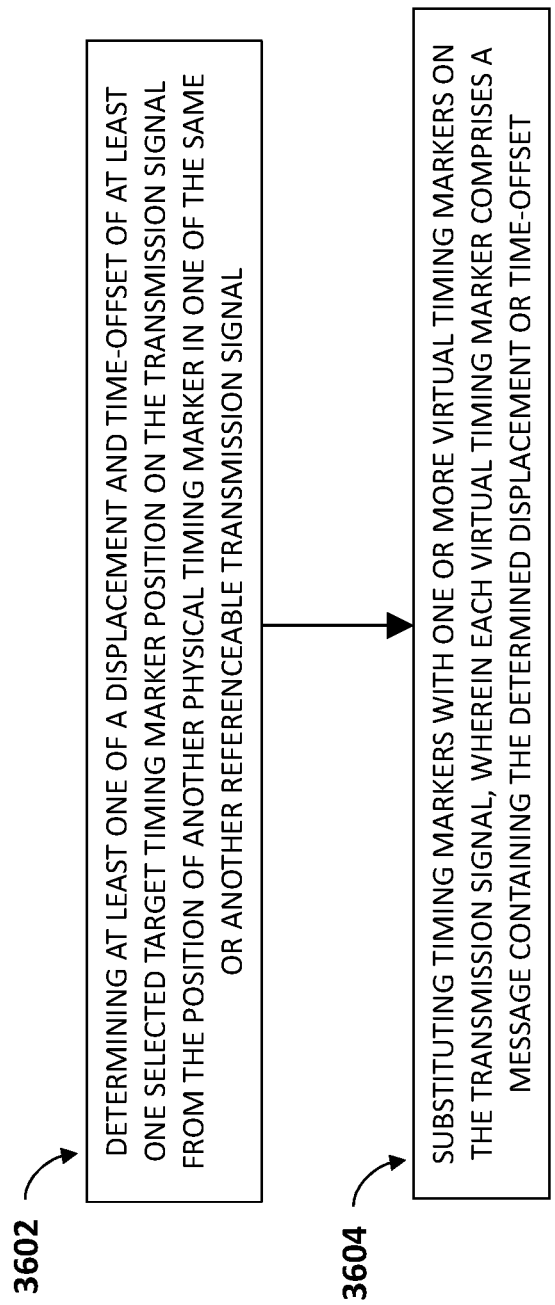
FIG. 36 illustrates an exemplary method for placing virtual timing markers in a transmission signal according to the present disclosure.

FIG. 36 illustrates an exemplary method for forming and placing virtual timing markers in a transmission signal according to the present disclosure. The method includes block 3602 for determining the displacement or time-offset of the next selected target timing marker position on the ongoing transmission signal from the corresponding position of a selected referenceable physical timing marker in one of the same or another referenceable transmission signal. Next, block 3604, for each determined displacement or time-offset, creates a virtual timing marker message. Then block 3606, for each selected targeted timing marker position, places a virtual timing marker on the transmission signal, wherein each virtual timing marker comprises a message containing the determined displacement or time-offset.

Figure 37:
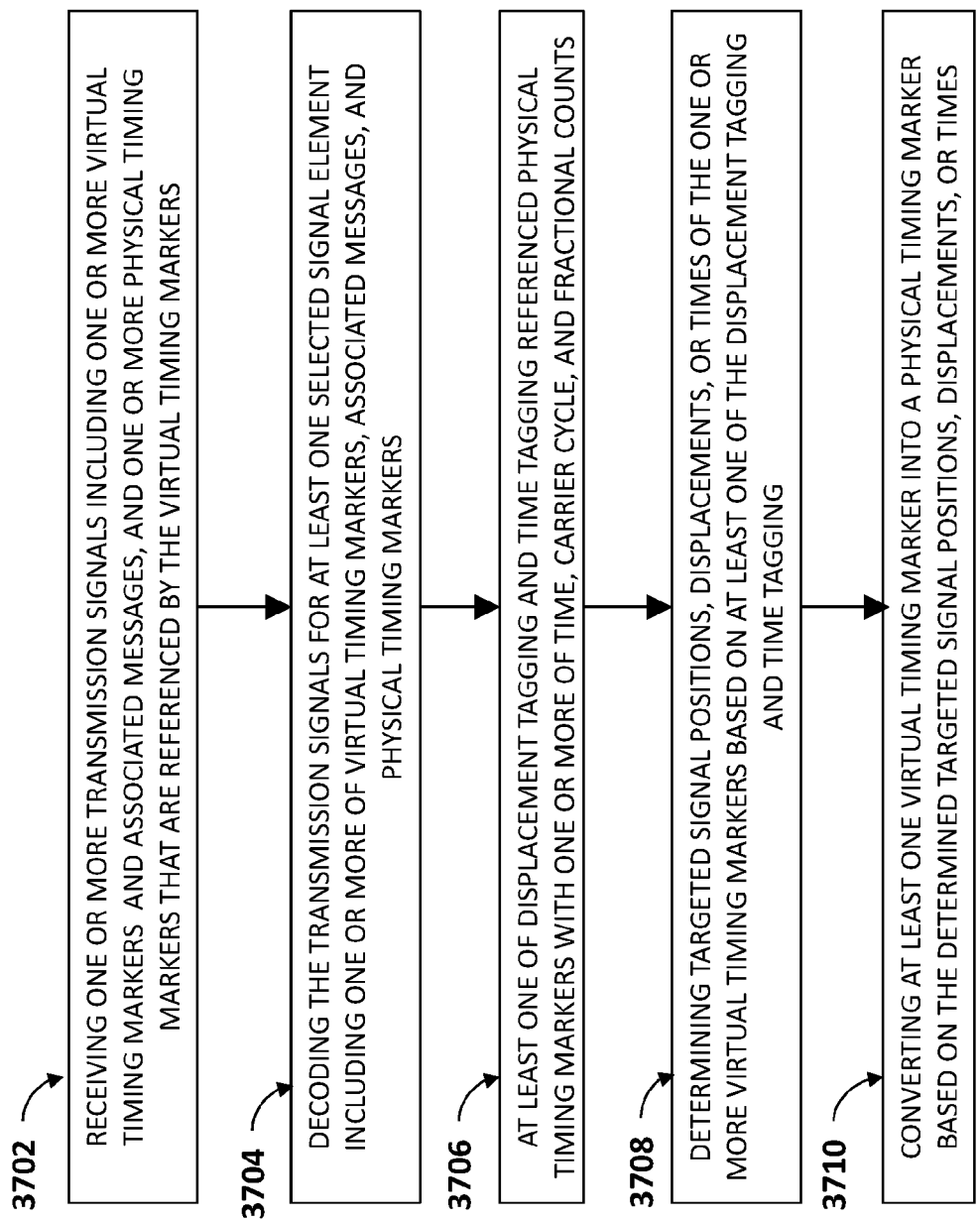
FIG. 37 illustrates an exemplary method for receiving and processing transmission signals having virtual timing markers according to the present disclosure.

FIG. 37 illustrates an exemplary method for receiving, processing, or rendering transmission signals having virtual timing markers according to the present disclosure. It depicts block 3702 as receiving one or more transmission signals including one or more signals having one or more virtual timing markers, any associated messages, one or more physical timing markers that are referenced by the virtual timing markers, and other signal content. Block 3704, then shows decoding received transmission signals for one or more selected signal elements including one or more virtual timing markers, associated messages, or reference physical timing markers.

The method of FIG. 37 at block 3706 further includes signal position tagging or time tagging one or more referenced physical timing markers with time, carrier-cycle-and-fractional counts, or carrier-less equivalents. Next block 3708 processing determines targeted signal positions, displacements, or times of the one or more virtual timing markers based on virtual timing marker messages and their corresponding received reference physical timing marker tags. Finally, block 3710 illustrates that the method includes rendering signal content information directly or outputting signals which may include converting one or more virtual timing markers into physical timing markers.

General Considerations

One or more of the components, steps, and/or functions illustrated in discussions and examples, herein, may be rearranged and/or combined into a single component, step, or function or embodied in several components, steps, or functions without affecting the operation of the communication device having channel-specific signal insertion. Additional elements, components, steps, and/or functions may also be added without departing from the invention. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

While certain exemplary embodiments have been described and shown in the accompanying drawings, it is to be understood that such embodiments are merely illustrative of and not restrictive on the broad application, and that this application is not be limited to the specific constructions and arrangements shown and described, since various other modifications may occur to those ordinarily skilled in the art.

The invention claimed is:

1. A method for forming and placing one or more virtual timing markers in a transmission signal from a platform comprising:
   determining, at the platform, the displacement or time-offset of a first selected target timing marker position on the transmission signal from a second indicated position of a physical timing marker or another virtual timing marker which is in the same or another referenceable transmission signal, the same or another referenceable transmission signal referenceable at both the determination platform and any corresponding-receiver;
   forming a message containing the determined displacement or time-offset; and
   placing at least one virtual timing marker on available space on the transmission signal, wherein each virtual timing marker comprises the message containing the determined displacement or time-offset;
   wherein the physical timing marker indicates the location of the second indicated timing marker position on the transmission signal and comprises a defined signal waveform change; and
   wherein a virtual timing marker in the one or more virtual timing markers indicates the location of the first selected target timing marker position on the transmission signal and comprises the message containing the determined displacement or the time offset of the first selected target timing marker position on the transmission signal from the second indicated position of the physical timing marker or the another virtual timing marker in the same or another referenceable transmission signal which is referenceable both at the determination platform and the any corresponding-receiver.

2. The method of claim 1, further comprising positioning or changing the positioning of one or more selected virtual timing markers in the transmission signal by:
   using or changing the virtual timing marker by one or more of:

using an original selected reference physical timing marker, using a different reference physical timing marker, referencing another virtual timing marker having a different reference physical timing marker, or using a different reference signal;

forming or updating the virtual timing marker message or any associated messages where the message or associated messages include at least one of the determined displacement, determined time-offset, timing marker identification, and signal identification; and placing the virtual timing marker and any associated messages in adequate available space or spaces in the transmission signal.

3. The method of claim 1, further comprising one or more of the following:
a) converting selected physical timing markers into virtual timing markers when correct positioning of physical timing markers with other physical timing markers or other signal elements on the transmission signal would result in either a collision or overwriting or both;
b) positioning one or more virtual timing marker messages such that the messages do not physically overlap each other or any other signal elements in the transmission signal;
c) substituting selected physical timing markers with virtual timing markers;
d) augmenting selected physical timing markers or virtual timing markers with other virtual timing markers;
e) positioning virtual timing markers and any associated messages in one or more available spaces where the available spaces are selected from at least one of unused signal intervals, unused packet header words, and unused content regions; and
f) wherein a signal element is a shortest logical waveform unit that a signal transmitter can send.

4. The method of claim 1, wherein the transmission signal comprises an electronic signal, an optical signal, an acoustic signal, or any combination thereof.

5. The method of claim 1, further comprising:
forming a message and a virtual timing marker that is configured to reference a physical timing marker through:
referencing another virtual timing marker; or
creating or adding to a linked virtual timing marker chain that ultimately references a physical timing marker on a transmission signal.

6. The method of claim 1, further comprising:
encoding selected virtual timing markers or any associated messages by using one or more message error detection or error correction algorithms.

7. The method of claim 1, further comprising:
encrypting selected virtual timing markers or associated messages for single or multiple communities or classes of separate users.

8. The method of claim 1, further comprising:
forming one or more sets of redundant virtual timing markers where each set corresponds to a same selected targeted timing marker position by a one or more of the following actions, for each set:
a) forming two or more redundant virtual timing markers and any associated messages that reference different physical timing markers or other virtual timing markers which reference different physical timing markers;
b) dispersing the redundant virtual timing markers over equally-spaced intervals for the selected targeted timing marker position along the transmission signal;
c) dispersing the redundant virtual timing markers over irregularly-spaced intervals for the selected targeted timing marker position along the signal; and
d) dispersing the redundant virtual timing markers and any associated messages for the selected targeted timing marker position along the transmission signal over a pre-specified duration that is longer than a pre-specified potential time-interval burst of noise, interference, or signal gap.

9. The method of claim 1, further comprising the merging of signals by performing one or more of the following actions:
a) selectively using virtual timing markers instead of physical timing markers to eliminate or reduce the need for multiplexing;
b) merging signals having one or more timing markers and converting selected physical timing markers into virtual timing markers;
c) merging signals having one or more timing markers before multiplexing the result with one or more other signals;
d) merging signals which have one or more timing markers instead of any multiplexing; and
e) using virtual timing markers to enable the use of a lower-than-otherwise signal frequency or transmission channel capacity.

10. The method of claim 1, further comprising:
placing virtual timing markers and any associated messages from one or more timing signals in available adequate spaces on a second set of one or more other transmission signals and piggybacking them on the same one or more other transmission signals.

11. The method of claim 1, further comprising:
selecting signal elements or waveform patterns, types of signal-elements or waveform-patterns, or combinations thereof in a signal that meet predetermined acceptance criteria as referenceable physical timing markers.

12. The method of claim 11, wherein the signal elements or patterns include one or more of the following items: (a) waveform peaks, (b) waveform valleys, (c) zero crossings, (d) amplitude variations, (e) frequency variations, or (f) phase variations.

13. The method of claim 11, further comprising:
using one or more virtual timing markers to reference one or more physical timing markers that satisfy the criteria for predetermined signal elements or patterns located on the underlying carrier waveforms or carrier-less equivalents of a signal.

14. The method of claim 1, further comprising:
placing enable, disable, or imminent-warning messages in the signal to dynamically indicate to any corresponding downstream receivers when to search for physical timing markers.

15. The method of claim 1, further comprising:
using pre-arranged conventions or procedures which include time-outs to disable searches for physical timing markers.

16. The method of claim 1, further comprising:
forming one or more signals, which have one or more virtual timing markers, by using one or a combination of the following modes:
a) a first-come-first-served mode wherein each next signal element to be placed in a signal is selected on a first-come-first-served basis;
b) a priority preference mode wherein each next signal element to be placed in a signal is chosen on a predetermined priority basis, where the predetermined priority basis is selected from at least one of the highest priority is given to physical timing markers, a next highest priority is given to signal events including signal-start and break-in-signal; a middle priority is given to virtual timing markers; and a lowest priority is given to other signal elements including messages;

c) a primary host mode wherein a primary host signal is a signal used as an initial template for an outgoing signal and, as a primary host signal is read or generated, signal elements are formed on the outgoing signal, other selected input signal tributary or internally generated signal elements are simultaneously inserted into empty available spaces of either another outgoing signal or the primary host signal at lower priorities than the host signal elements using either one or a combination of first-come-first-served, priority preference, or similar modes for the other non-host inputs;

d) a filling-empty-spaces-on-a-time-reference-signal mode wherein the processing functions as a primary host mode except that virtual timing markers reside only on the primary host signal which has the reference-able physical timing markers; and e) a commonly accessible time reference signals mode wherein the relevant transmission subsystems and any corresponding receivers can access reference-able physical timing markers on one or more timing reference signals or from time-aligned or synchronized clocks.

17. The method of claim 1, wherein the virtual timing markers or associated messages contain one or more of the following:
a) a before, after, or concurrent time-offset or displacement of the virtual timing marker's targeted position relative to a reference physical timing marker or another virtual timing marker targeted position;
b) timing marker redundancy information;
c) timing marker identification;
d) signal identification;
e) reference signal identification;
f) reference timing marker identification;
g) encryption information or encrypted content;
h) error detection or error correction information;
i) a sequence number;
j) a time of timing marker transmission departure;
k) a corresponding date;
l) a corresponding precise location of the transmitter at timing marker departure;
m) a corresponding transmitter carrier-cycle-and-fractional-count or carrier-less equivalent; and
n) corresponding velocity vectors of the transmitter platform at timing marker departure.

18. The method of claim 1, further comprising:
placing virtual timing marker messages, any associated messages, and reference physical timing markers only on physically present portions of one-or-more (a) intermittent signals, (b) adequately high portions of signals having widely fluctuating power levels, or (c) continuous signals.

19. The method of claim 1, further comprising:
multiplexing one or more signals which have one or more timing signals with one or more host signals by (1) forming or assembling one or more timing signals, (2) merging timing signals by converting selected timing markers into virtual timing marker messages which reference other physical timing markers on the same host signals or other separate signal(s), and (3) multiplexing the aforementioned formed-or-merged signals that have virtual timing marker messages with the one or more host signals, wherein multiplexing can be time division multiplexing, frequency division multiplexing, or code division multiple access multiplexing.

20. A method for (a) receiving, examining, and processing one or more transmission signals in which one or more timing signals contain one or more virtual timing markers, any associated messages, or any referenced physical timing markers as well as other optional content and (b) outputting selected corresponding timing signals or rendering selected timing signal related contents, the method comprising:
a) inputting one or more transmission signals where one or more of the signals are the timing signals;
b) receiving, demultiplexing, scanning, decoding, demerging or unpacking the timing signals for one or more of selected virtual timing markers, selected physical timing markers, and selected associated messages the receiving, demultiplexing, scanning, decoding, demerging or unpacking the timing signals further comprises:
   I. recognizing selected signal elements, measuring selected waveform parameters within the signal elements, or precisely time-tagging or position-or-displacement-tagging predefined salient points within the signal elements including the physical timing markers;
   II. using clocks, counters, or timing reference signals to precisely time-tag or position-or-displacement-tag selected incoming signal elements in terms of time, carrier-cycle-and-fractional-counts, carrier-less equivalents, or other displacements;
   III. saving or recording the time-tags or position-or-displacement-tags of one or more referenced physical timing markers according to time, carrier-cycle-and-fractional-counts, carrier-less equivalents, or other displacements;
   IV. determining the targeted signal position or arrival time indicated by each selected virtual timing marker based on each virtual timing marker's message contents and corresponding referenced physical timing marker arrival parameters;
c) scanning, decoding, or unpacking any other additional selected and pertinent signal elements;
   i. rendering all or selected timing markers or other associated signal content as output information; and/or
   ii. outputting one or more selected original-or-reconstructed signals such that a signal may contain (1) one or more physical timing markers which represent the selected virtual timing markers which have been converted into the physical timing markers, (2) the one or more physical timing markers not upstream-converted into the one or more virtual timing markers, (3) one or more virtual timing markers, or (4) other signal elements;
   wherein a received virtual timing marker in the one or more virtual timing markers is determined-and-formed at an upstream transmission platform so that the received virtual timing marker (1) indicates the determined location of a first selected target timing marker position on the transmission signal and (2) comprises a message containing the determined displacement or the time offset of the first selected target timing marker position on the transmission signal from a second indicated position of a physical timing marker or another virtual timing marker in the same or another referenceable transmission signal which is referenceable both at the upstream transmission platform and any corresponding-receiver;

wherein the physical timing marker indicates the location of the second indicated timing marker position on the transmission signal and comprises a defined signal waveform change; and wherein a signal element is a shortest logical waveform unit that a signal transmitter can send.

21. The method of claim 20, further comprising one or more of:

f) synchronizing corresponding receiver clocks to transmitter clocks to more precisely time-tag-or-position-tag-or-displacement-tag physical timing markers and the one or more virtual timing markers;

g) receiving one or more transmission signals wherein such signals may contain the one or more virtual timing markers and any of the selected associated messages while the corresponding referenced physical timing markers may reside on the same or different signal;

h) measuring pertinent parameters of selected physical timing markers which arrive at receivers;

i) comparing physical timing marker measurements of arrivals against acceptable threshold values and retaining only satisfactory timing markers;

j) decrypting any encrypted virtual timing marker messages and the selected associated messages;

k) performing algorithm calculations for error detection or error correction of messages for any virtual timing markers or the selected associated messages which have error detection or error correction content;

l) rejecting any virtual timing markers or the selected associated messages which have uncorrectable erroneous or distorted messages;

m) examining any virtual timing marker or message identifiers for acceptability or relevance and retaining only satisfactory timing markers or messages;

n) checking any pre-arranged sequence numbering of signal elements for discrepancies and ordering them;

o) rejecting or procedurally discarding the one or more virtual timing markers and associated information for which no reference physical timing marker was successfully ultimately received;

p) collecting one or more sets of redundant virtual timing markers for each selected target timing marker instance;

q) rejecting any out-of-family value discrepancies for any redundant virtual timing marker set instance;

r) reconciling any multiple, redundant copies of virtual timing markers within one or more selected sets of the redundant virtual timing markers;

s) using traditional statistical methods to use more virtual timing markers to converge more closely to a target timing marker position or reduce uncertainty of error; and t) using the time-offsets or displacements of the one or more virtual timing markers and the displacement-or-position tags or time-tags of corresponding reference physical timing marker arrivals to determine the indicated times, positions, or displacements of the targeted timing markers of the one or more virtual timing markers.

22. The method of claim 20, further comprising one or more of:

u) unpacking any piggybacked timing signals on continuous host transmission signals;

v) unpacking any piggybacked timing signals on intermittent host transmission signals;

w) unpacking any piggybacked timing signals on adequately-high signal power level intervals of varying-power-level host transmission signals; and x) one or more of the following: (1) re-acquiring the signal, (2) locking onto the signal, (3) re-authenticating the signal, and (4) resuming the processing of the content.

23. The method of claim 20, further comprising one or more of:

y) for received signals and their signal elements, including the one or more virtual timing markers, the selected associated messages, physical timing markers, and other content, —using traditional signal handling activities, where the traditional signal handling activities are selected from at least one of detecting, receiving, demodulating, amplifying, filtering, discerning, measuring, decoding, ingesting, unpacking, decrypting, separating, translating, time-tagging traditional physical timing markers, displacement-tagging, signal position tagging, ignoring, reformatting, forming, generating, transferring, converting, outputting, transmitting, and rendering;

z) using one or more local neighborhood receiver platforms to provide signal distortion correction data when determining signal travel delay variations or to enable neighborhood receiver clocks to act as secondary or backup standard clock time references; and aa) using one or more methods of Differential GPS or Carrier-phase (Differential) GPS to improve GPS signal timing accuracy or precision by using associated processing, processing GPS sets of multiple-associated PNT signals, or using additional nearby receivers with precisely known locations in conjunction with timing signals which have virtual timing markers, associated messages, or referenced physical timing markers.

24. The method of claim 20, further comprising one or more of:

bb) detecting and using incoming commands which are in arriving signals, where the arriving signals are selected from at least one of enable, disable, or imminent-warning command messages which are embedded in a received signal in (1) enveloping-encoded waveforms, (2) the underlying carrier, or (3) carrier-less equivalents;

cc) dynamically enabling or disabling recognition or processing of selected reference physical timing markers which conform to predefined waveforms or patterns on (1) the enveloping-encoded waveforms, (2) the underlying carrier, or (3) carrier-less equivalents of the signal(s);

dd) successfully discerning, recognizing, and time-or-position-or-displacement-tagging selected and embedded reference physical timing markers; and ee) disabling after any enabling based on predetermined arrangements including timeouts.

25. A transmission apparatus for transmitting signals from a platform including one or more virtual timing markers, the transmission apparatus comprising two or more of:

signal input components, signal scanners, precision timing devices, processors, memory, information storage, encryption subsystems, decryption subsystems, multiplexers, amplifiers, transmitters, antennas, or similar components and circuitry as well as firmware or software, the transmission apparatus is configured to:

a) form or assemble one or more signals for transmission wherein one or more transmission signals from the platform includes one or more timing marker signal elements;
b) choose at least one virtual timing marker in the one or more virtual timing markers to be formed and placed on the one or more transmission signals;
c) for each of the chosen at least one virtual timing marker in the one or more virtual timing markers to be formed at the platform, determine a displacement or time-offset from a first selected target position of the virtual timing marker to a second indicated position of a physical timing marker or another virtual timing marker which is in the same or another referenceable transmission signal, the same or another referenceable transmission signal referenceable at both the determination platform and any corresponding-receiver;
e) for each virtual timing marker in the one or more virtual timing markers to be formed, form a message containing the determined displacement or time-offset; and
f) place each formed virtual timing marker on available space on the one or more transmission signals, wherein the virtual timing marker comprises the message containing the determined displacement or time-offset;
wherein a virtual timing marker in the one or more virtual timing markers indicates a location of a first selected target timing marker position on the transmission signal and comprises the message containing the determined displacement or the time offset of the first selected target timing marker position on the transmission signal from a second indicated position of the physical timing marker or another virtual timing marker in the same or another referenceable transmission signal which is referenceable both at the determination platform and any corresponding-receiver;
wherein the physical timing marker indicates the location of the second indicated timing marker position on the transmission signal and comprises a defined signal waveform change; and
wherein a signal element is a shortest logical waveform unit that a signal transmitter can send.

26. The apparatus of claim 25, wherein the transmitter system is further configured to form and place the one or more virtual timing markers on one or more signals including one or more of:
a) creating original virtual timing markers;
b) substituting selected physical timing markers with virtual timing markers; and
c) augmenting each selected physical timing marker or virtual timing marker by forming a set of one or more redundant virtual timing markers, wherein, each of the virtual timing markers references a different physical timing marker from the other virtual timing markers within the same set.

27. The apparatus of claim 25, wherein the transmitter system further includes one or more of:
a) one or more scanning subsystems which includes identifying signal elements, time tagging signal elements, displacement tagging signal elements, measuring signal waveform parameters, measuring time intervals, or detecting empty space intervals, unused packet header words, or unused content regions; and
b) one or more signal forming subsystems configured to form, convert, ignore, augment, sequence, schedule, merge, or transfer signal elements to positions in one or more ongoing output signals such that candidate signal elements are arranged in a logical and useable order, that the signal elements do not overwrite each other, or that the precise positions of physical timing markers and the time-offsets-or-displacements of virtual timing markers are adequately correct and precise.

28. The apparatus of claim 25, wherein the transmitter system is configured to operate according to one-mode or one-or-more combinations of the following modes:
a) a first-come-first-served mode;
b) a priority preference mode;
c) a primary host mode;
d) a filling-empty-spaces-on-a-time-reference signal mode; and
e) a commonly accessible time reference signal mode.

29. The apparatus of claim 25, the transmitter system further comprising:
a signal element forming subsystem configured for one or more of:
creating virtual timing markers such that each virtual timing marker or any associated messages contains one or more of the following: (a) the virtual timing marker displacement-offset or time-offset from its reference timing marker position to its target timing marker position, (b) identification of the relevant reference physical timing marker, (c) identification of the virtual timing marker, (d) signal identification, and (e) additional information;
creating virtual timing markers with (a) blank offsets to be updated later, (b) tentative offsets which may be updated later, or (c) final value offsets;
selectively creating sets of redundant virtual timing markers or associated messages;
forming or using physical timing markers which reside on one or more of: (a) an enveloping modulated signal, (b) an underlying carrier, or (c) a carrier-less equivalent;
merging selected signals by using virtual timing markers before or instead of multiplexing;
encrypting virtual timing markers or associated messages;
creating error detection or correction data for virtual timing markers or associated messages; and
selectively creating embedded commands to enable or disable receiver detection and processing of the physical timing markers.

30. A receiver system apparatus to (a) receive, examine, and process one or more transmission signals in which one or more timing signals contain one or more virtual timing markers as first-type messages, any associated messages as second-type messages, or any referenced physical timing markers and (b) output selected corresponding timing signals or render selected timing signal related contents, the apparatus comprising at least two of:
a) transmission signal input subsystems to input one or more transmission signals where one or more of the signals are the timing signals;
b) timing marker examination subsystems to scan, decode, or unpack the timing signals for one or more of the one or more virtual timing markers, the referenced physical timing markers, or the associated messages as second-type messages, the timing marker examination subsystems further comprise:
I. recognizing selected signal elements, measuring selected waveform parameters within the signal elements, or precisely time-tagging or position-or-displacement-tagging predefined salient points within the signal elements including the physical timing markers;

II. using clocks, counters, or timing reference signals to precisely time-tag or position-or-displacement-tag selected incoming signal elements in terms of time, carrier-cycle-and-fractional-counts, carrier-less equivalents, or other displacements;

III. saving or recording the time-tags or position-or-displacement-tags of one or more of the referenced physical timing markers according to time, carrier-cycle-and-fractional-counts, carrier-less equivalents, or other displacements; and IV. determining the targeted signal position or arrival time indicated by each selected virtual timing marker based on each virtual timing marker's contents, the associated messages, and corresponding referenced physical timing marker arrival parameters;

c) signal element examination subsystems to scan, decode, or unpack any other pertinent signal elements;

d) rendering subsystems to render all or selected timing markers or other associated signal content as output information; and e) signal output subsystems to output one or more selected original-or-reconstructed signals such that a signal may contain (1) physical timing markers which represent selected virtual timing markers which have been converted into physical timing markers, (2) physical timing markers which were not upstream-converted into the one or more virtual timing markers, (3) one or more of the one or more virtual timing markers, or (4) other signal elements;

wherein a received virtual timing marker in the one or more virtual timing markers is determined-and-formed at an upstream transmission platform so that the virtual timing marker, as a first-type message, (1) indicates the determined location of a first selected target timing marker position on a transmission signal and (2) comprises the first-type message containing the determined displacement or the time offset of the first selected target timing marker position on the transmission signal from a second indicated position of a physical timing marker or another virtual timing marker in the same or another referenceable transmission signal which is referenceable both at the determination platform and the any corresponding-receiver;

wherein the physical timing marker indicates the location of the second indicated position on the transmission signal and comprises a defined signal waveform change; and wherein a signal element is a shortest logical waveform unit that a signal transmitter can send.

31. The receiver system apparatus of claim 30, further comprising at least one or more of:

f) synchronization subsystems to synchronize corresponding receiver clocks to transmitter clocks to more precisely time-tag-or-position-tag-or-displacement-tag physical timing markers and the one or more virtual timing markers;

g) signal receiver subsystems to receive one or more transmission signals wherein one or more of the signals may contain the one or more virtual timing markers and any of the associated messages while the corresponding referenced physical timing markers reside on the same or different signal;

h) measurement subsystems to measure pertinent parameters of selected physical timing markers which arrive at receivers;

i) comparison subsystems to compare physical timing marker measurements of arrivals against acceptable threshold values and retain only satisfactory timing markers;

j) decryption subsystems to decrypt any encrypted virtual timing marker messages and the associated messages;

k) error detection or error correction calculation subsystems to perform algorithm calculations for error detection or error correction of any so-constructed virtual timing markers or associated message content;

l) error detection or correction rejection subsystems to reject any of the one or more virtual timing markers or any of the associated messages which have uncorrectable erroneous or distorted messages;

m) signal element sequence checking subsystems to check any pre-arranged sequence numbering of signal elements for discrepancies and order them;

o) targeted timing marker determination subsystems to use the time-offsets or displacements of the one or more virtual timing markers and the displacement-or-position tags or time-tags of corresponding reference physical timing marker arrivals to determine the indicated times, positions, or displacements of the one or more virtual timing markers.

32. The receiver system apparatus of claim 30, further comprising at least one or more of:

p) continuous host signal unpacking subsystems to unpack any piggybacked timing signals on continuous host transmission signals;

q) intermittent host signal unpacking subsystems to unpack any piggybacked timing signals on intermittent host transmission signals;

r) varying-power-level host signal unpacking subsystems to unpack any piggybacked timing signals on adequately-high signal power level intervals of varying-power-level host transmission signals; and s) signal-interruption mitigation subsystems to do one or more of the following: (1) re-acquire the signal, (2) lock onto the signal, (3) re-authenticate the signal, and (4) resume the processing of the content.

33. The receiver system apparatus of claim 30, further comprising at least one or more of:

t) receiver input and processing subsystems to receive signals and their signal elements, including the one or more virtual timing markers, associated messages, physical timing markers, and other content using traditional signal handling activities, where the activities are selected from at least one of detecting, receiving, demultiplexing, demodulating, amplifying, filtering, discerning, measuring, decoding, ingesting, unpacking, decrypting, separating, translating, time-tagging traditional physical timing markers, displacement-tagging, signal position tagging, ignoring, reformatting, forming, generating, transferring, converting, outputting, transmitting, and rendering;

u) implementation subsystems comprising at least one or more signal input components, demultiplexers, decryptors, signal separators, signal scanners, precision timing devices, processors, memory, information storage, amplifiers, antennas, electronic components, circuitry, firmware, or software;

v) a neighbor receiver platform subsystem to use one or more local neighborhood receiver platforms which provide signal distortion correction data for determining signal travel delay variations or which enable neighborhood receiver clocks to act as secondary or backup standard clock time references; and w) combined GPS methods to use one or more methods of Differential GPS, Carrier-phase (Differential) GPS, dual-frequency-signals, or trilaning to improve GPS signal timing accuracy or precision by using associated processing, processing GPS sets of multiple-associated PNT signals, or using additional nearby receivers with precisely known locations in conjunction with timing signals which have virtual timing markers, associated messages, or referenced physical timing markers.

34. The receiver system apparatus of claim 30, further comprising at least one or more of:
   x) front-end subsystems configured to detect, screen, or receive the transmissions;
   y) demultiplexer subsystems configured to demultiplex selected transmission signals;
   z) demerging subsystems to separate merged signals including signals with merged virtual timing markers and any associated messages; and
   aa) decrypting subsystems to decrypt selected transmissions.

35. The receiver system apparatus of claim 30 wherein the apparatus is designed or configured for:
   bb) detecting and using incoming commands, messages, or other waveform indicators which are in arriving signals, where the arriving signals are selected from at least one of enable, disable, and imminent-warning command messages which are embedded in a received signal in (1) enveloping-encoded waveforms, (2) the underlying carrier, or (3) carrier-less equivalents;
   cc) dynamically enabling or disabling recognition or processing of selected reference physical timing markers which conform to predefined waveforms or patterns on (1) the enveloping-encoded waveforms, (2) the underlying carrier, or (3) carrier-less equivalents of the signal(s); and
   dd) discerning, recognizing, and time-or-position-or-displacement-tagging selected and embedded reference physical timing markers.

36. The receiver system apparatus of claim 35, wherein the apparatus is designed or configured to disable recognition or processing of selected reference physical timing markers after any enabling based on predetermined arrangements including timeouts.

* * * * *